US008259213B2

(12) United States Patent
Ishiga

(10) Patent No.: US 8,259,213 B2
(45) Date of Patent: Sep. 4, 2012

(54) DIGITAL CAMERA AND DIGITAL CAMERA SYSTEM

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 310 days.

(21) Appl. No.: 12/765,566

(22) Filed: Apr. 22, 2010

(65) Prior Publication Data

US 2010/0201853 A1  Aug. 12, 2010

Related U.S. Application Data

(63) Continuation-in-part of application No. PCT/JP2008/071244, filed on Nov. 21, 2008.

(30) Foreign Application Priority Data

Nov. 22, 2007 (JP) ................................. 2007-302777

(51) Int. Cl.
*H04N 5/225* (2006.01)
*G02B 27/28* (2006.01)
(52) U.S. Cl. ..................... 348/342; 348/374; 359/489.19
(58) Field of Classification Search .................. 348/342, 348/374; 359/489.19, 308, 339, 491.01
See application file for complete search history.

(56) References Cited

U.S. PATENT DOCUMENTS 3,588,224 A   6/1971 Pritchard
(Continued)

FOREIGN PATENT DOCUMENTS

EP   1 641 283 A1   3/2006
(Continued)

OTHER PUBLICATIONS

Kittel, "Introduction to Solid State Physics," 6th Edition, Chapter 2, pp. 27-50, 1986.

(Continued)

*Primary Examiner* — Tuan Ho
*Assistant Examiner* — Shahbaz Nazrul
(74) *Attorney, Agent, or Firm* — Oliff & Berridge, PLC

(57) ABSTRACT

A digital camera includes: a lens unit that forms a subject image on an imaging plane; an image sensor that includes color filters each disposed at one of pixels disposed in a lattice-like pattern over pixel intervals (a, b) along two directions, an x direction and a y direction, extending perpendicular to each other, with color filters corresponding to a first color component among first through nth (n≧2) color components, disposed in a checkered pattern at pixels amounting to at least half an entire color filter density and color filters corresponding to remaining color components disposed at other pixels, and outputs image signals expressing the subject image; and an optical low pass filter unit at which light having passed through the lens unit and yet to enter the image sensor undergoes light beam separation along two diagonal directions ((1/2)a, (1/2)b)×(√2/α) and ((1/2)a, −(1/2)b)×(√2/α) relative to (x, y) coordinate axes, so as to achieve frequency modulation for the subject image to become extinct at a band formed by connecting spatial frequencies (α/(2a), 0) and (0, α/(2b)) at positions calculated by multiplying, by a multiplier α, a Nyquist frequency 1/(2a) and a Nyquist frequency 1/(2b) at the image sensor assumed respectively along the x direction and the y direction. When the pixel intervals (a, b) assumed along the two directions at the image sensor are both within a 2.5~5 μm/pixel range, a position of an extinction frequency band is set for the optical low pass filter by setting the multiplier α for the Nyquist frequencies at the image sensor within a range of 1.5≦α≦3.5.

22 Claims, 35 Drawing Sheets

U.S. PATENT DOCUMENTS

| | | | |
|---|---|---|---|
| 4,626,897 A | 12/1986 | Sato et al. | |
| 4,642,678 A | 2/1987 | Cok | |
| 4,663,661 A | 5/1987 | Weldy et al. | |
| 4,989,959 A | 2/1991 | Plummer | |
| 5,373,322 A | 12/1994 | Laroche et al. | |
| 5,382,976 A | 1/1995 | Hibbard | |
| 5,477,381 A | 12/1995 | Sasaki et al. | |
| 5,541,653 A | 7/1996 | Peters et al. | |
| 5,552,827 A | 9/1996 | Maenaka et al. | |
| 6,111,608 A | 8/2000 | Koizumi et al. | |
| 6,392,803 B2 | 5/2002 | Osawa | |
| 6,549,336 B2* | 4/2003 | Tamaru et al. | 359/489.09 |
| 6,563,538 B1 | 5/2003 | Utagawa | |
| 6,836,572 B2 | 12/2004 | Ishiga et al. | |
| 7,362,897 B2 | 4/2008 | Ishiga | |
| 7,391,903 B2 | 6/2008 | Ishiga | |
| 7,565,007 B2 | 7/2009 | Ishiga | |
| 2005/0174467 A1 | 8/2005 | Kawai | |
| 2005/0270401 A1 | 12/2005 | Hatano | |
| 2006/0018032 A1* | 1/2006 | Mihara | 359/676 |
| 2006/0092298 A1 | 5/2006 | Ishiga | |
| 2007/0070225 A1* | 3/2007 | Sei et al. | 348/273 |
| 2007/0268375 A1* | 11/2007 | Robinson et al. | 348/222.1 |
| 2008/0037125 A1 | 2/2008 | Takamiya | |
| 2011/0001866 A1* | 1/2011 | Katsuda et al. | 348/335 |

FOREIGN PATENT DOCUMENTS

| | | |
|---|---|---|
| EP | 1 758 404 A1 | 2/2007 |
| JP | Y-47-018689 | 6/1972 |
| JP | B-51-014033 | 5/1976 |
| JP | A-06-098252 | 4/1994 |
| JP | A-2002-156608 | 5/2002 |
| JP | A-2004-007164 | 1/2004 |
| JP | A-2006-080845 | 3/2006 |
| WO | WO 2004/112401 A1 | 12/2004 |
| WO | WO 2005/117453 A1 | 12/2005 |

OTHER PUBLICATIONS

Landau et al., "The Classical Theory of Fields," Fourth Revised English Edition; Course of Theoretical Physics, pp. 154-157, vol. 2, Section 58.

Optical and Electra-Optical Engineering, vol. 41, No. 9, pp. 3-12 (corresponding to pp. 521-530), 2003 (translation of pp. 7-10).

Written Opinion of the International Searching Authority issued in International Application No. PCT/JP2008/071244 on Mar. 3, 2009.

International Search Report issued in International Application No. PCT/JP2008/071244 on Mar. 3, 2009.

* cited by examiner

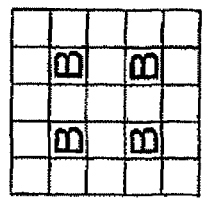
FIG.1A
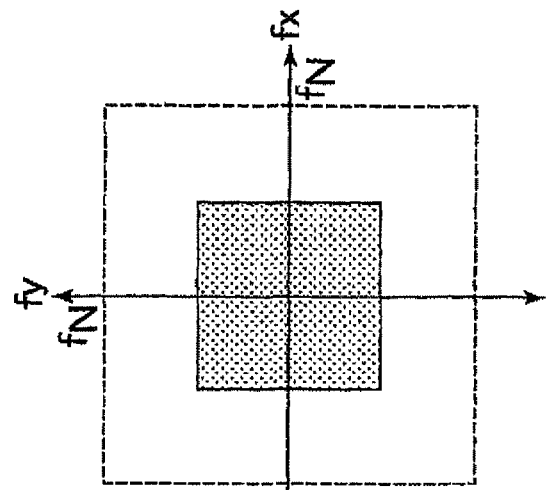
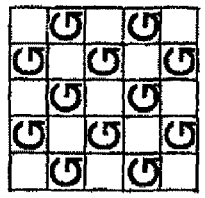
FIG.1B
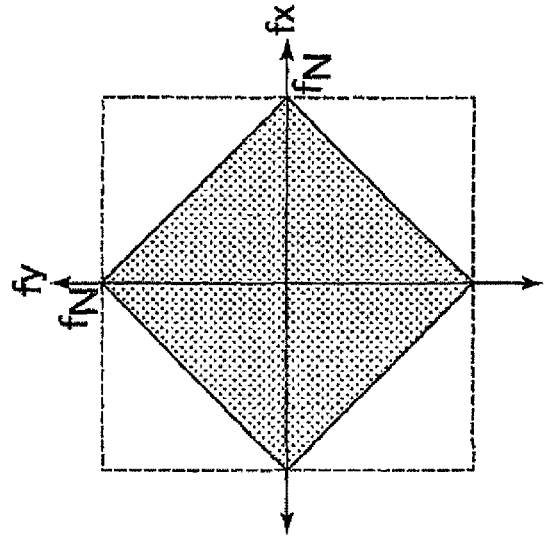
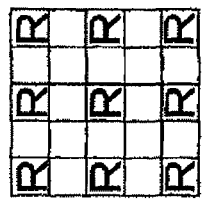
FIG.1C
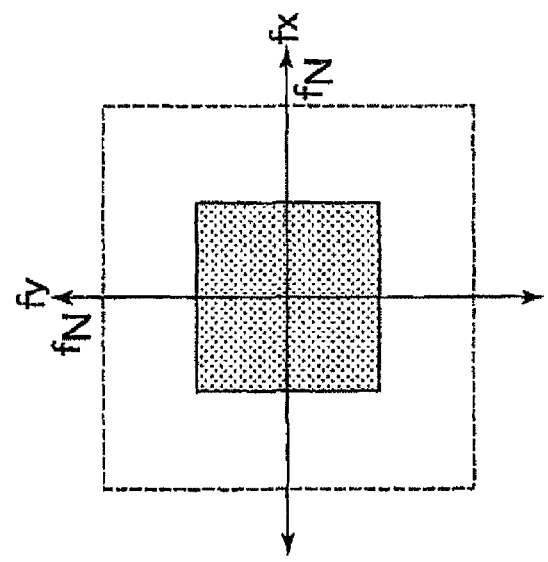

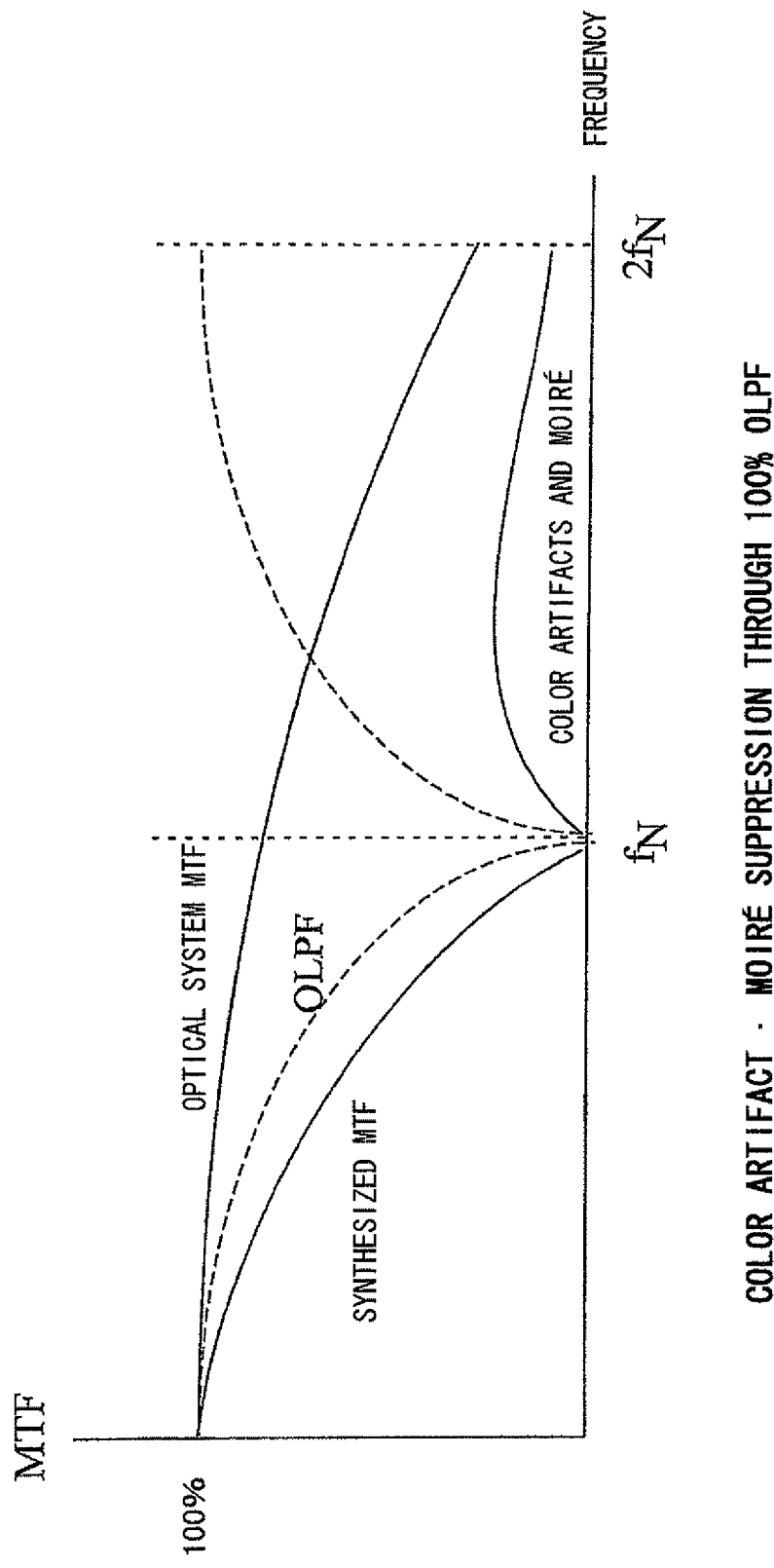

FIG.5

VERTICAL/HORIZONTAL BIDIRECTIONAL OPTICAL LOW PASS FILTER STRUCTURES

| SHORTHAND NOTATION | LIGHT BEAM SHIFT QUANTITY |
|---|---|
| 100%hv | $(a,0) \otimes (0,a)$ |
| 133%hv | $((3/4)a,0) \otimes (0,(3/4)a)$ |
| 141%hv | $((1/\sqrt{2})a,0) \otimes (0,(1/\sqrt{2})a)$ |
| 150%hv | $((2/3)a,0) \otimes (0,(2/3)a)$ |
| 167%hv | $((3/5)a,0) \otimes (0,(3/5)a)$ |
| 200%hv | $((1/2)a,0) \otimes (0,(1/2)a)$ |
| 250%hv | $((2/5)a,0) \otimes (0,(2/5)a)$ |
| 282%hv | $((1/2\sqrt{2})a,0) \otimes (0,(1/2\sqrt{2})a)$ |
| $\alpha \times 100\%hv$ | $(a/\alpha,0) \otimes (0,a/\alpha)$ |

FIG.7

DIAGONAL BIDIRECTIONAL OPTICAL LOW PASS FILTER STRUCTURES

| SHORTHAND NOTATION | LIGHT BEAM SHIFT QUANTITY |
|---|---|
| 141%dd | $((1/2)a,+(1/2)a) \otimes ((1/2)a,-(1/2)a)$ |
| 200%dd | $((1/2\sqrt{2})a,+(1/2\sqrt{2})a) \otimes ((1/2\sqrt{2})a,-(1/2\sqrt{2})a)$ |
| 282%dd | $((1/4)a,+(1/4)a) \otimes ((1/4)a,-(1/4)a)$ |
| $\alpha \times 100\%dd$ | $(1/\sqrt{2})(a/\alpha,+a/\alpha) \otimes (1/\sqrt{2})(a/\alpha,-a/\alpha)$ |

FIG.9

VERTICAL UNIDIRECTIONAL OPTICAL LOW PASS FILTER STRUCTURES

| SHORTHAND NOTATION | LIGHT BEAM SHIFT QUANTITY |
|---|---|
| 100%v | (0,a) |
| 133% v | (0,(3/4)a) |
| 167% v | (0,(3/5)a) |
| 200% v | (0,(1/2)a) |
| $\alpha \times 100\%$ v | (0,a/$\alpha$) |

FIG.11A  Integral of OLPF Power Spectrum
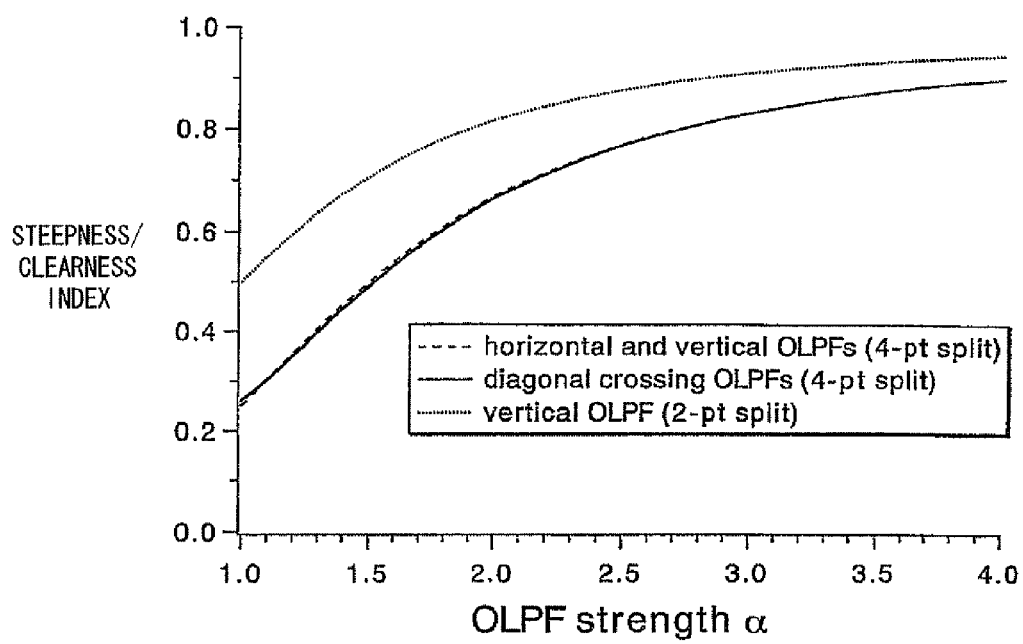
FIG.11B
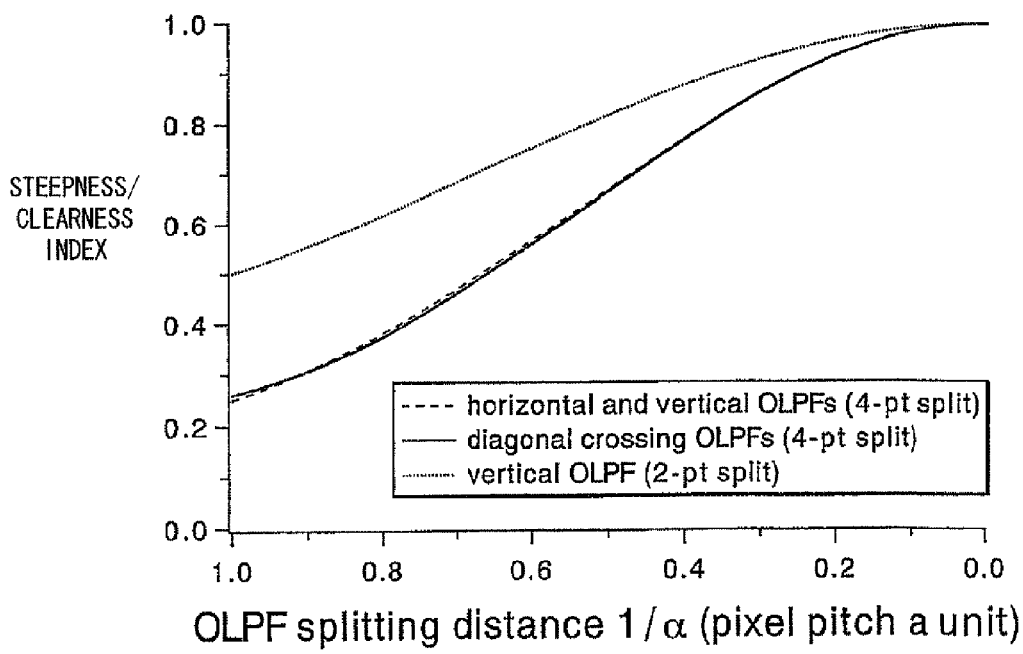

FIG.12

| OLPF STRUCTURE | STEEPNESS INDEX |
|---|---|
| 100%hv | 0.2500 |
| 133%hv | 0.4226 |
| 141%dd | 0.4526 |
| 100%v | 0.5000 |
| 133%v | 0.6501 |
| NO OLPF | 1.0000 |

FIG.19

| PIXEL PITCH AT IMAGE SENSOR | CORRESPONDING NYQUIST FREQUENCY |
|---|---|
| 1 μm/pixel | 500 LINES/mm |
| 2 μm/pixel | 250 LINES/mm |
| 3 μm/pixel | 167 LINES/mm |
| 4 μm/pixel | 125 LINES/mm |
| 5 μm/pixel | 100 LINES/mm |
| 6 μm/pixel | 83 LINES/mm |
| 8 μm/pixel | 63 LINES/mm |
| 12 μm/pixel | 42 LINES/mm |

Wave Optics without Geometry
Contrast at Nyquist Frequency
(Theoretical prediction)

Diaphragm Effects
AT THE IMAGE CENTER AND BEST FOCUSING POINT

Simulation within Geometric Optics

Geometric Optics
Contrast at Nyquist Frequency
(PSF simulation and observation)

Wave Optics with Geometry
Convolved Contrast at Nyquist Frequency
(rough estimation)

Diaphragm Effects
AT THE IMAGE CENTER AND BEST FOCUSING POINT

FIG.24

| PIXEL PITCH | CONTRAST (GEOMETRICAL OPTICS :ABERRATION) | CONTRAST (WAVE OPTICS: ABERRATION-FREE) | CONTRAST (SYNTHESIZED DATA) |
|---|---|---|---|
| | F8 | F8 | F8 |
| 12μm/pixel | 0.981±0.06 | 0.87±0.005 | 0.853±0.052 |
| 8μm/pixel | 0.962±0.06 | 0.67±0.005 | 0.645±0.040 |
| 6μm/pixel | 0.901±0.06 | 0.55±0.005 | 0.496±0.033 |
| 5μm/pixel | 0.861±0.06 | 0.47±0.005 | 0.405±0.029 |
| 4μm/pixel | 0.822±0.06 | 0.35±0.005 | 0.288±0.021 |
| 3μm/pixel | 0.742±0.06 | 0.17±0.005 | 0.126±0.011 |
| 2μm/pixel | 0.562±0.06 | 0.05±0.005 | 0.028±0.004 |
| 1μm/pixel | 0.266±0.06 | 0.005±0.005 | 0.0013±0.0014 |

FIG.25

| PIXEL PITCH | CONTRAST (GEOMETRICAL OPTICS :ABERRATION) | CONTRAST (WAVE OPTICS: ABERRATION-FREE) | CONTRAST (SYNTHESIZED DATA) |
|---|---|---|---|
| | F2.8 | F2.8 | F2.8 |
| 12μm/pixel | 0.862±0.06 | 0.96±0.005 | 0.828±0.058 |
| 8μm/pixel | 0.743±0.06 | 0.88±0.005 | 0.654±0.053 |
| 6μm/pixel | 0.663±0.06 | 0.84±0.005 | 0.557±0.051 |
| 5μm/pixel | 0.582±0.06 | 0.81±0.005 | 0.471±0.049 |
| 4μm/pixel | 0.483±0.06 | 0.77±0.005 | 0.372±0.046 |
| 3μm/pixel | 0.307±0.06 | 0.68±0.005 | 0.209±0.041 |
| 2μm/pixel | 0.111±0.06 | 0.53±0.005 | 0.059±0.032 |
| 1μm/pixel | 0.0715±0.06 | 0.27±0.005 | 0.019±0.016 |

| PIXEL PITCH | OLPF STRUCTURE (SUFFICIENT CONDITIONS) |
|---|---|
| 6um/pixel | =100%v |
| 5um/pixel | ≧110%v |
| 4um/pixel | ≧133%v |
| 3um/pixel | ≧167%v |
| 2um/pixel | NO OLPF |
| 1um/pixel | NO OLPF |

| PIXEL PITCH | OLPF STRUCTURE (SUFFICIENT CONDITIONS) |
|---|---|
| >6um/pixel | ≈115% hv |
| 6um/pixel | ≈120% hv |
| 5um/pixel | ≧125% hv |
| 4um/pixel | ≧145% hv |
| 3um/pixel | ≧200% hv |
| 2um/pixel | NO OLPF |
| 1um/pixel | NO OLPF |

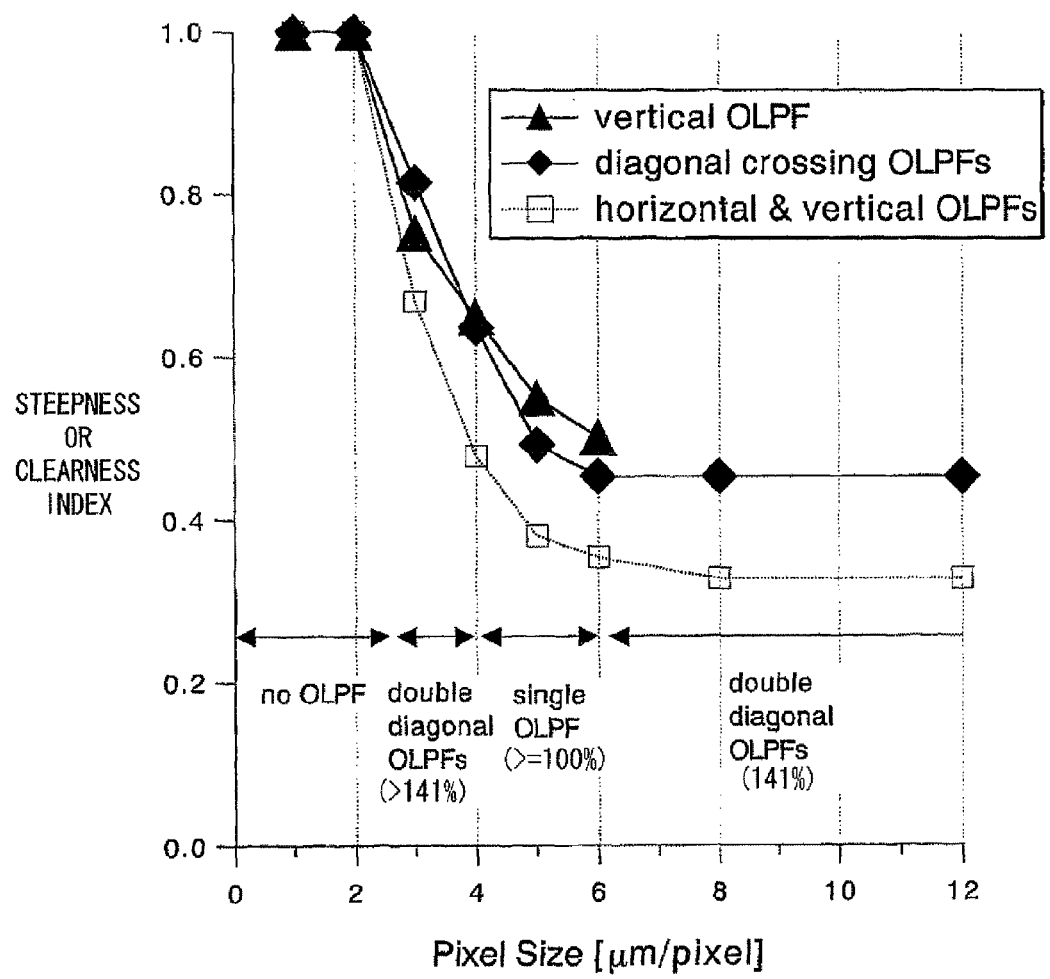

FIG.31

| PIXEL PITCH | OLPF STRUCTURE (SUFFICIENT CONDITIONS) | STEEPNESS INDEX |
|---|---|---|
| >6um/pixel | =144%dd | =0.4526 |
| 6um/pixel | =100%v | =0.5000 |
| 5um/pixel | ≧110%v | ≧0.5493 |
| 4um/pixel | ≧190%dd | ≧0.6368 |
| 3um/pixel | ≧283%dd / NO OLPF | ≧0.8144/1.0000 |
| 2um/pixel | NO OLPF | 1.0000 |
| 1um/pixel | NO OLPF | 1.0000 |

FIG.32

BAYER ARRAY

| R • | G • | R • | G • | R • | G • |
|---|---|---|---|---|---|
| G • | B • | G • | B • | G • | B • |
| R • | G • | R • | G • | R • | G • |
| G • | B • | G • | B • | G • | B • |
| R • | G • | R • | G • | R • | G • |
| G • | B • | G • | B • | G • | B • |

DIGITAL CAMERA AND DIGITAL CAMERA SYSTEM

This application is a continuation in part of International Application No. PCT/JP2008/071244 filed Nov. 21, 2008.

INCORPORATION BY REFERENCE

The disclosures of the following applications are herein incorporated by reference: Japanese Patent Application No. 2007-302777 filed Nov. 22, 2007; Japanese Patent Application No. 2008-298124 filed Nov. 21, 2008; and International Application No. PCT/JP2008/071244 filed Nov. 21, 2008.

TECHNICAL FIELD

The present invention relates to a digital camera and a digital camera system, equipped with an optical filter.

BACKGROUND ART

A digital camera converts an analog image formed through a lens to digital signals through sampling based upon the Nyquist sampling theorem. The high-frequency component in a range equal to and above a Nyquist frequency is folded at the first Brillouin zone, i.e., a zone well known in solid-state physics and is recognized as a low-frequency component, resulting in the occurrence of moiré attributable to a phenomenon referred to as the aliasing effect. In addition, color moiré also occurs at a single-plate color image sensor with color filters arrayed therein, due to the variance among color filter densities and the phase difference among the color filters.

The phenomenon of color moiré including an erroneous estimate made during color interpolation is usually referred to as the term "color artifact". While a color artifact attributable to aliasing may be caused by an erroneous estimate made in chrominance component interpolation during color interpolation processing, it is normally difficult to distinguish such color artifacts from actual present color, based upon the interpolation algorithm. In addition, an interpolation estimate error attributable to aliasing of the luminance component is often referred to as spurious resolution or false image structure. Such false image structure, too, cannot be easily distinguished from an actual image structure based upon the interpolation algorithm.

FIGS. 1A-1C present diagrams of the frequency resolution ranges, i.e., the first Brillouin zones, of signals sampled in a Bayer array, whereas FIG. 2 schematically illustrates how aliasing resulting in color artifacts and false image structure may occur in a frequency range close to the Nyquist frequency. FIG. 1A is a diagram of the first Brillouin zone corresponding to the R component signals sampled in the Bayer array, FIG. 1B is a diagram of the first Brillouin zone corresponding to the G component signals sampled in the Bayer array and FIG. 1C is a diagram of the first Brillouin zone corresponding to the B component signals sampled in the Bayer array. Examples of diagrams of the first Brillouin zones for another color filter array, such as the delta array, are included in patent reference 1 disclosing an application having been submitted by the inventor of the present invention.

Under normal circumstances, once the color filter array is determined, central points (hereafter referred to as polar points) at which color artifacts•false image structure manifest in the frequency space (k space) can be automatically ascertained. Such a polar point appears at a corner of the polygon defining a first Brillouin zone and also appears at a middle point of a line segment defining part of the polygonal shape in the case of a square lattice. A circular zone plate (CZP) image exactly corresponds to a diagram of the resolution range for the k space, and FIG. 3 presents an example of polar points of color artifacts that may manifest when an achromatic CZP image is captured with an image sensor assuming the Bayer array.

It is known in the related art that color artifacts can be suppressed through color interpolation processing executed on image signals having been filtered through an optical low pass filter (OLPF), before digitally imaging the high-frequency component, which is the root cause of aliasing. This concept is disclosed in, for instance, patent reference 2, patent reference 3 and patent reference 4. Namely, in the case of a square lattice, four-point split may be achieved at a given polar point through two light beam separations, i.e., a horizontal split in correspondence to one pixel and a vertical split in correspondence to one pixel, so as to cancel out the frequency component at the particular polar point until the value of exactly 0 can be assumed for the MTF. This processing may be referred to as 100% OLPF in the sense that an MTF dip of an extinction frequency band is created at a frequency position equivalent to 100% of the Nyquist frequency by shifting the light beam by an extent exactly matching a one-pixel pitch and, for convenience, the processing may be notated as "100% hv" as the filter processing is executed along two directions, i.e., along the longitudinal (vertical) direction and the lateral (horizontal) direction. A schematic graph (the dotted line indicated as the OLPF) of the 100% OLPF is also included in FIG. 2.

Patent reference 5, relating to a single lens reflex camera used with exchangeable lenses, discloses a method for reducing the adverse effects of an aberration due to the difference in the optical path length attributable to different thicknesses assumed at four-point split type optical low pass filters which are achieved in conjunction with two cameras having different pixel pitches, e.g., a camera equipped with a 7 μm/pixel image sensor and another equipped with a 5 μm/pixel image sensor, and assume beam separation widths substantially matching the respective pixel pitches.

The publication includes descriptions (paragraphs [0007] and [0226]), given in reference to FIG. 18, that it is a commonly practiced routine in optical low pass filter use to set the light beam separation width in a range close to the pixel pitch in order to minimize the extent of moiré. Namely, it expounds upon the concept that no matter how the pixel pitch changes over a range of an 8.92 μm/pixel pitch through a 4.88 μm/pixel pitch, as shown in FIG. 18, the frequency at the position assuming a constant ratio relative to the Nyquist frequency should be killed with regard to the light beam separation width.

Patent reference 1: Japanese Laid Open Patent Publication No. 2004-7164

Patent reference 2: Japanese examined utility model publication No. S47-18689

Patent reference 3: U.S. Pat. No. 4,626,897

Patent reference 4: U.S. Pat. No. 4,663,661

Patent reference 5: US Laid Open Patent Application No. 2005/0174467

DISCLOSURE OF THE INVENTION

Problems to be Solved by the Invention

As described above, unless the extinction frequency band of an optical low pass filter is set close to the Nyquist frequency, the moiré-inducing carriers generated in the frequency band cannot be extinguished, which would defeat the purpose of the filter. Accordingly, in the related art, the extinction frequency is set near the Nyquist frequency as a matter of course. Design details have been accordingly formulated by various manufacturers within a range conforming to this concept. However, no systematic research with regard to any problems that may occur in the image quality as the pixel pitch is reduced beyond 5 μm/pixel to 4 μm/pixel or 3 μm/pixel in a single lens reflex photographing environment, has been conducted. Namely, none of the following has been found; the specific change that will occur in the level of the Nyquist frequency color artifact spurious resolution, the most crucial issue to be addressed with respect to the overall image quality, any measure that may be applied to address the issue and an exact limit to the miniaturization of pixels, i.e., the number of pixels that the image sensor can be equipped with, at which such a measure can still be applied.

Accordingly, the present invention provides a method that will allow further pursuit of equipping an existing single lens reflex system with a greater number of pixels by examining the issues outlined above and ascertaining the specific characteristics distinct in the particular application.

Means for Solving the Problems

According to the 1st aspect of the present invention, a digital camera comprises: a lens unit that forms a subject image on an imaging plane; an image sensor that includes color filters each disposed at one of pixels disposed in a lattice-like pattern over pixel intervals (a, b) along two directions, an x direction and a y direction, extending perpendicular to each other, with color filters corresponding to a first color component among first through nth ($n \geq 2$) color components, disposed in a checkered pattern at pixels amounting to at least half an entire color filter density and color filters corresponding to remaining color components disposed at other pixels, and outputs image signals expressing the subject image; and an optical low pass filter unit at which light having passed through the lens unit and yet to enter the image sensor undergoes light beam separation along two diagonal directions $((1/2)a, (1/2)b) \times (\sqrt{2}/\alpha)$ and $((1/2)a, -(1/2)b) \times (\sqrt{2}/\alpha)$ relative to (x, y) coordinate axes, so as to achieve frequency modulation for the subject image to become extinct at a band formed by connecting spatial frequencies $(\alpha/(2a), 0)$ and $(0, \alpha/(2b))$ at positions calculated by multiplying, by a multiplier α, a Nyquist frequency $1/(2a)$ and a Nyquist frequency $1/(2b)$ at the image sensor assumed respectively along the x direction and the y direction. When the pixel intervals (a, b) assumed along the two directions at the image sensor are both within a 2.5~5 μm/pixel range, a position of an extinction frequency band is set for the optical low pass filter by setting the multiplier α for the Nyquist frequencies at the image sensor within a range of $1.5 \leq \alpha \leq 3.5$.

According to the 2nd aspect of the present invention, in the digital camera according to the 1st aspect, it is preferred that when the pixel intervals (a, b) assumed along the two directions at the image sensor are 5±0.5 μm/pixel, the position of the extinction frequency band is set for the optical low pass filter by setting the multiplier α within a range of $1.5 \leq \alpha \leq 1.9$.

According to the 3rd aspect of the present invention, in the digital camera according to the 1st or the 2nd aspect, it is preferred that when the pixel intervals (a, b) assumed along the two directions at the image sensor are 4±0.5 μm/pixel, the position of the extinction frequency band is set for the optical low pass filter by setting the multiplier α within a range of $1.9 \leq \alpha \leq 2.83$.

According to the 4th aspect of the present invention, in the digital camera according to any one of the 1st through 3rd aspects, it is preferred that when the pixel intervals (a, b) assumed along the two directions at the image sensor are 3±0.5 μm/pixel, the position of the extinction frequency band is set for the optical low pass filter by setting a multiplier α within a range of $2.83 \leq \alpha \leq 3.5$.

According to the 5th aspect of the present invention, a digital camera comprises: a lens unit that forms a subject image on an imaging plane; an image sensor that includes color filters each disposed at one of pixels disposed in a lattice-like pattern over pixel intervals (a, b) along two directions, an x direction and a y direction, extending perpendicular to each other, with color filters corresponding to a first color component among first through nth ($n \geq 2$) color components, disposed in a checkered pattern at pixels amounting to at least half an entire color filter density and color filters corresponding to remaining color components disposed at other pixels, and outputs image signals expressing the subject image; and an optical low pass filter unit at which light having passed through the lens unit and yet to enter the image sensor undergoes light beam separation along one direction, that is a vertical direction $(0, b/\alpha)$ relative to (x, y) coordinate axes, so as to achieve frequency modulation for the subject image to become extinct at a band at a spatial frequency $\alpha/(2b)$ assumed at a position calculated by multiplying, by a multiplier α, a Nyquist frequency $1/(2b)$ at the image sensor assumed along the y direction. When the pixel intervals (a, b) assumed along the two directions at the image sensor are both within a 2.5~5 μm/pixel range, a position of an extinction frequency band is set for the optical low pass filter by setting the multiplier α for the Nyquist frequency at the image sensor within a range of $1.1 \leq \alpha \leq 2.0$.

According to the 6th aspect of the present invention, in the digital camera according to the 5th aspect, it is preferred that when the pixel intervals (a, b) assumed along the two directions at the image sensor are 5±0.5 μm/pixel, the position of the extinction frequency band is set for the optical low pass filter by setting the multiplier α within a range of $1.1 \leq \alpha \leq 1.33$.

According to the 7th aspect of the present invention, in the digital camera according to the 5th or the 6th aspect, it is preferred that when the pixel intervals (a, b) assumed along the two directions at the image sensor are 4±0.5 μm/pixel, the position of the extinction frequency band is set for the optical low pass filter by setting the multiplier a within a range of $1.33 \leq \alpha \leq 1.67$.

According to the 8th aspect of the present invention, in the digital camera according to any one of the 5th through 7th aspects, it is preferred that when the pixel intervals (a, b) assumed along the two directions at the image sensor are 3±0.5 μm/pixel, the position of the extinction frequency band is set for the optical low pass filter by setting the multiplier α within a range of $1.67 \leq \alpha \leq 2.0$.

According to the 9th aspect of the present invention, a digital camera comprises: a lens unit that forms a subject image on an imaging plane; an image sensor that includes color filters each disposed at one of pixels disposed in a lattice-like pattern over pixel intervals (a, b) along two directions, an x direction and a y direction; extending perpendicular to each other, with color filters corresponding to a first color component among first through nth ($n \geq 2$) color components, disposed in a checkered pattern at pixels amounting to at least half an entire color filter density and color filters corresponding to remaining color components disposed at other the pixels, and outputs image signals expressing the subject image; and an optical low pass filter unit at which light having passed through the lens unit and yet to enter the image sensor undergoes light beam separation along two directions, that are a vertical direction (a/α, 0) and a horizontal direction (0, b/α) relative to (x, y) coordinate axes so as to achieve frequency modulation for the subject image to become extinct at bands corresponding to spatial frequencies (α/(2a), 0) and (0, α/(2b)) at positions calculated by multiplying, by a multiplier α, a Nyquist frequency 1/(2a) and a Nyquist frequency 1/(2b) at the image sensor assumed respectively along the x direction and the y direction. When the pixel intervals (a, b) assumed along the two directions at the image sensor are both within a 2.5 ~4 μm/pixel range, a position of an extinction frequency band is set for the optical low pass filter by setting the multiplier α for the Nyquist frequencies at the image sensor within a range of $1.45 \leq \alpha \leq 2.5$.

According to the 10th aspect of the present invention, in the digital camera according to the 9th aspect, it is preferred that when the pixel intervals (a, b) assumed along the two directions at the image sensor are 4±0.5 μm/pixel, the position of the extinction frequency band is set for the optical low pass optical filter by setting the multiplier α within a range of $1.45 \leq \alpha \leq 2.0$.

According to the 11th aspect of the present invention, in the digital camera according to the 9th or the 10th aspect, it is preferred that when the pixel intervals (a, b) assumed along the two directions at the image sensor are 3±0.5 μm/pixel, the position of the extinction frequency band is set for the optical low pass filter by setting the multiplier a within a range of $2.0 \leq \alpha \leq 2.5$.

According to the 12th aspect of the present invention, in the digital camera according to any one of the 1st, 5th and 9th aspects, it is preferred that the lens unit achieves a lens speed corresponding to a number of maximum aperture of at least F2.8 or brighter and is equipped with an aperture mechanism capable of variable aperture control over a range between the number of maximum aperture through a number equal to or greater than F8.

According to the 13th aspect of the present invention, in the digital camera according to the 12th aspect, it is preferred that the lens unit assumes at least one focal length within a range of 50 mm through 200 mm.

According to the 14th aspect of the present invention, in the digital camera according to the 12th aspect, it is preferred that the lens unit is an exchangeable lens unit that can be replaced with any one of a plurality of types of lenses.

According to the 15th aspect of the present invention, in the digital camera according to the 14th aspect, it is preferred that the lens unit allows a set of exchangeable lenses, that can be commonly used in film cameras and digital cameras, to be mounted thereat.

According to the 16th aspect of the present invention, in the digital camera according to any one of the 1st, 5th and 9th aspects, it is preferred that the image sensor assumes dimensions of 35 mm×24 mm, 23.4 mm×16.7 mm, 18 mm×13.5 mm, or dimensions therebetween.

According to the 17th aspect of the present invention, in the digital camera according to any one of the 1st, 5th and 9th aspects, it is preferred that the image sensor has color filters corresponding to a green color component disposed in a checkered pattern to account for half the entire color filter density with color filters corresponding to a red color component and a blue color component evenly distributed at other pixels.

According to the 18th aspect of the present invention, in the digital camera according to any one of the 1st, 5th and 9th aspects, it is preferred that the digital camera further comprises an image processing unit that calculates different-color similarity factors assuring resolution over a Nyquist frequency range in correspondence to each of the image signals output from the image sensor by using color signals corresponding to different color components, output from pixels present over minimum pixel intervals from each other at least along the two directions extending along an x-axis and a y-axis, determines based upon the different-color similarity factors a direction along which pronounced similarity manifests, and generates a color signal corresponding to at least one common color component for each pixel based upon similarity direction determination.

According to the 19th aspect of the present invention, in the digital camera according to the 18th aspect, it is preferred that the image processing unit generates a chrominance component based upon the similarity direction determination and generates data corresponding to at least one common color component for the pixels by executing adaptive smoothing processing on the chrominance component having been generated in correspondence to each pixel.

According to the 20th aspect of the present invention, in the digital camera according to the 18th or the 19th aspect, it is preferred that the image processing unit executes processing on a still image output from the image sensor.

According to the 21st aspect of the present invention, a digital camera system comprises: a digital camera according to any one of the 1st, 5th and 9th aspects; and an image processing unit that calculates different-color similarity factors assuring resolution over a Nyquist frequency range in correspondence to each of the image signals output from the image sensor of the digital camera by using color signals corresponding to different color components, output from pixels present over minimum pixel intervals from each other at least along the two directions extending along an x-axis and a y-axis, determines based upon the different-color similarity factors a direction along which pronounced similarity manifests, and generates a color signal corresponding to at least one common color component for each pixel based upon similarity direction determination.

According to the 22nd aspect of the present invention, in the digital camera system according to the 21st aspect, it is preferred that the image processing unit generates a chrominance component based upon the similarity direction determination and generates data corresponding to at least one common color component for the pixels by executing adaptive smoothing processing on the chrominance component having been generated in correspondence to each pixel.

According to the 23rd aspect of the present invention, in the digital camera system according to the 22nd or the 23rd aspect, it is preferred that the image processing unit executes processing on a still image output from the image sensor.

ADVANTAGEOUS EFFECT OF THE INVENTION

According to the present invention achieved by examining and analyzing the specific change in the effect of demosaicing processing executed on data obtained via a color filter array on spurious resolution•color artifacts, with respect to specific characteristics related to the pixel pitch dependency of lens groups used in the existing art, the utilization range of optical low pass filters is expanded over the related art and a specific operating range is clarified in correspondence to the optimal settings so as to provide a desirable demosaicing effect, assuring high image quality with a minimum of spurious resolution•color artifacts in conjunction with existing lens systems and to allow a further reduction in the pixel pitch at an image sensor that is still capable of providing a sharply focused, powerful photographic image.

BRIEF DESCRIPTION OF THE DRAWINGS

FIGS. 1A-1C show diagrams of the frequency resolution ranges of signals sampled in a Bayer array, i.e., diagrams of first Brillouin zones;

FIG. 2 shows a schematic illustration showing how aliasing resulting in color artifacts and spurious resolution may occur over a frequency range near the Nyquist frequency;

FIG. 5 shows a table listing typical examples of optical low pass filters that may be achieved in a first embodiment, with corresponding shorthand notations assigned thereto and the corresponding extents of shift required for beam separation (beam shift quantities);

FIG. 7 shows a table listing typical examples of optical low pass filters that may be achieved in a second embodiment, with corresponding shorthand notations assigned thereto and the corresponding extents of shift required for beam separation (beam shift quantity);

FIG. 9 shows a table listing typical examples of optical low pass filters that may be achieved in a third embodiment, with corresponding shorthand notations assigned thereto and the corresponding extents of shift required for beam separation (beam shift quantities);

FIGS. 11A, 11B show graphs each indicating a steepness index as a function of the optical low pass filter strength $\alpha$;

FIG. 12 shows a table listing typical values that may be calculated for the steepness and;

FIG. 19 shows a table listing typical correspondences between pixel pitches and Nyquist frequencies;

FIG. 24 shows a table of contrast values in FIGS. 20, 22 and 23 (F8);

FIG. 25 shows a table of contrast values in FIGS. 20, 22 and 23 (F2.8);

FIG. 30 shows graphs facilitating a comparison of steepness indices achieved by adopting the optical low pass filter structures in the first through third embodiments;

FIG. 31 shows optimal structures for the optical low pass filter in the fourth embodiment;

FIG. 32 shows color filters disposed in a Bayer array;

BEST MODE FOR CARRYING OUT THE INVENTION

The present invention provides the optimal optical filter design achieved in a perspective in which the lens MTF characteristics are factored in. More specifically, an optical low pass filter is designed by addressing issues inevitably bound to arise as the lens MTF characteristics applicable frequency range increases at a lens group used in conjunction with a single lens reflex camera assuming a variable aperture that includes an image sensor having a smaller pixel pitch, i.e., an image sensor equipped with a greater number of pixels. In addition, the present invention optimizes the characteristics of optical low pass filters by optimizing them in coordination with the interpolation algorithm, and more specifically, the present invention assures an improvement in the overall image quality by designing an optimal optical low pass filter based upon a specific interpolation algorithm.

(Basic Approach)

Before describing the embodiments, the basic concept of the present invention is described. The following description of the design of optical low pass filters embodying the basic concept of the present invention, the characteristics thereof compared to one another, test results obtained through geometrical optics simulation fluffier includes an in-depth observation substantiated by wave optics theory, so as to effectively demonstrate the background and the foundation that have allowed us to conceive the embodiments to be described later. While specific algorithms based upon which image processing is executed will be described in detail in reference to the embodiments, the comparison of a high-performance interpolation algorithm with that in the related art outlined below allows specific advantages achieved by using such an interpolation algorithm and specifically how the challenges arising from further reduced pixel pitches may be met by taking the most of the advantages, to be clearly demonstrated in the following description. The description is given by assuming that color filters are disposed in the most typical Bayer array (square array having a pixel pitch a).

Figure 3:
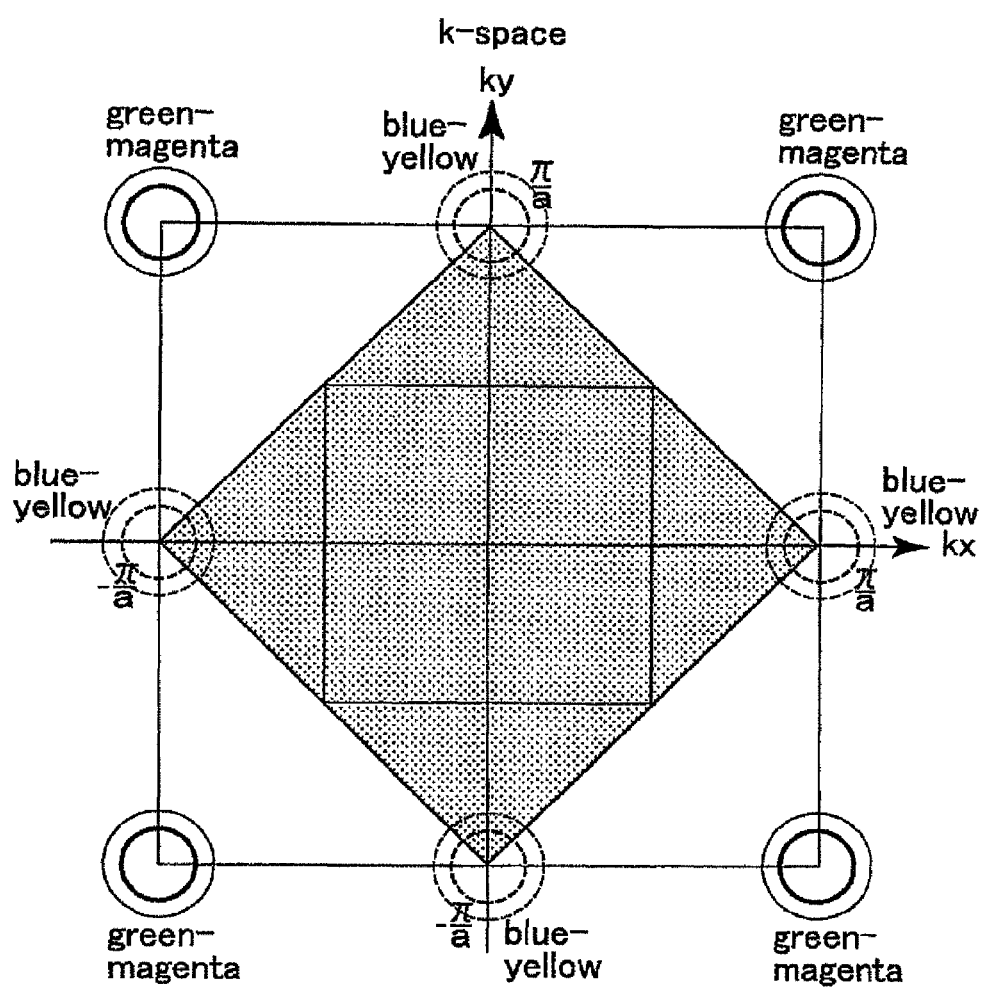
FIG. 3 shows an example of the different polar points of color artifacts manifesting as an achromatic CZP image is photographed via an image sensor assuming the Bayer array.

The interpolation algorithm in the related art, with which the directional decision is made simply based upon same-color correlation between same color data sampled over a two-pixel pitch interval allows significant color artifacts to occur around polar points centered on eight points in the first Brillouin zone in the k space (see FIG. 3). The positions of these polar points are identical to those of the polar points at which color artifacts originate, automatically determined in correspondence to the color filter array arrangement.

There are two types of color artifact. The first type of color artifact manifests as a color moiré pattern 1, which is a combination of blue and yellow appearing around vertical-line Nyquist frequencies ($\pm\pi/a$,0) and horizontal-line Nyquist frequencies (0, $\pm\pi/a$) in an achromatic resolution range, whereas the second type of color artifact manifests as a color moiré pattern 2, which is a combination of green and magenta appearing around diagonal-line Nyquist frequencies ($\pm\pi/a$, $\pm\pi/a$) and ($\pm\pi/a$, $-+\pi/a$) in an achromatic resolution range.

In addition, true resolution is achieved only within the rhombic area indicating the first Brillouin zone corresponding to the G component signals in FIG. 1B and spurious resolution manifests over the entire high-frequency band beyond the rhombic area. Accordingly, the inventor of the present invention discloses in U.S. Pat. No. 6,836,572 a technology whereby directional decision making is executed based upon different-color correlation of different color signals sampled over one-pixel pitch intervals without discriminating signals for their color components and proposes an effective method for taking full advantage of the technology in combination with same-color correlation. However, while the potential advantage of the technology is tremendous, its application requires extremely delicate handling and the publication does not provide practical measures against problems arising when processing luminance plane data, although it indicates a specific direction of advancement to be achieved through the technology.

A substantial and significant improvement is made over the technology through the color decision-making method disclosed by the inventor of the present invention in US 2004/0080639, and a technology that further combines the color gradient decision-making method disclosed by the inventor of the present invention in US 2006/0092298 is adopted in an embodiment of the present invention. By adopting these technologies in combination, an interpolation algorithm that successfully holds color artifact•spurious resolution to an extremely low level can be realized even when a very high MTF value and a very high contrast level are still observed at the Nyquist frequency.

Through the use of a different-color correlation-based algorithm that assures resolution for vertical-line and horizontal-line Nyquist frequencies, the color moiré pattern 1 in FIG. 3 can be completely eliminated and the appearance of the color moiré pattern 2 can be lessened. In addition, the spurious resolution manifesting outside the rhombic area in FIG. 1B mentioned earlier can be completely eliminated as far as the directional decision-making accuracy is concerned. These advantages can be considered to be independent of one another since the color artifact suppression effect is achieved based upon the different color correlation when generating chrominance component data and the spurious resolution suppression effect can be achieved based upon the different color correlation when generating luminance component data.

In this description, the phrase "completely eliminated" means that an error in the directional decision-making, which is the primary cause for the occurrence of spurious resolution or moiré, is eliminated. In addition, a slight estimation error, attributable to the absence of signals along a desired direction, which is bound to occur in interpolation value calculation no matter what technology is adopted as a countermeasure, is small enough to be insignificant as long as the optimal countermeasure technology is in effect, compared to the order of the directional decision-making error to result in color artifact•spurious resolution and accordingly, such an erroneous estimate is disregarded in the following description.

By generating chrominance component data and luminance component data based upon a different color correlation algorithm, a concern for the possible occurrence of color artifact•spurious resolution, which manifests around vertical•horizontal Nyquist frequencies ($\pm\pi/a$, 0) and (0, $\pm\pi/a$), is eliminated. This means that it is no longer necessary to kill the signal contrast (to make the signal contrast become extinct) in the particular frequency bands through an optical low pass filter in order to prevent the occurrence of color artifact color moiré in these ranges. In other words, a color interpolation algorithm environment, in which the occurrence of color artifact•spurious resolution is minimized even if the MTF assumes limited values over the frequency bands at the polar points where color moiré originates, is established. As a result, a new element of freedom is assured in optical low pass filter design and it becomes possible to completely focus on addressing any new challenges that may arise as the pixel pitch becomes smaller. Furthermore, an optimal optical low pass filter may be selected so as to focus the strength of the optical low pass filter over the diagonal Nyquist frequency ranges ($\pm\pi/a$, $\pm\pi/a$) and ($\pm\pi/a$, $-+\pi/a$) that cannot be eliminated through the different color correlation algorithm.

It is to be noted that the different color correlation may be referred to as a "different-color similarity" and that the same-color correlation may likewise be referred to as "same-color similarity" in the following description. The words "correlation" and "similarity" in such instances, are interchangeable. In addition, while the term "MTF" (modulation transfer function) is used substantially synonymously with "contrast" which can be transmitted via an optical system, strictly speaking, the term "MTF" can only be used when referring to specific circumstances under which certain restricting conditions are satisfied. Namely, the term can be used in the strictest sense only when superposition through further Fourier expansion is allowed for a light intensity distribution image having been calculated by further squaring an electromagnetic field that satisfies the principle of linear superposition.

Accordingly, the following description is given in reference to the contrast that allows for a looser definition.

(Optical Low Pass Filter Candidates and Contrast Characteristics Thereof)

As the schematic diagram in FIG. 2 clearly indicates, optical low pass filter application lowers the contrast in the signal intensity, i.e., the sharp definition and the resolution of the image, since the optical low pass filter lowers the MTF through a middle frequency range where the high MTF characteristics should be sustained. In other words, a trade-off relationship whereby one is sacrificed for the other exists between sharp definition and color artifact prevention at a single plate image sensor and the uncertainty principle in quantum mechanics must be taken into consideration when a spatial quantization operation, i.e., measurement through sampling, is scrutinized. Namely, the contrast and the color, assuming an uncertain relationship to each other, cannot be determined at the same time with a high level of accuracy and there is a limit to the level of accuracy with which desirable contrast characteristics and desirable color characteristics can be achieved at once, since the desirable characteristics of one tend to be achieved at the expense of the desirable characteristics of the other.

In conjunction with an image sensor assuming a square lattice array, top priority is given to color artifact suppression in the trade-off relationship mentioned above through application of a 100% by type OLPF, whereas no application of an OLPF is equivalent to giving top priority to contrast and sharp definition. The former corresponds to the characteristics curve presented by the solid line indicated as "synthesized MTF" in FIG. 2, whereas the latter corresponds to the characteristics curve represented by the solid line indicated as "optical system MTF" in FIG. 2. While substantial prevention of color artifact is achieved at the expense of excessive blurring in the former case, excellent definition is achieved in the latter case at the expense of frequent occurrence of color artifact•false image structure.

Accordingly, extinction frequency bands that are as close as possible to the frequency bands of the polar points (see FIG. 3) where color artifacts originate, which are automatically determined in correspondence to the color filter array arrangement in reality, must be set for the optical low pass filter. This restriction disallows any significant deviation from 100% while maintaining the vertical•horizontal double structure. In digital cameras in the related art, which give utmost priority to prevention of color artifacts and color moiré in still images, by low pass filters used in conjunction with the Bayer array must assume strengths close to 100% and the greatest deviation from the 100% allowed in such digital cameras is 133%.

1. Three Types of Optical Low Pass Filters Used in Simulation

As described above, optical low pass filters are normally used in ranges around the Nyquist frequencies in the related art. However, in order to determine whether or not there is an effective method for addressing the most fundamental and crucial challenges emerging as the pixel pitches at single lens reflex cameras are further reduced as described at the conclusion of the forgoing remarks, the intensity is set consecutively from a Nyquist frequency through the infinite frequency on purpose, unfettered by the preconception or the related art, so as to investigate whether or not the optical low pass filters function effectively over the Nyquist frequency ranges as the lens MTF changes relative to the pixel pitch dependency.

(First Mode: Hv Bidirectional)

Figure 4:
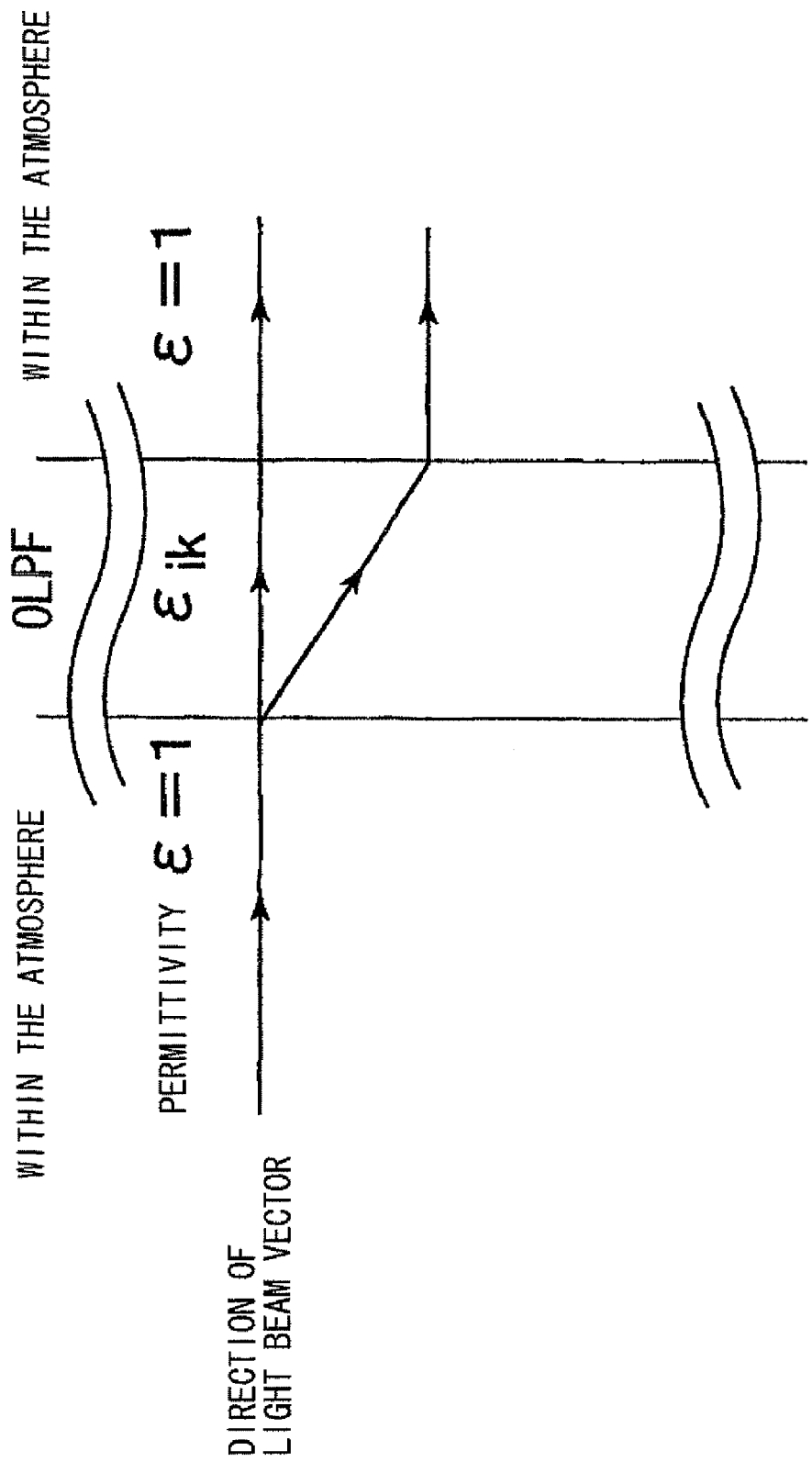
FIG. 4 shows a method that may be adopted when splitting a single light beam into two light beams, each assuming 50% intensity via a birefringence plate.

The optical low pass filter is often utilized in conjunction with a birefringence plate so as to separate a light beam into two light beams each assuming an intensity that is 50% that of the initial light beam (see FIG. 4). Accordingly, in the standard vertical/horizontal 100% separation method of the related art, a light beam is separated first via a birefringence plate into two light beams in correspondence to a single pixel along the vertical direction and then another birefringence plate is used to separate each of the two light beams in correspondence to a single pixel along the horizontal direction so as to obtain a total of four separate light beams through four-point split.

For purposes of convenience, a shorthand notation "100% hv" is used to refer to an optical low pass filter with which vertical/horizontal 100% four-point split is achieved in conjunction with two birefringence plates. An optical low pass filter that achieves a vertical/horizontal four-point split in correspondence to 3/4 pixels along the vertical and horizontal directions is assigned with a shorthand notation "133% hv", with 133 indicating the reciprocal of the separation width by adopting a percentage representation of the extinction frequency band thereof relative to the Nyquist frequencies.

Figure 6:
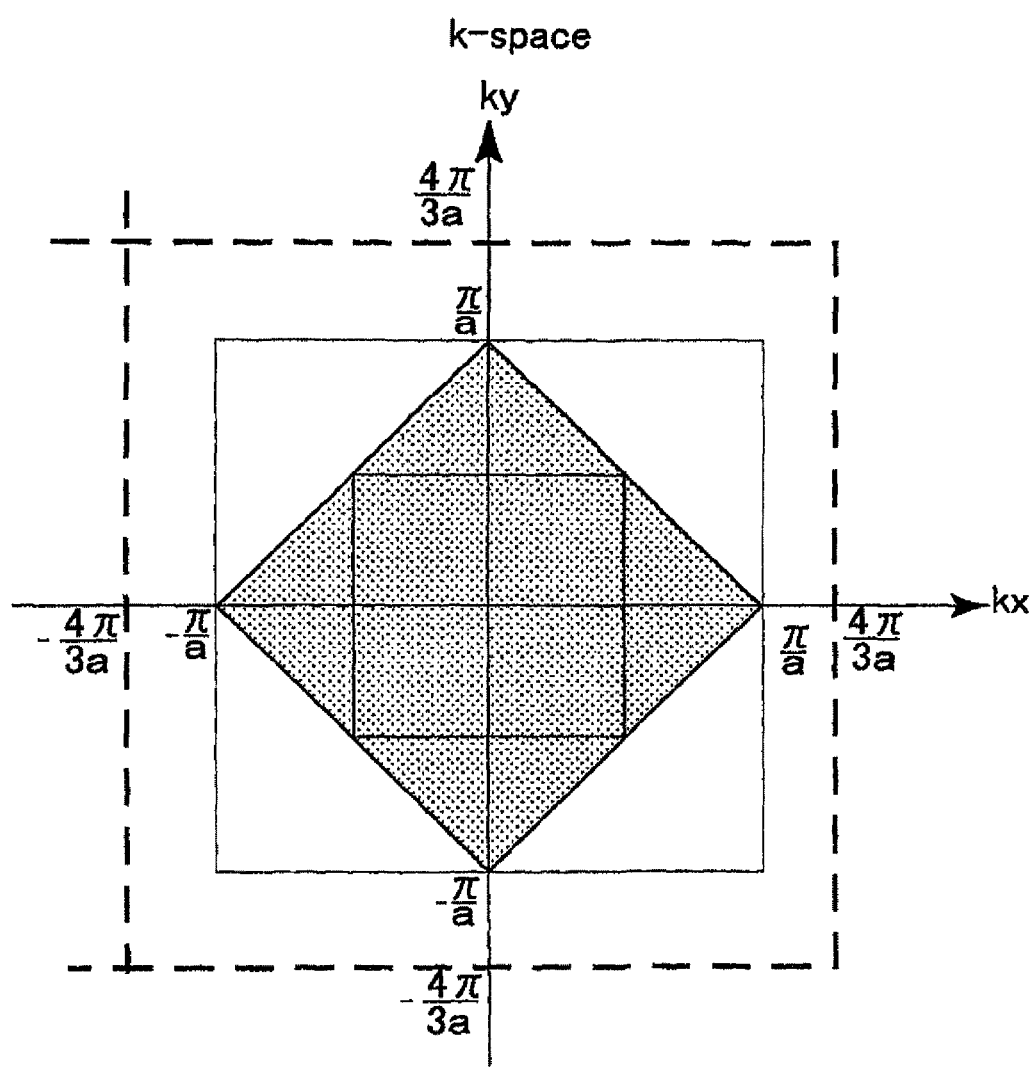
FIG. 6 shows a diagram of the k space corresponding to the 133% by and the real space displacement expression.

In the first mode, vertical/horizontal bidirectional four-point split optical low pass filters, similar to those in the related art, are achieved and their intensity levels, starting at 100%, are gradually reduced to finish at ∞%, in order to investigate the pixel pitch dependency and the image processing performance dependency. FIG. 5 presents a list of typical correspondences between the extents of light beam separation shift and optical low pass filters assigned with specific shorthand notations. In other words. FIG. 5 presents a table of typical examples of optical low pass filters that may be achieved in the first mode, each assigned with a specific shorthand notation, and the corresponding extents of light beam separation shift (light beam shift quantities). These optical low pass filters are used in the search for a solution that achieves both color moiré suppression and sharp definition as the pixel pitch is altered. FIG. 6 presents a k space diagram corresponding to the 133% hv optical low pass filter and the corresponding real space displacement expression.

Assuming that the pixels are disposed in a lattice-like array (grid array) at the image sensor with pixel intervals (pitch) (a, b) along two directions, i.e., along an x direction and a y direction, perpendicular to each other, the bands of the spatial frequencies ($\alpha/(2a)$, 0) and (0, $\alpha/(2b)$) at positions a times the positions of the Nyquist frequency $1/(2a)$ along the x direction and the Nyquist frequency $1/(2b)$ along the y direction at the image sensor are indicated by the dotted lines in FIG. 6, FIG. 6 presents an example in which $\alpha=133\%$ with a=b.

It is to be noted that separating a light beam via an optical low pass filter as described above is equivalent to completely killing the carrier (signal transmission capability) that transmits signals in the frequency band corresponding to the separation width, to be zero, and is also equivalent to creating an MTF characteristics dip over the extinction band.

(Second Mode: Dd Bidirectional)

The optical low pass filter types mentioned at the end of (Basic Approach) in the preceding section includes an optical low pass filter achieved by rotating the two birefringence plates in the first mode each by 45°, with the strength thereof starting at 141% and gradually lowered to ∞%. Since the light beam is separated along two diagonal directions, the optical low pass filter with 141% strength can be assigned with a shorthand notation "141% dd" for purposes of convenience. In the 141% dd low pass filter, the extinction frequency bands cross the diagonal Nyquist frequencies ($\pm\pi/a$, $\pm\pi/a$) and ($\pm\pi/a$, $-+\pi/a$) along the diagonal directions and the extinction frequency bands also cross the vertical/horizontal frequency axes at (±2π/a, 0) and (0, ±2π/a), i.e., positions exactly twice the positions of the vertical horizontal Nyquist frequencies.

Accordingly, a high level of contrast intensity is sustained around the vertical•horizontal Nyquist frequencies. The prevention of color artifact•spurious resolution around the vertical•horizontal Nyquist frequencies is achieved through high-performance image processing with which the occurrence of color artifact•spurious resolution can be effectively prevented even though the intense contrast is sustained over these ranges.

Figure 8:
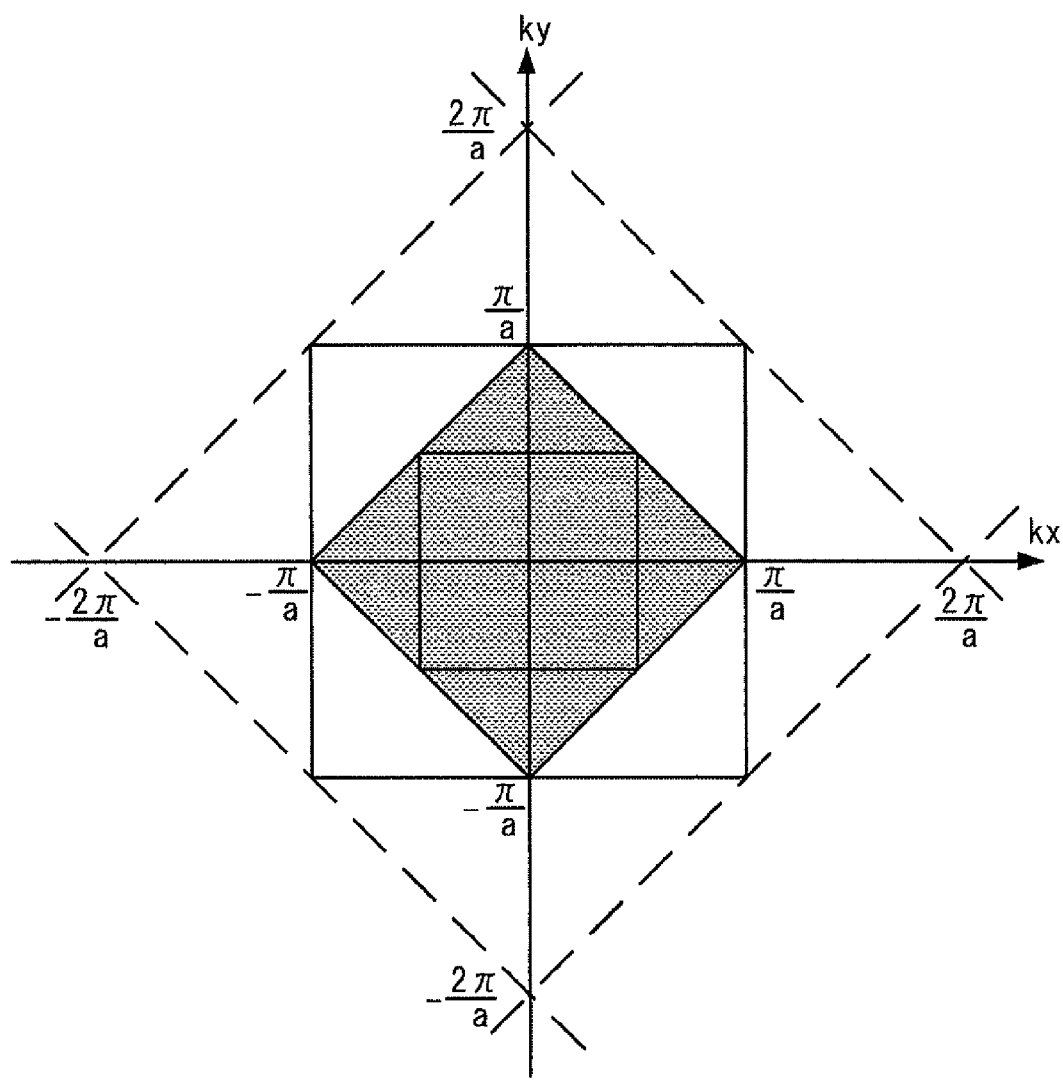
FIG. 8 shows a diagram of the k space corresponding to the 141% dd and the real space displacement expression.

FIG. 7 presents a list of typical correspondences between optical low pass filters with their intensity levels gradually lowered, assigned with specific shorthand notations, and the extents of light beam separation shift. It is to be noted that the percentage representation indicates the reciprocal of the Euclidean distance for the extent of light beam shift assumed along one direction. In other words, FIG. 7 presents a list of typical examples of optical low pass filters that may be achieved in the second mode, each assigned with a specific shorthand notation, and the corresponding extents of light beam separation shift (light beam shift quantities). These optical low pass filters are used in the search for a solution that achieves both color moiré suppression and sharp definition as the pixel pitch is altered. FIG. 8 presents a k space diagram corresponding to the 141% dd optical low pass filter and the corresponding real space displacement expression.

Assuming that the pixels are disposed in a lattice array at the image sensor with pixel intervals (pitch) (a, b) along two directions, i.e., along an x direction and a y direction, perpendicular to each other, the bands connecting the spatial frequencies ($\alpha/(2a)$, 0) and (0, $\alpha/(2b)$) at positions a times the Nyquist frequency $1/(2a)$ along the x direction and the Nyquist frequency $1/(2b)$ along the y direction at the image sensor are indicated by the dotted lines in FIG. 8. FIG. 8 presents an example in which $\alpha=141\%$ with a=b.

(Third Mode: V Unidirectional)

The optical low pass filter types mentioned at the end of (Basic Approach) in the preceding section also include that achieved in conjunction with only one of the two birefringence plates used in the first mode so as to achieve light beam separation along only one direction with a higher level of strength restored at 100% and then the strength gradually lowered to ∞%. While the issue of whether the vertical shift or the horizontal shift should be dispensed with needs to be resolved first, it has been statistically confirmed that image structures are more often expressed with vertical lines rather than horizontal lines due to the nature of gravitational stability and accordingly, it is more desirable to enhance vertical resolution. Accordingly, it is normally preferable to dispense with the horizontal shift.

An optical low pass filter via which vertical 100% two-point split is achieved may be assigned with a shorthand notation "100% v" for purposes of convenience. The extinction frequency bands of the 100% v low pass filter cross the diagonal Nyquist frequency bands exactly at the four polar points (±π/a, ±π/a) and (±π/a, -+π/a) thereupon and the vertical Nyquist frequency at the two polar points (0, ±π/a) thereupon. Accordingly, a high level of contrast intensity is sustained around the horizontal Nyquist frequencies (±π/a, 0) at the remaining two polar points. The prevention of color artifact•spurious resolution around the horizontal Nyquist frequency is achieved through high-performance image processing with which the occurrence of color artifact•spurious resolution can be effectively prevented even though the intense contrast is sustained over these ranges.

Figure 10:
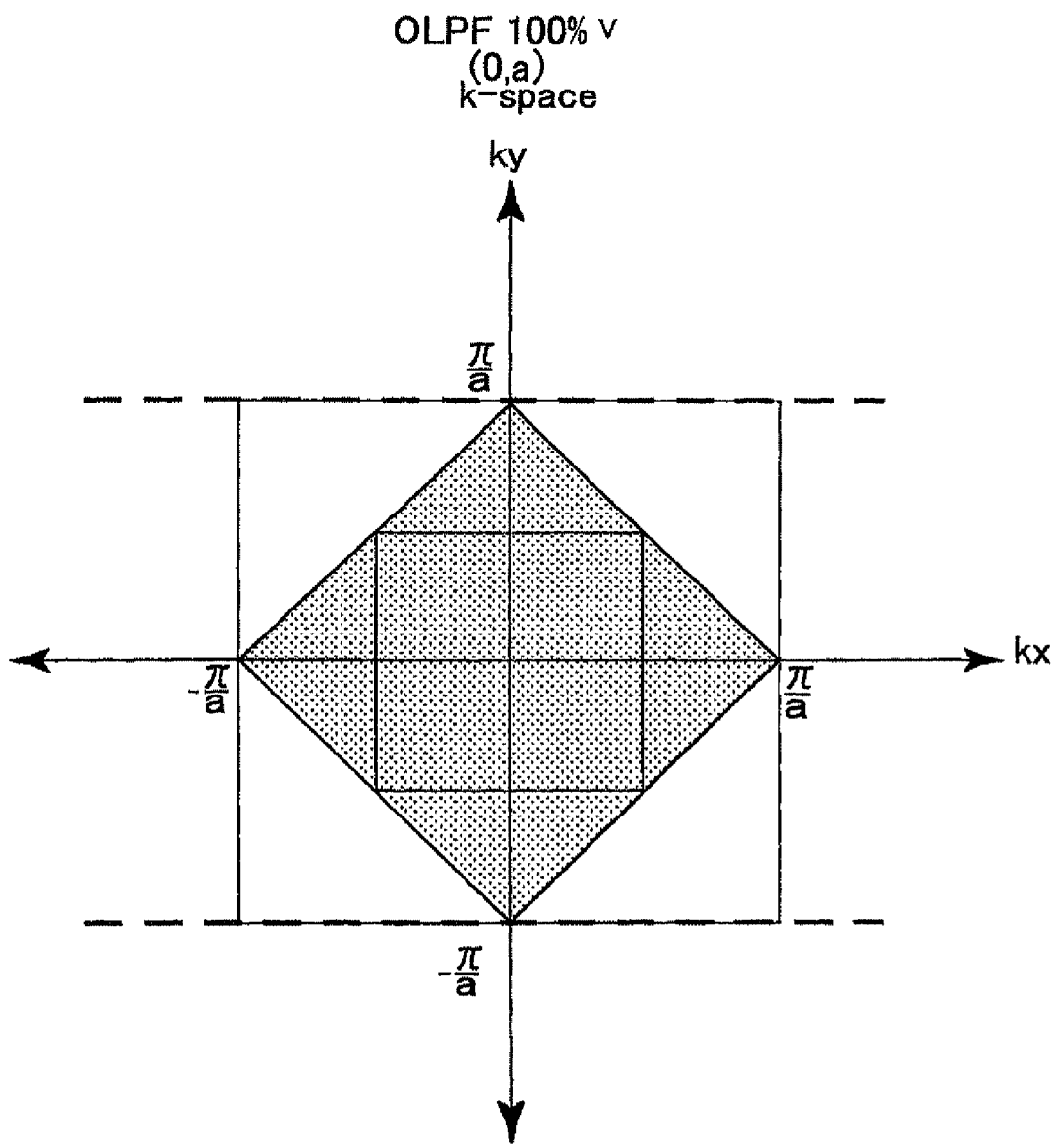
FIG. 10 shows a diagram of the k space corresponding to the 100% v and the real space displacement expression.

FIG. 9 presents a list of typical correspondences between optical low pass filters with their intensity levels gradually lowered, assigned with specific shorthand notations, and the extents of light beam separation shift. In other words, FIG. 9 presents a list of typical examples of optical low pass filters that may be achieved in the third mode, each assigned with a specific shorthand notation, and the corresponding extents of light beam separation shift (light beam shift quantities). These optical low pass filters are used in the search for a solution that achieves both color moiré suppression and sharp definition as the pixel pitch is altered. FIG. 10 presents a k space diagram corresponding to the 100% v optical low pass filter and the corresponding real space displacement expression.

Assuming that the pixels are disposed in a lattice array at the image sensor with pixel intervals (pitch) (a, b) along two directions, i.e., along an x direction and a y direction, perpendicular to each other, the band of the spatial frequency $\alpha/(2b)$ at a positions $\alpha$ times the position of the Nyquist frequency $1/(2b)$ along the y direction at the image sensor is indicated by the dotted line in FIG. 10. FIG. 10 presents an example in which $\alpha=100\%$ with a=b.

It is to be noted that the term "vertical Nyquist frequency" is used to refer to the Nyquist frequency on the vertical axis (y axis). However, since a Nyquist structure is formed with horizontal stripe lines at this position, the same Nyquist frequency may instead be referred to as a horizontal-line Nyquist frequency. Likewise, the term "horizontal Nyquist frequency" is used to mean "vertical-line Nyquist frequency".

2. Definition and Comparison of Sharp Definition

The contrast characteristics assumed at the various types of optical low pass filters are now examined. By using a model achieved based upon the principle of superposition applicable to the fields filled with plane waves formed with normal refracted waves and abnormal refracted waves output through a birefringence plate, the spectrums of energy in electromagnetic fields are calculated and the term "sharp definition" is defined by comparing the total sums of the state densities. This concept may be regarded as a deductive approach very close to wave optics approximation adopted when analyzing data that manifest marked deviation from geometrical optics theory. The optical low pass filter MTF characteristic functions often disclosed in publications in the related art are all obtained based upon geometrical optics models. A method that may be adopted to obtain such an MTF characteristic function is disclosed in, for instance, Japanese Patent Publication No. H51-14033. This method was conceived based upon the premise of incoherence normally applicable in birefringence and attributable to the polarization characteristics of two light beams, i.e., normal light and abnormal light, resulting from the birefringence. However, if the angle of incidence of light more often deviates from that of the perpendicular entry, as is often the case in the type of data we are contemplating, the light manifests marked wave characteristics due to wave reflection through the birefringence and angle dependency as set forth in the law of refraction, resulting in pronounced deviation from the geometrical optics model.

(Vertical/Horizontal Bidirectional Type)

The extent to which the light beam is separated in correspondence to a shift of $\alpha \times 100\%$ may be expressed as follows, as indicated in FIG. 5 as well. $\alpha$ represents the reciprocal of the separation width with the value of 1 taken as the separation width corresponding to the pixel pitch.

$$(\delta x, 0) \otimes (0, \delta y) = (a/\alpha, 0) \otimes (0, a/\alpha) \quad \text{[Expression 1]}$$

An electromagnetic field created with traveling light waves may be expressed as follows.

$$\psi_{\vec{k}}(\vec{r}) = \left\{ e^{i\vec{k}\cdot\vec{r}} + e^{i\vec{k}\cdot(\vec{r}+\delta_x\hat{x})} + e^{i\vec{k}\cdot(\vec{r}+\delta_y\hat{y})} + e^{i\vec{k}\cdot(\vec{r}+\delta_x\hat{x}+\delta_y\hat{y})} \right\}/4$$

$$= e^{i\vec{k}\cdot(\vec{r}+(\delta_x/2)\hat{x}+(\delta_y/2)\hat{y})} \cos\left(\frac{k_x\delta_x}{2}\right)\cos\left(\frac{k_y\delta_y}{2}\right)$$

[Expression 2]

With $\hat{x}$ and $\hat{y}$ respectively indicating the unit vectors taken along the x axis and the y axis within the real space.

The first term in the expression, which is an unsteady term, represents the traveling wave, whereas the second and subsequent terms, all steady terms, each represent frequency characteristics that can be transmitted. The intensity of light that can be actually measured with a sensor is determined in correspondence to the square of the electromagnetic field, i.e., the square of the absolute value representing the complex conjugate product. Its physical quantity expressed as a function in the frequency space (k space) is equivalent to the energy spectrum (power spectrum) and the signal intensity ratio of the signal intensities measured in the real space can be regarded as equivalent to the contrast. Only the squares of the absolute values in the second term and subsequent terms are substantially retained when the value of 1 is assumed for the first term by taking the complex conjugate product.

A subjective sharp-definition (steepness) index, indicating the level of strength of the optical low pass filter per unit pixel, is evaluated based upon an objective physical definition by integrating the power spectrum over the fundamental achromatic resolution reproduction range for the Bayer array, i.e., by integrating the lattice points formed with the basic lattice vectors (a, 0) and (0, a) in the real space over the first Brillouin zone $|k_x| \leq \pi/a$, $|k_y| \leq \pi/a$ within the reciprocal lattice space defined with the reciprocal lattice vectors ($2\pi/a$, 0) and (0, $2\pi/a$). Namely, $$|\psi_{\vec{k}}(\vec{r})| = \left|\cos\left(\frac{k_x\delta_x}{2}\right)\cos\left(\frac{k_y\delta_y}{2}\right)\right|$$

$$= \left|\cos\left(\frac{k_x a}{2\alpha}\right)\cos\left(\frac{k_y a}{2\alpha}\right)\right|$$

[Expression 3]

The sharp-definition index may be calculated as follows.

$$\text{steepness index} = \frac{a^2}{(2\pi)^2} \int_{|k_x|\leq\frac{\pi}{a},|k_y|\leq\frac{\pi}{a}} \psi_{\vec{k}}^*(\vec{r})\psi_{\vec{k}}(\vec{r})dk_x dk_y$$

$$= \left\{\frac{1}{2} + \frac{1}{2}\cdot\frac{\sin\left(\frac{\pi}{\alpha}\right)}{\left(\frac{\pi}{\alpha}\right)}\right\}^2$$

[Expression 4]

FIGS. 11A, 11B present graphs indicating the steepness indices each represented as a function of the optical low pass filter strength $\alpha$ corresponding to this type of optical low pass filter and the other types of optical low pass filters, the arithmetic expressions corresponding to which are to be presented later. In FIG. 11A, the optical low pass filter strength $\alpha$ is indicated along the horizontal axis whereas the steepness index is indicated along the vertical axis. In FIG. 11B, the reciprocal of the optical low pass filter strength $\alpha$ is assumed along the horizontal axis and the steepness index is indicated along the vertical axis. The optical low pass filter strength $\alpha$ is represented by the reciprocal of the separation width, which assumes the value of 1 in correspondence to the pixel pitch. Accordingly, the reciprocal of $\alpha$ is equivalent to the value obtained by normalizing the pixel pitch width to 1. While the expression provided above is formulated for the Bayer array, the integrating range should normally be set over the first Brillouin zone in the reciprocal lattice space corresponding to the basic lattice vectors in conjunction with any other color filter array. The definition of the first Brillouin zone and the method that may be adopted when calculating the first Brillouin zone are described in detail in Chapter 2 "Reciprocal lattice" in "Introduction to Solid-State Physics" (sixth edition) by Kittel.

(Diagonal Bidirectional Type)

The extent to which the light beam is separated in correspondence to a shift by $\alpha \times 100\%$ may be expressed as follows, as indicated in FIG. 7 as well.

$$(\delta x/2, \delta y/2) \otimes (\delta x/2, -\delta y/2) = (1/\sqrt{2})(a/\alpha, +a/\alpha) \otimes (1/\sqrt{2})(a/\alpha, -a/\alpha)$$

[Expression 5]

An electromagnetic field created with traveling light waves may be expressed as follows.

$$\psi_{\vec{k}}(\vec{r}) = \left\{ e^{i\vec{k}\cdot\vec{r}} + e^{i\vec{k}\cdot(\vec{r}+(\delta_x/2)\hat{x}+(\delta_y/2)\hat{y})} + e^{i\vec{k}\cdot(\vec{r}+(\delta_x/2)\hat{x}(\delta_y/2)\hat{y})} + e^{i\vec{k}\cdot(\vec{r}+\delta_x\hat{x})} \right\}/4$$

$$= e^{i\vec{k}\cdot(\vec{r}+(\delta_x/2)\hat{x})} \frac{\left\{\cos\left(\frac{k_x\delta_x}{2}\right)+\cos\left(\frac{k_y\delta_y}{2}\right)\right\}}{2}$$

[Expression 6]

$$|\psi_{\vec{k}}(\vec{r})| = \frac{\left|\cos\left(\frac{k_x\delta_x}{2}\right)+\cos\left(\frac{k_y\delta_y}{2}\right)\right|}{2}$$

$$= \frac{\left|\cos\left(\frac{k_x a}{\sqrt{2}\alpha}\right)+\cos\left(\frac{k_y a}{\sqrt{2}\alpha}\right)\right|}{2}$$

The sharp-definition (steepness) index may be calculated as follows $$\text{steepness index} = \frac{a^2}{(2\pi)^2} \int_{|k_x|\leq\frac{\pi}{a},|k_y|\leq\frac{\pi}{a}} \psi_{\vec{k}}^*(\vec{r})\psi_{\vec{k}}(\vec{r})dk_x dk_y$$

$$= \frac{1}{4} + \frac{1}{4}\cdot\frac{\sin\left(\sqrt{2}\frac{\pi}{\alpha}\right)}{\left(\sqrt{2}\frac{\pi}{\alpha}\right)} + \frac{1}{2}\cdot\left(\frac{\sin\left(\frac{\pi}{\sqrt{2}\alpha}\right)}{\left(\frac{\pi}{\sqrt{2}\alpha}\right)}\right)^2$$

[Expression 7]

(Vertical Unidirectional Type)

The extent to which the light beam is separated in correspondence to a shift by $\alpha \times 100\%$ may be expressed as follows, as indicated in FIG. 9 as well.

$$(0, \delta y) = (0, a/\alpha)$$

[Expression 8]

An electromagnetic field created with traveling light waves may be expressed as follows.

$$\psi_{\vec{k}}(\vec{r}) = \left\{ e^{i\vec{k}\cdot\vec{r}} + e^{i\vec{k}\cdot(\vec{r}+\delta_y\hat{y})} \right\} / 2 \quad \text{[Expression 9]}$$

$$= e^{i\vec{k}\cdot(\vec{r}+(\delta_y/2)\hat{y})} \cos\left(\frac{k_y \delta_y}{2}\right)$$

$$|\psi_{\vec{k}}(\vec{r})| = \left|\cos\left(\frac{k_y \delta_y}{2}\right)\right|$$

$$= \left|\cos\left(\frac{k_y a}{2\alpha}\right)\right|$$

The sharp-definition (steepness) index may be calculated as follows $$\text{steepness index} = \frac{a^2}{(2\pi)^2} \quad \text{[Expression 10]}$$

$$\int_{|k_x|\leq \frac{\pi}{a}, |k_y|\leq \frac{\pi}{a}} \psi_{\vec{k}}^*(\vec{r}) \psi_{\vec{k}}(\vec{r}) dk_x dk_y$$

$$= \frac{1}{2} + \frac{1}{2} \cdot \frac{\sin\left(\frac{\pi}{\alpha}\right)}{\left(\frac{\pi}{\alpha}\right)}$$

It has been confirmed through testing that the steepness indices thus calculated each indicate a value that reasonably matches the impression of an actual image gleaned through subjective evaluation thereof by actually applying the steepness index through simulation. While the steepness indices each defined so as to closely approximate existing data may not exactly match the evaluation results obtained through simulation exclusively based upon geometrical optics, it can be reasonably expected that the relation among the values indicated by the steepness index will remain unchanged. The soundness of this assertion is supported by the results of an experiment conducted to compare the definition of a standard simulation image at ¼ resolution with the definition of the image measured without any OLPF application, which confirms that better definition is achieved at ¼ resolution to an extent close to what is expected or even beyond the expected range.

The results of the experiment mentioned above indicate that a difference of 0.01 in the actual index value, i.e., a 1% difference, creates a discernible difference in definition, affecting the image quality. A difference of 0.05 in the index value, i.e., a 5% difference, leads to a very clearly discernible difference in definition, clarity and depth. The index assumes a higher value to indicate better definition and takes on the value of 1 per unit pixel (a×a) when there is no optical low pass filter, i.e., when $\alpha=\infty$.

It is understandable that the steepness index calculated for the 100% by optical low pass filter in the related art is 0.25, i.e., ¼, since a light beam that would otherwise enter one pixel is spread over four pixels via the optical low pass filter, as substantiated by the principle of energy conservation. Namely, while there is bound to be variance attributable to the different levels of resolution, each represented by a specific number of pixels, the level of sharp definition achieved with the 100% by optical low pass filter in conjunction with 10,000,000 pixels is close to the level of sharp definition achieved via 2.5 million pixels without an OLPF, as far as the level of sharp definition gauged per pixel is concerned.

In conjunction with a 100% v optical low pass filter equipped with a single birefringence plate, via which a light beam is split over two pixels, the steepness index assumes an initial value of 0.5. Thus, while the effectiveness for preventing color artifacts and spurious resolution needs to be examined thoroughly, it is noteworthy that there is a great difference between the level of sharp definition corresponding to the steepness index of 0.25 and the level of sharp definition corresponding to the steepness factor of 0.5.

There is another crucial point that must be stressed in that hardly any discernible difference exists between the levels of sharp definition corresponding to a given α value, achieved through an α×100% dd combination and an α×100% hv combination with two birefringence plates. While the filter strength assumed for the by optical low pass filter is within a 1.00~1.33 range in the related art, dd optical low pass filters are utilized over a filter strength range equal to and above 1.41. Accordingly, dd optical low pass filters are expected to assure higher levels of sharp definition. FIG. 12 presents a table listing typical values calculated for the steepness index.

(Geometrical Optics Simulation)

A simulation test was conducted to investigate the pixel pitch dependency. The test was conducted by hypothesizing that the subject optical system was an exchangeable lens group used in a single lens reflex camera. While further reinforcement will be included towards the end of the description, our argument will be developed by clarifying challenges inherent to single lens reflex cameras with regard to pixel pitch dependency. The ultimate object is to determine whether or not it is possible to achieve an optical low pass filter with adjustable strength and determine the optimal strength for such an optical low pass filter by ascertaining the cutoff point at which any color moiré•spurious resolution can be completely eliminated in combination via the optical low pass filter in conjunction with demosaicing image processing. Namely, this cutoff point will provide sufficient conditions for the optimal optical low pass filter strength.

It was surmised that as long as the simulation was conducted in conjunction with a lens assumed to achieve the highest level of MTF performance among exchangeable lens groups used in single lens reflex cameras, the occurrence of color moiré•spurious resolution would be prevented for other lenses in a reliable manner based upon the simulation results. Accordingly, aberration that could occur under various operating conditions in which a lens assuring a sufficiently high level of resolution performance among exchangeable lens groups compatible with the standard 35×24 mm film size or the 23.4×16.7 mm APS-C size, was simulated through geometrical optics light tracking so as to determine the point spread function (PSF) for the lens in the matrix format.

Under normal circumstances, exchangeable lenses used in single lens reflex cameras are designed so as to ensure that the geometrical optical aberration is minimized and high MTF characteristics are achieved in correspondence to an aperture number of approximately F8. Accordingly, the simulation was conducted under lens utilization conditions corresponding to the aperture number of F8, at which a high level of geometrical optical aberration suppression performance is assured and at the maximum aperture number of F2.8, at which geometrical-optical aberration suppression performance is poor.

In addition, the highest level of geometrical-optical MTF performance is assured at the center and the performance level becomes lower further away from the center with regard to the image height. Accordingly, since image sensors in typical single lens reflex cameras include 4/3 type image sensors compatible with the 18×13.5 mm film size in addition to those compatible with the film size mentioned above and the APS-C size, PSFs were calculated in correspondence to image heights y=0 mm, 5 mm, 10 mm and 15 mm. Furthermore, since perfect focusing accuracy could not always be assured and a focusing misalignment was bound to occur on the optical axis at certain subject distances, PSFs were calculated in correspondence to defocusing quantities z=±100 μm and also in correspondence to the focus match position z=0 μm. z=±100 μm is the equivalent to defocusing of 10 cm occurring along the back/forth direction as a subject present several meters away is photographed over the focal length of a medium-range telephoto lens. Namely, it is equivalent to the extent to which the subject's shoulders and ears are blurred in a photograph of the subject's face taken by focusing on the tip of his nose.

The actual simulation was conducted by first smoothing the original image (a natural image of a circular zone plate or a natural image that can be assumed to be aberration-free, or a Siemens star chart) based upon a PSF assuming an expected pixel pitch spread width, further smoothing the image with various optical low pass filters used to determine the optimized conditions, sampling the image data via a color filter array and executing demosaicing processing.

When investigating the image height dependency or the defocusing dependency, change rate information indicating the rate of change relative to a specific variable is obtained by using a PSF with one of the conditions having been set therefore, i.e., one of the following conditions; aperture number F8, image height 0 mm, focusing position z=0 μm, that would assure the highest level of MTF performance in terms of geometrical optics, altered to determine whether or not there is a point at which the occurrence of color artifact•spurious resolution can be prevented even if the strength of the optical low pass filter is lessened and ascertaining the position at this point. While this change rate information is reviewed under the most rigorous conditions, a greater extent of blurring, exceeding the sum of the extents of combined blurring representing the sum of the different change rates corresponding to different variables, is assumed to manifest under less rigorous conditions, in which multiple variables change simultaneously. Accordingly, change rate information indicating the change rate for a single variable may be considered to provide the minimum change rate information required.

In correspondence to each of the three types of optical low pass filters having been described in the previous section, a test was conducted by using a high-performance demosaicing algorithm as explained in the following description of the respective embodiment so as to investigate whether or not the strength of the subject optical low pass filter could be lessened and the exact extent to which the strength could be reduced as the pixel pitch became gradually smaller. In addition, the varying extents to which the strength of the optical low pass filters could be reduced in correspondence to different demosaicing algorithms were also investigated.

The trade-off relationship between color artifact suppression and sharp definition is represented by the inequality sign used to indicate the relationship between the products of the two variables. Accordingly, it is crucial, from the viewpoint of minimizing any error attributable to subjective evaluation, to set an optimal reference point with regard to one of the variables when evaluating the other variable. In the test, a specific strength for α corresponding to the weakest optical low pass filter achieving a substantially color moiré•spurious resolution-free state through the full frequency range for an achromatic circular zone plate with respect to color artifact suppression was investigated. Based upon the results of this investigation, a final conclusion will be drawn by comparing the steepness index values that may be assumed in such an optical low pass filter both through the subjective evaluation and through the objective evaluation.

It has been implied through the argument presented so far that the objective steepness index indicates a sharp definition level matching that drawn through subjective evaluation and that the relationship between the steepness index values calculated for an hv optical low pass filter and a dd optical low pass filter, each equipped with two birefringence plates, matches the relationship between varying levels of strength α assumed for the optical low pass filters. Accordingly, the vertical axis of the diagrams presenting graphs indicating the test results, in reference to which the following description is given, may be considered to represent the steepness index, instead. In other words, the relationship among the individual values is sustained even if the scaling is altered.

Figure 13:
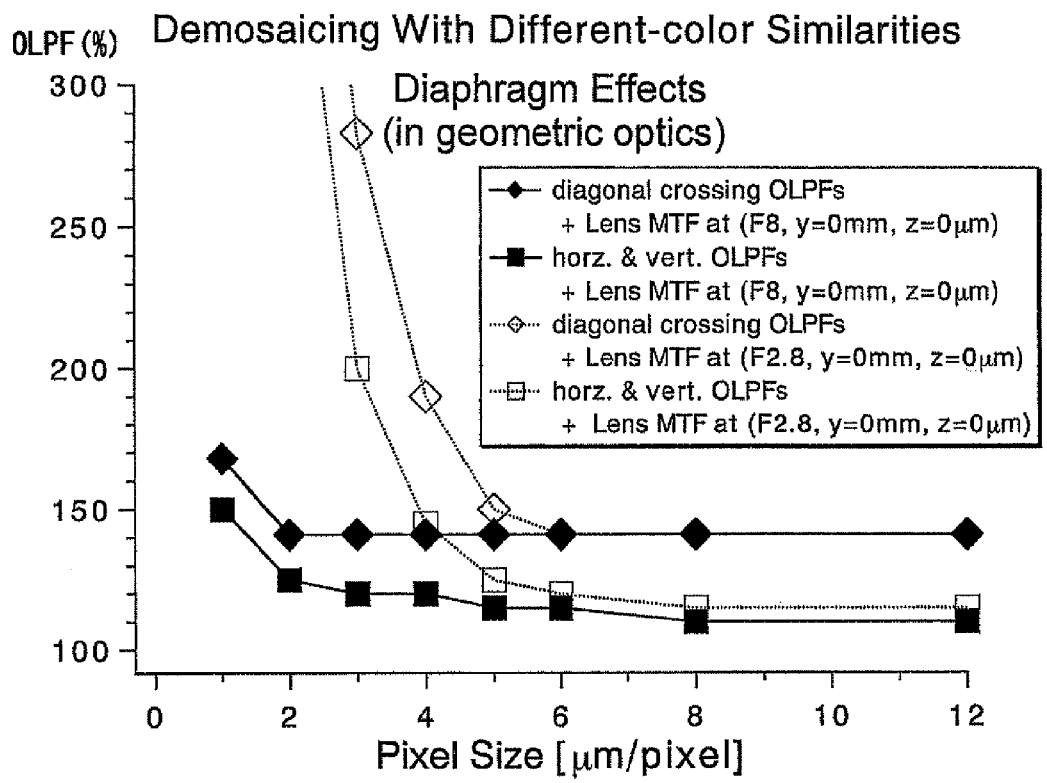
FIG. 13 shows pixel pitch dependency graphs indicating conditions under which the color moiré•spurious resolution-free state is achieved in correspondence to aperture numbers F8 and F2.8 by using a different-color correlation-based demosaicing algorithm.

FIG. 13 presents a diagram related to pixel pitch dependency, indicating conditions under which color moiré•spurious resolution-free states are achieved in correspondence to two different aperture numbers F8 and F2.8 by using a different-color correlation-based demosaicing algorithm which is to be described in reference to the following embodiments. Since the suppression of color artifact spurious resolution around the polar points corresponding to the vertical horizontal Nyquist frequencies can be achieved through image processing in conjunction with a different-color correlation-based algorithm, the conditions under which the color moiré•spurious resolution-free states are achieved are indicated through comparison of the vertical/horizontal bidirectional optical low pass filters and the diagonal bidirectional optical low pass filters.

Figure 15:
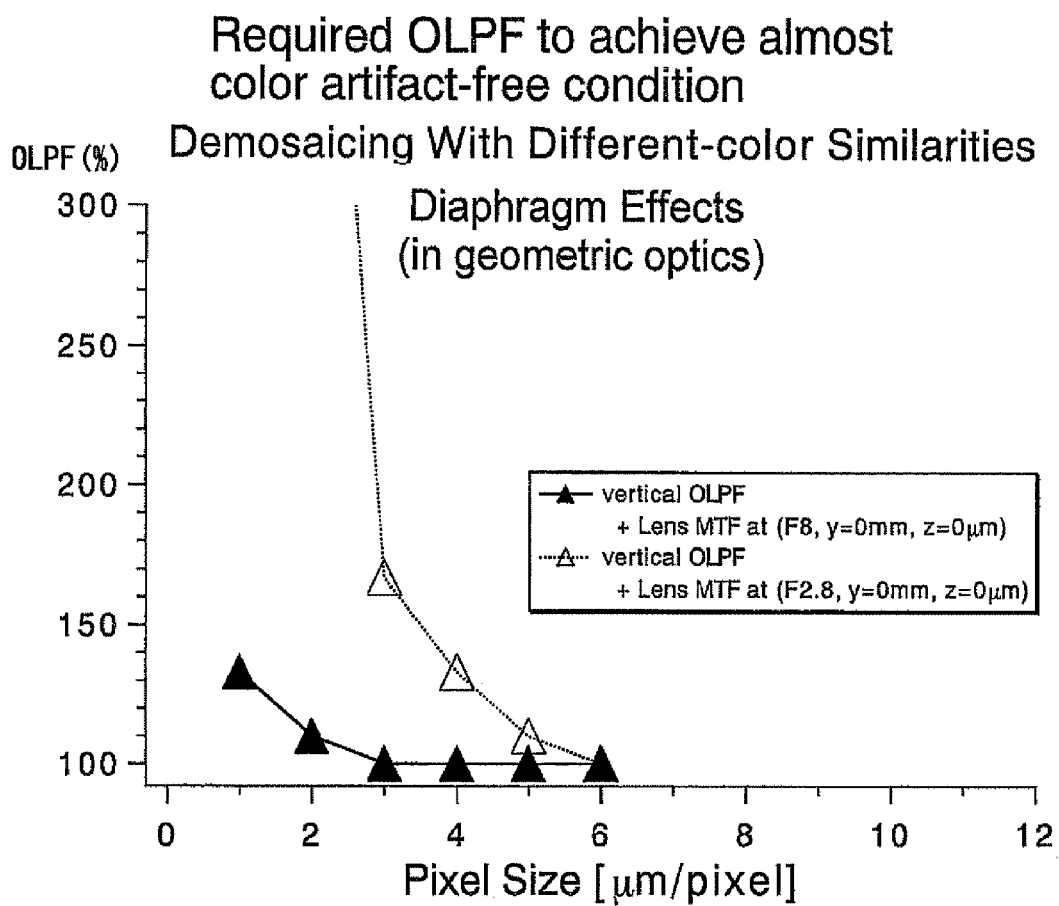
FIG. 15 shows pixel pitch dependency graphs indicating conditions under which the color moiré•spurious resolution-free state is achieved in correspondence to aperture numbers F8 and F2.8 by using a different-color correlation-based demosaicing algorithm in conjunction with an optical low pass filter that includes a single vertical layer.

FIG. 15 indicates the conditions pertaining to optical low pass filters each equipped with a single vertical birefringence plate, ascertained by using the same algorithm. In the case of optical low pass filters used in conjunction with a single birefringence plate, a high level of contrast is sustained around the polar points corresponding to the horizontal Nyquist frequency at pixel pitches of 6 μm/pixel and higher since such optical low pass filters are not effective at these pixel pitches, the color moiré•spurious resolution-free state cannot be achieved. Accordingly, graphs are plotted in correspondence to pixel pitches equal to and less than 6 μm.

Figure 14:
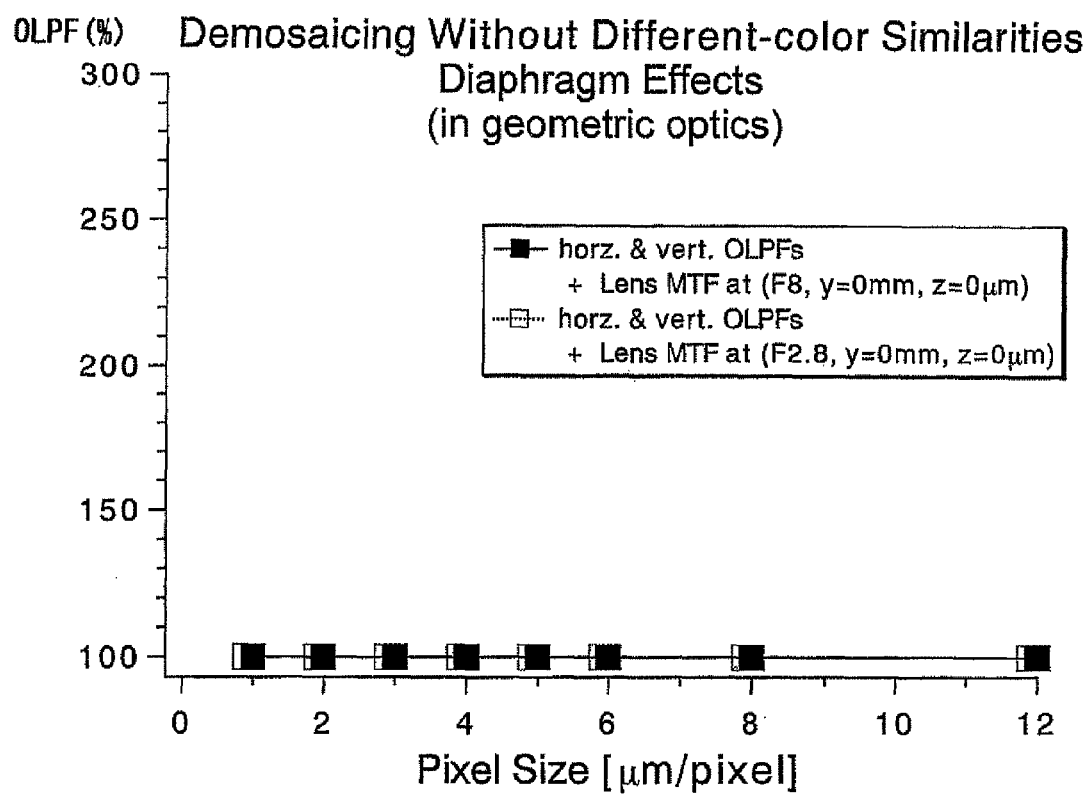
FIG. 14 shows a graph indicating the results of an examination conducted to determine whether or not a change corresponding to the F number, comparable to those in FIG. 13, is observed by using a same-color correlation-based demosaicing algorithm of the related art.
Figure 16:
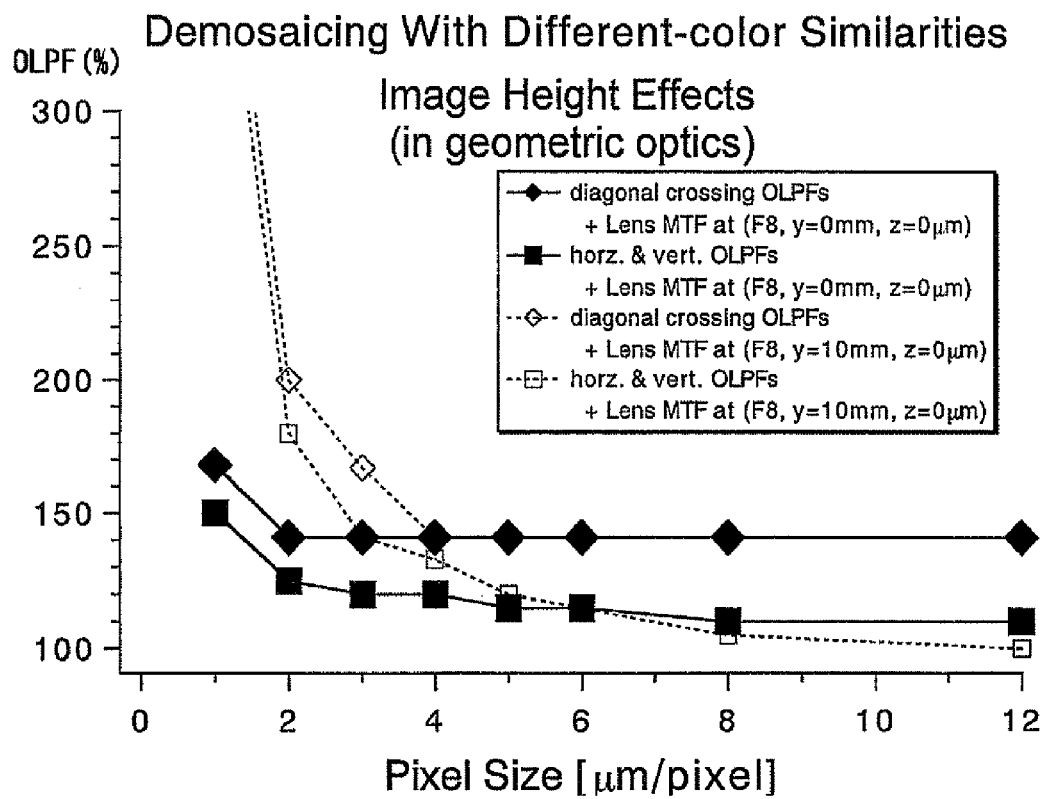
FIG. 16 shows graphs of image-height dependency investigated by using a different-color correlation-based algorithm.
Figure 17:
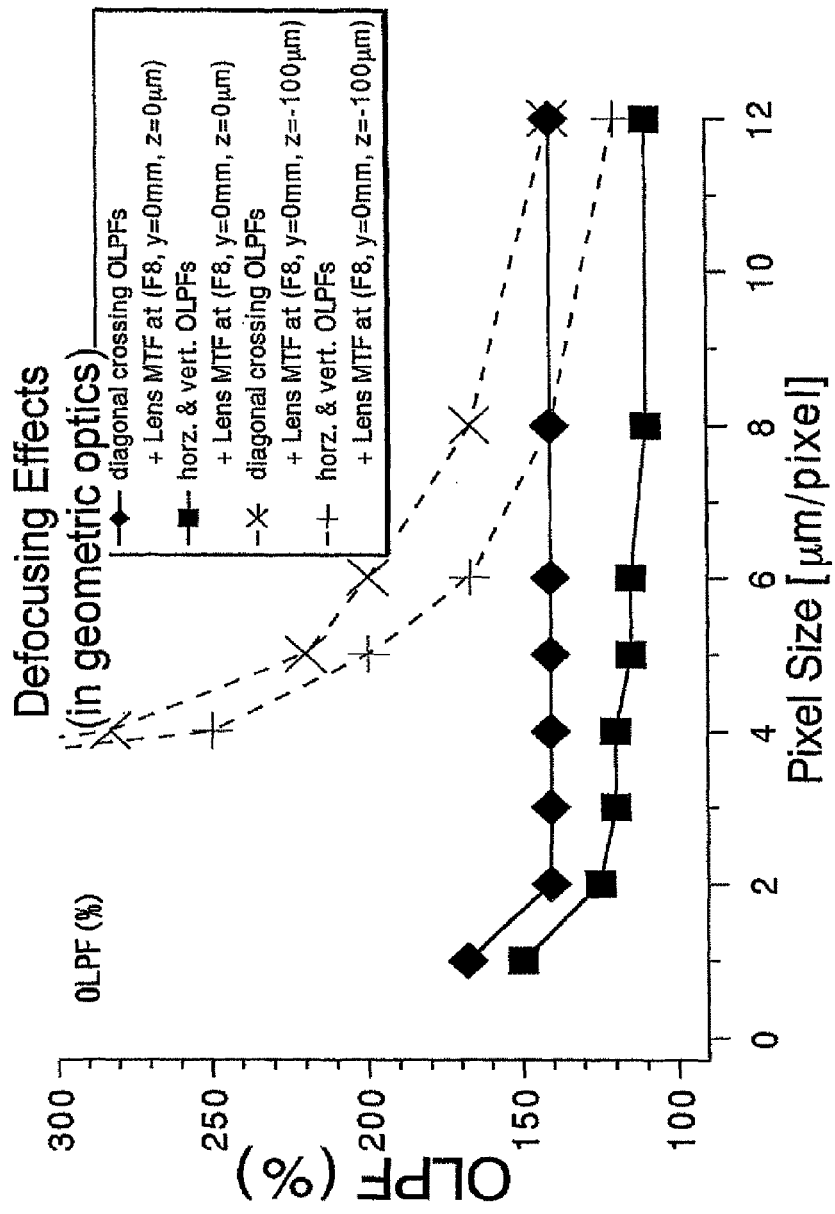
FIG. 17 shows graphs of defocus dependency investigated by using a different-color correlation-based algorithm.

FIG. 14 presents a graph indicating the results of investigation conducted to determine whether or not a change relative to the F number, which is comparable to that shown in FIG. 13, may be observed in conjunction with a same-color correlation-based demosaicing algorithm in the related art. FIG. 16 presents the results of an investigation conducted to determine the image height dependency by using the different-color correlation-based algorithm in the tests. FIG. 16 presents graphs representing image heights y=0 mm and y=10 mm. However, it can be easily assumed that the graph corresponding to y 5 mm will be plotted between the two graphs and that the graph corresponding to y=15 mm will be plotted above the graph corresponding to y=10 mm. FIG. 17 presents graphs indicating the defocus dependency determined by using the same algorithm.

The graphs in these diagrams imply, first and foremost, that the geometrical-optical lens MTF performance tends to be poorer as the aperture number is set closer to the maximum aperture F number, as reflected in the design intention, and that the geometrical-optical MTF performance level, which peaks at the center, i.e., at the image height of 0 mm, in correspondence to F8, will be sustained at the best focus position even if the pixel pitch is reduced. However, the final conclusion must be drawn by bearing in mind that these premises may not hold up when the wave-optics lens MTF performance to be detailed in the next section is factored in.

The critical argument points that may be drawn based upon the results of the geometrical-optical simulation include the following.

1) The processing executed based upon the same-color correlation-based algorithm alone allows for the occurrence of processing-induced color artifacts resulting from the image processing due to the low level of resolution with which the directional decision making is executed. Once such color artifacts manifest, the signal component attributable to the color artifacts cannot be entirely suppressed through the smoothing effect achieved to an extent corresponding to the extent to which the geometrical-optics lens MTF is reduced in the range between F8 and F2.8 and thus, the optical low pass filter strength cannot be reduced. Namely, the processing-induced color artifacts can never be eliminated unless the corresponding frequency component is killed initially. Accordingly, as long as the level of image processing performance remains low, the benefit of the potential optical low pass filter replacement, which may otherwise be possible as the pixel pitch is reduced and the lens MTF is lowered, cannot be realized. Consequently, the resulting image is more likely to be directly subjected to the adverse effect of lowered lens performance resulting from a smaller pixel size.

2) A diagonal bidirectional optical low pass filter, rather than a vertical/horizontal bidirectional optical low pass filter, constantly assures sharper definition regardless of pixel pitch dependency, under conditions in which the same color moiré•spurious resolution-free state is achieved based upon the different-color correlation-based algorithm.

3) While lower MTF attributable to geometrical-optical aberration affects the performance with which color artifacts and actual color are discriminated from each other through the different-color correlation-based demosaicing algorithm, the MTF starts to assume a higher value in correspondence to each of various optical conditions so as to wield a marked influence in conjunction with pixel pitches equal to and less than 5~6 μm/pixel.

4) Under the actual lens utilization conditions, an image formed with the lens is bound to be evenly affected by blurring represented by the geometrical-optical aberration F number, peripheral blurring manifesting in correspondence to the image height and blurring caused by defocusing, and their influences are more easily discernible when the pixel pitch is equal to and less than 5~6 μm/pixel.

To expound upon the point discussed in 4) above, the influences of the various types of blurring attributable to the F number, the image height and defocusing become more discernible at pixel pitches of equal to and less than; 5~6 μm/pixel, 4~6 μm/pixel and 6~8 μm/pixel respectively. However, the specific cutoff point at which effective countermeasures against a given type of blurring can be taken varies depending upon the structure assumed in the optical LPF. Namely, countermeasures taken in an unknown range beyond α=100~133% assumed routinely in the related art in conjunction with vertical/horizontal bidirectional optical low pass filters, may effectively minimize blurring while suppressing color moiré via diagonal bidirectional optical low pass filters at pixel pitches equal to and less than at least 5 μm/pixel, via vertical unidirectional optical low pass filters at pixel pitches equal to and less than at least 5 μm/pixel and via vertical/horizontal bidirectional optical low pass filters at pixel pitches equal to and less than at least 4 μm/pixel, when the wave optics considerations detailed below are factored in. This integrated approach will be clarified in the description of the embodiments given in reference to the figures mentioned above and also in reference to FIGS. 24 and 25.

(Wave Optics)

While the simulation described in the preceding section was conducted simply by taking into consideration the decrease in the MTF attributable to the geometrical-optical lens aberration, the effect of wave optics diffraction can no longer be disregarded as the pixel pitch becomes small enough to be close to the wavelength of the incoming light. This point is explained from the viewpoint of physics in section 58 "The Limits of Geometrical Optics" in Chapter 7 "Transmission of Light" in Volume 2 "Classical Theory of Fields" in the Course of Theoretical Physics By Landeau-Lifshitz, which further proceeds to indicate that the limits to the level of sharp definition achieved for an optically formed image is dependent on the wavelength and the opening angle at which the incident light beam expands, i.e., the F number.

Figure 18:
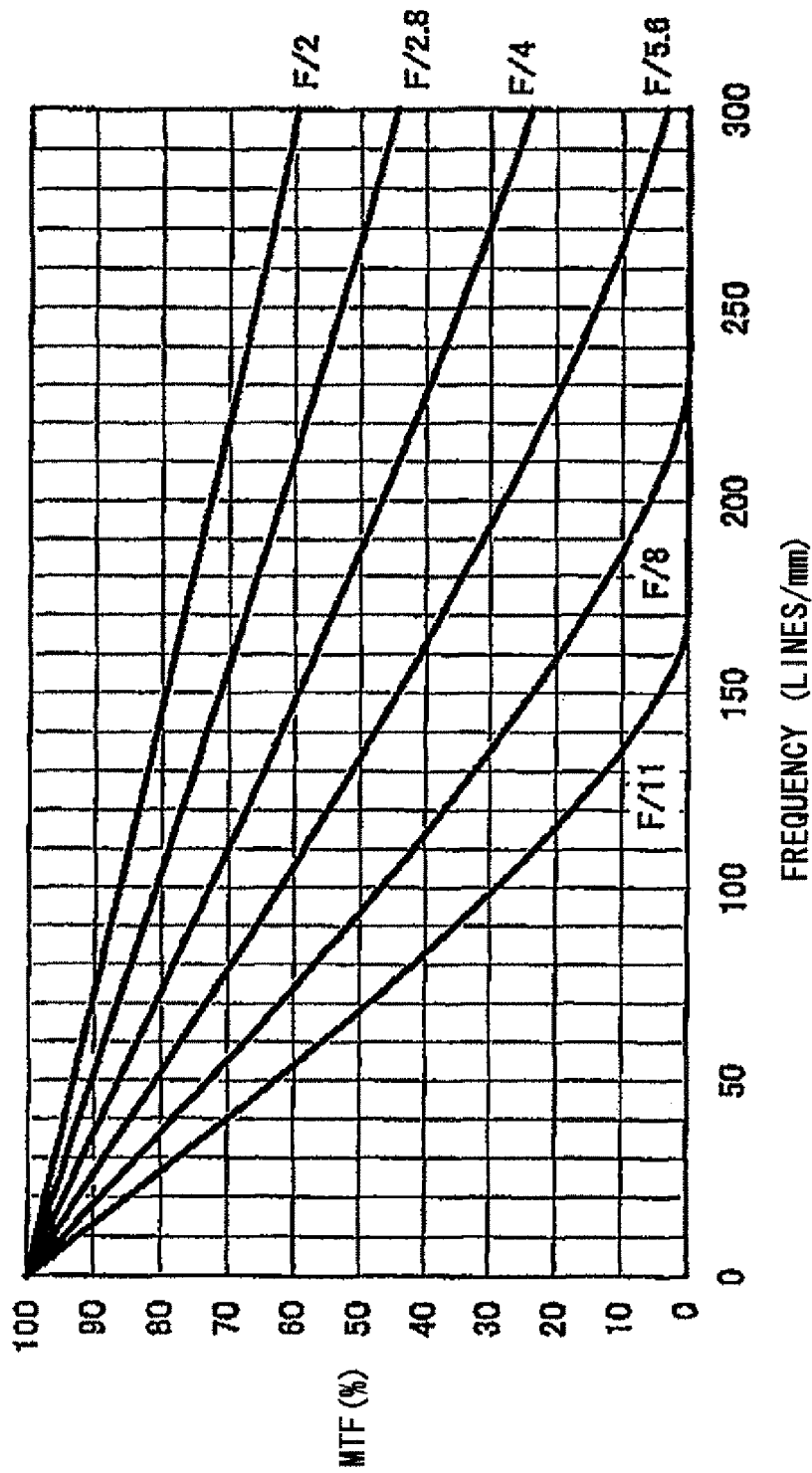
FIG. 18 shows graphs of wave optics MTF at aberration-free lenses.

Reference publication "Optical Technology Contact" Vol. 4, No. 9 (2003)-pp 3-12 provides calculation results indicating the MTF characteristics retained as images of stripe patterns with 0 lines/mm through 300 lines/mm were formed in correspondence to various F numbers via an ideal image forming optical system having a round opening, which could be considered an aberration-free system in terms of wave optics. FIG. 18 indicates wave optics MTF observed at an aberration-free lens.

The notation "250 lines/mm" indicates that 250 1 mm-white lines and 250 1 mm-black lines are resolved in an alternate pattern on the imaging plane and, accordingly, the pixel pitch assumed at the image sensor with the Nyquist frequency present thereat will be 1 mm/500 pixels=2 μm/pixel. FIG. 19 presents a list of typical correspondences between the pixel pitches and the Nyquist frequencies.

The actual measurement target, observed via the image sensor, was the number of electrons having been excited to the excitation level as the energy of light (represented by the number of photons) underwent photoelectric conversion. The MTF was defined in a dimension that matched the intensity of this light, i.e., the contrast indicated by the measured signal gradation value. The MTF in FIG. 18 is re-plotted to represent the contrast function related to the pixel pitch dependency in correspondence to the aperture numbers F8 and F2.8 in FIG. 20A. In addition, the corresponding graphs representing the reciprocal of the contrast are also presented (see FIG. 20B) so as to facilitate comparison with the diagrams in FIGS. 13~17.

As the contrast level was lowered to $\frac{1}{100}$, the image structure of the stripe pattern, previously vibrating within the range of 0~100, was imaged as a stripe pattern vibrating in the range between 50 and 51, and this image could thus be regarded to have been formed with practically no resolution.

Figure 20A:
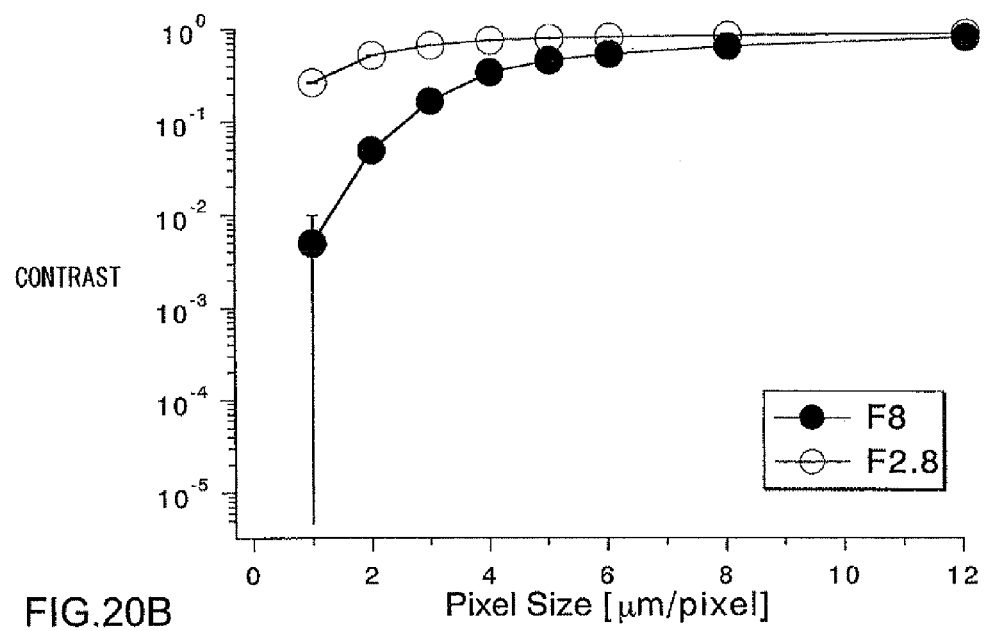
FIGS. 20A, 20B show graphs of wave optics MTF at aberration-free lenses, plotted as contrast functions related to pixel pitch dependency in correspondence to aperture numbers F8 and F2.8.
Figure 22A:
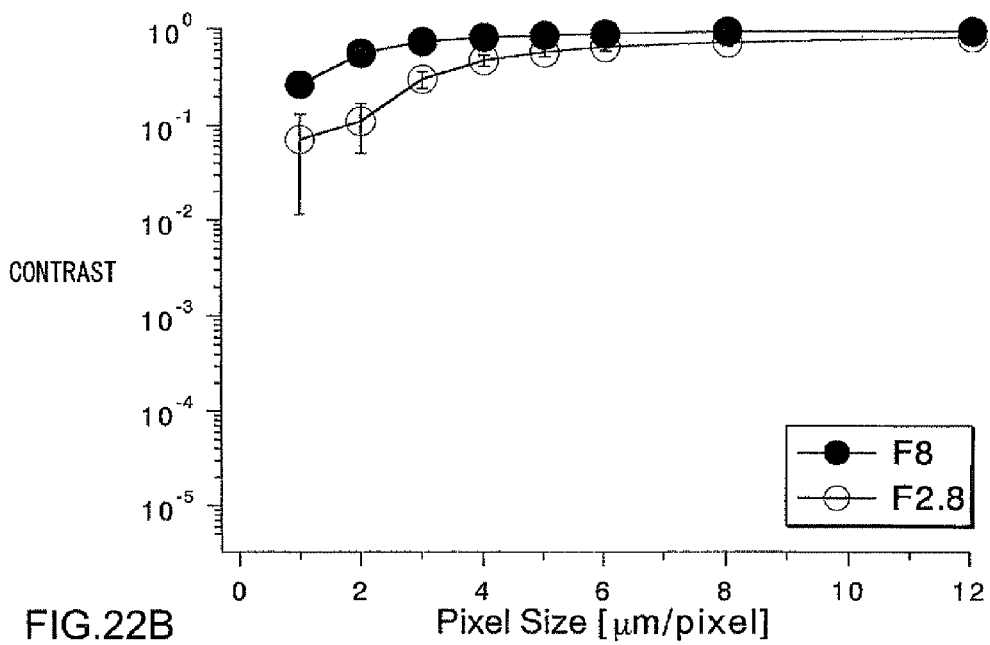
FIGS. 22A, 22B show contrast attributable to aberration in geometrical optics.

The graphs indicate that the contrast achieved with the lens at F8, designed to realize very good aberration characteristics in terms of geometrical optics, decreases rapidly as the pixel pitch becomes smaller until the relationship between F8 and F2.8 is reversed relative to the relationship between F2.8 and F8 with respect to the contrast decrease attributable to geometrical optical aberration is reversed (see FIG. 20A and FIG. 22A to be referred to later). While the contrast levels corresponding to F8 and F2.8, staying close to each other, fall as an asymptotically in a similar manner within the pixel pitch range of 8~5 μm/pixel, the contrast level corresponding to F8 drops drastically to an extent at which no resolution is achieved once the pixel pitch becomes equal to or less than 5 μm/pixel. The numerical values indicating the contrast level in correspondence to F8 imply hardly any resolution once the pixel pitch becomes equal to or less than 2 μm/pixel. At F2.8, on the other hand, sufficient contrast is sustained from the perspective of wave optics until the pixel pitch is reduced to 1 μm/pixel.

Figure 21A:
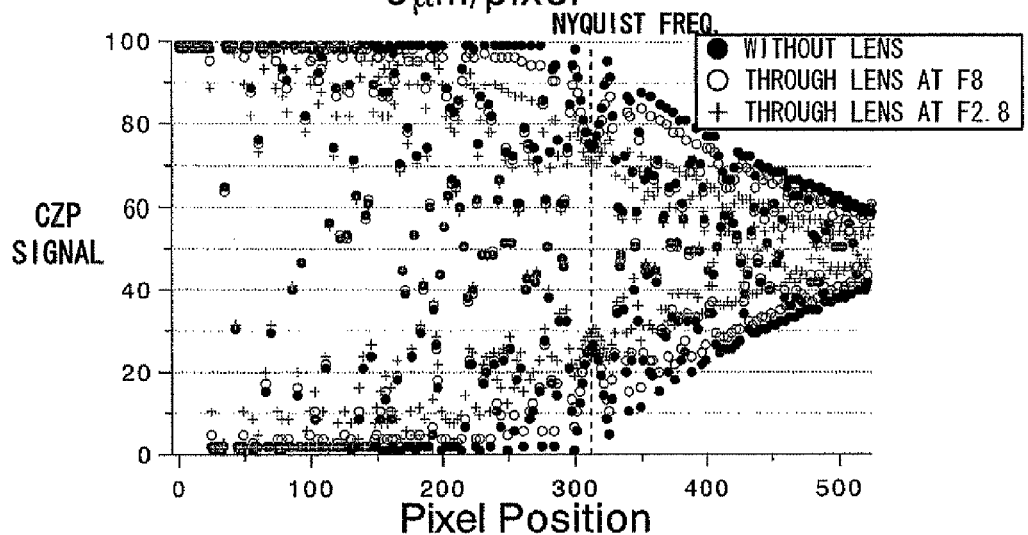
FIGS. 21A, 21B show signal fluctuation widths of signals expressing a circular zone plate chart, yet to enter an optical low pass filter in conjunction with which no lens optical system is inserted, as observed in images having been filtered by using a lens optical system point spread function.
Figure 21B:
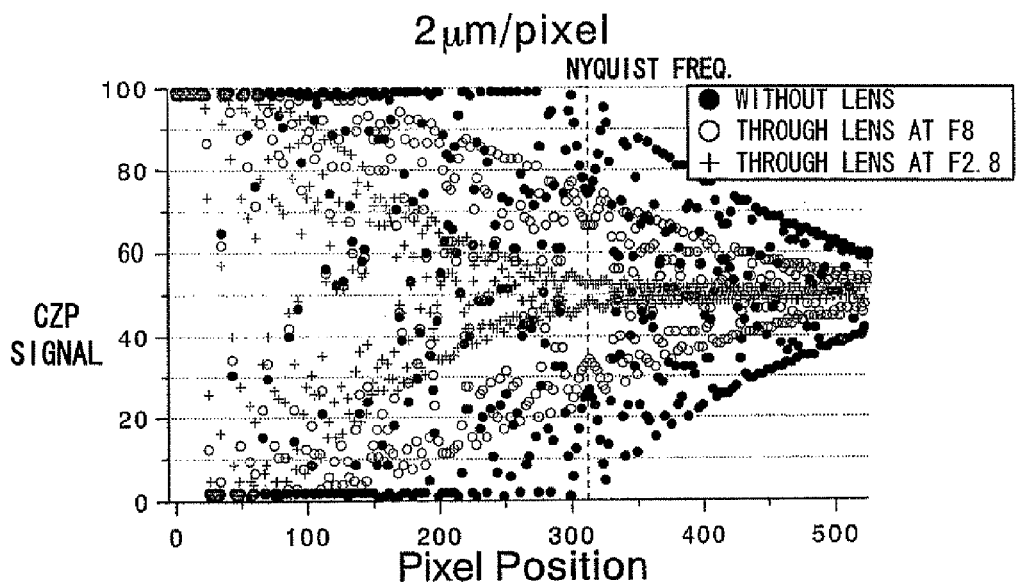
Figure 22B:
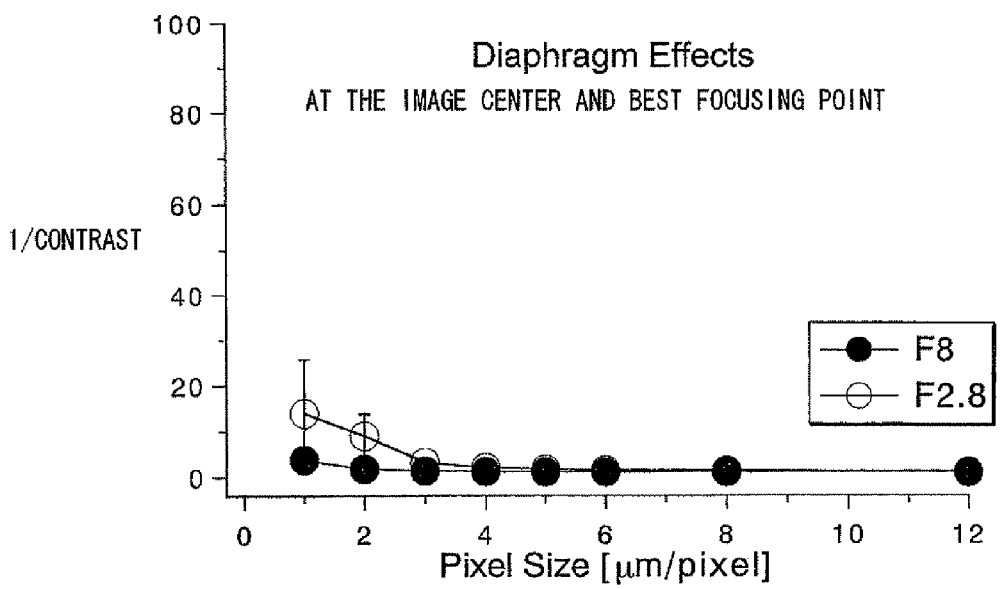

For purposes of comparison, the extent of decrease in the contrast level at the Nyquist frequency was investigated based upon the point spread function used in the geometrical optics simulation described in the previous section. In the experiment, the extent of decrease in the contrast could be estimated with ease by measuring the extent of decrease in the signal fluctuation width manifesting in an image filtered based upon the lens optical system point spread function relative to the fluctuation width of circular zone plate chart signals yet to enter an optical low pass filter engaged in operation without a lens optical system. Such signal fluctuation widths measured in conjunction with pixel pitches of 6 μm/pixel and 2 μm/pixel are respectively indicated in FIG. 21A and FIG. 21B. FIGS. 22A, 22B present pixel pitch dependency graphs obtained by plotting these measurement results. An error bar indicates a significant read error.

These graphs indicate that a more acute pixel pitch-dependent contrast decrease occurs in terms of wave optics in correspondence to F8, compared to the pixel pitches dependent contrast decrease occurring in terms of geometrical optics in correspondence to F2.8. Accordingly, conditions corresponding to the geometrical optics simulation results corresponding to F8 presented in FIGS. 13~17 can be regarded to greatly deviate from the reference conditions, i.e., F8, y=0 mm and z=0 μm and they can be concluded through rough approximation to be less rigorous than the conditions; F2.8, y=0 mm and z=0 μm. In other words, these conditions may be regarded to reflect the extent of change attributable to the image height and defocusing indicated in the graphs.

(Presumption of Synthesized Data)

True data can be obtained through wave optics simulation that also reflects the geometrical ramifications of the aberration. However, even though such data are not available at present, the data that will be obtained through actual measurement can be approximated as the product of the contrast attributable to the geometrical optical aberration and the contrast sustained through the wave optics MTF application at an aberration-free system.

Figure 20B:
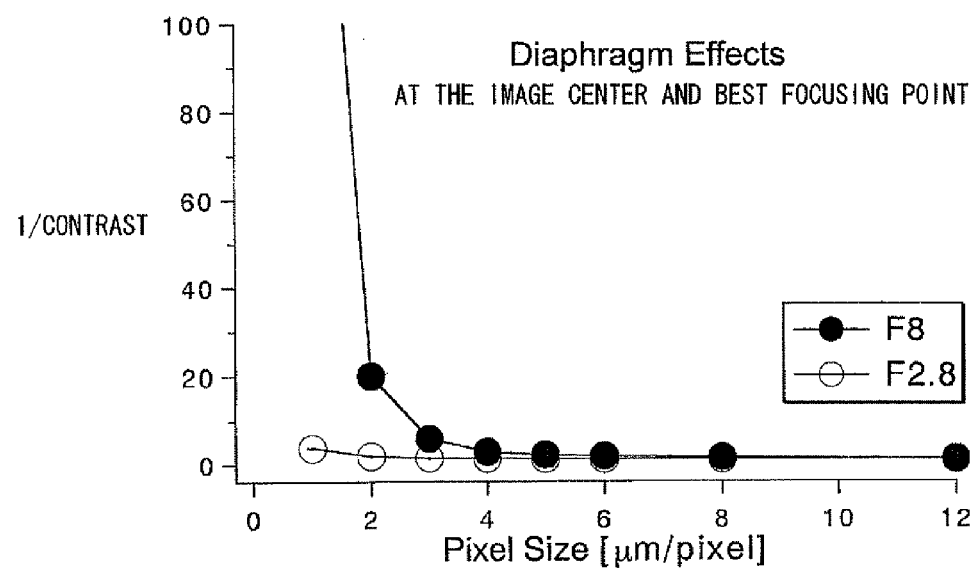
Figure 23A:
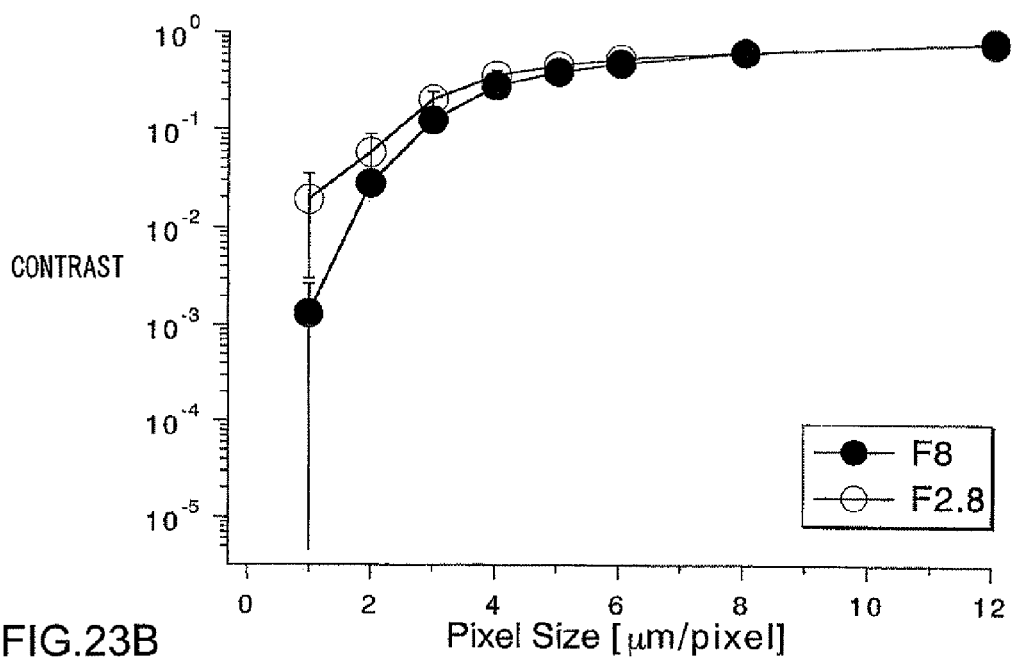
FIGS. 23A, 23B show combination of the contrast attributable to aberration in geometrical optics and the MTF contrast in wave optics at an aberration free system, plotted as synthesized contrast.
Figure 23B:
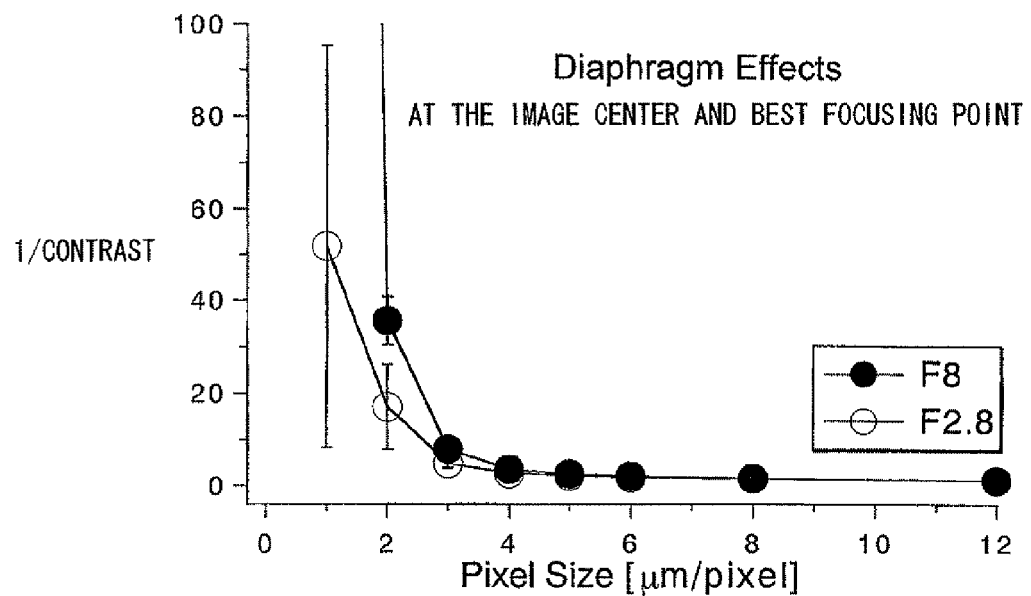

Unless a phase-attributed interference term needs to be factored into the wave optics observation of the geometrical optical aberration, the primary approximation of such a simple product can be regarded as correct and can be regarded to fully withstand any scrutiny attempted in order to ascertain the overall tendency. FIGS. 20A, 20B mentioned earlier indicate the contrast achieved through wave optics MTF application at aberration-free systems. FIGS. 22A, 22B indicate the contrast attributable to geometrical optical aberration. FIGS. 23A, 23B present graphs obtained by plotting the combined contrast indicated by the synthesized data obtained by integrating them. FIGS. 22B and 23B each present contrast graphs represented by the reciprocal of the contrast, as does FIG. 20B. In addition, FIGS. 24 and 25 present tables listing the contrast values indicated in FIGS. 20, 22 and 23. FIG. 24 presents a table listing contrast values at F8, whereas FIG. 25 presents a table listing contrast values at F2.8.

Based upon these values, a crucial conclusion that a higher level of synthesized contrast, achieved by factoring in the geometric aberration manifesting in the actual data and the wave optics diffraction, both indicated in the actual data is assured at F8 than at F2.8 in conjunction with pixel pitches equal to and less than 8 μm/pixel, as the graphs in FIGS. 23A, 23B clearly indicate. In addition, this principle can be regarded to be applicable through approximation for the pixel pitch of 12 μm/pixel, as well.

This means that the results of geometrical optics simulation conducted to evaluate the extent of color artifact•spurious resolution by using actual images in correspondence to the F8 setting are hardly reliable when the pixel pitch is equal to and less than 6 μm/pixel and that the contrast, the decrease in which is evaluated in correspondence to F2.8, is achieved under the most rigorous conditions. Thus, the strength set for an optical low pass filter that achieves a color moiré•spurious resolution-free state under the conditions; F2.8, image height y=0 mm and best focusing position z=0 μm, can be regarded as a setting that will provide sufficient conditions for any other lens utilization conditions.

As described above, as the pixel pitch becomes equal to or less than 5~6 μm/pixel in conjunction with single lens reflex lens groups assuming aperture numbers F2.8 and F8, the MTF decreases due to the geometrical optical aberration on the maximum aperture side at F2.8 and the MTF decreases due to the wave optics diffraction phenomena at F8. These MTF decreases, combined with factors such as the image height and the focusing position accuracy, are expected to result in failure to achieve focus at any position at all.

This point reaffirms the new challenge we face as a majority of cameras on the market assume 6 μm/pixel pitches, that while the issue of color artifacts, color moiré and spurious resolution still need to be addressed effectively, sharper focus cannot be achieved with ease in images photographed with these cameras. In other words, when pixel pitches as small as 5 ~6 μm/pixel and less are assumed, the adverse effect of the reduced optical system MTF starts to manifest, and as long as lenses in the existing art are to remain in use, the only viable means for addressing the challenge of the difficulty in achieving sharp focus is to reevaluate the strength of the optical low pass filter applied in the related art. For these purposes, it is necessary to provide solid support through image processing so as to effectively suppress color artifacts and spurious resolution, and ultimately, to afford a higher level of freedom in optical low pass filter design.

-First Embodiment-

Figure 26:
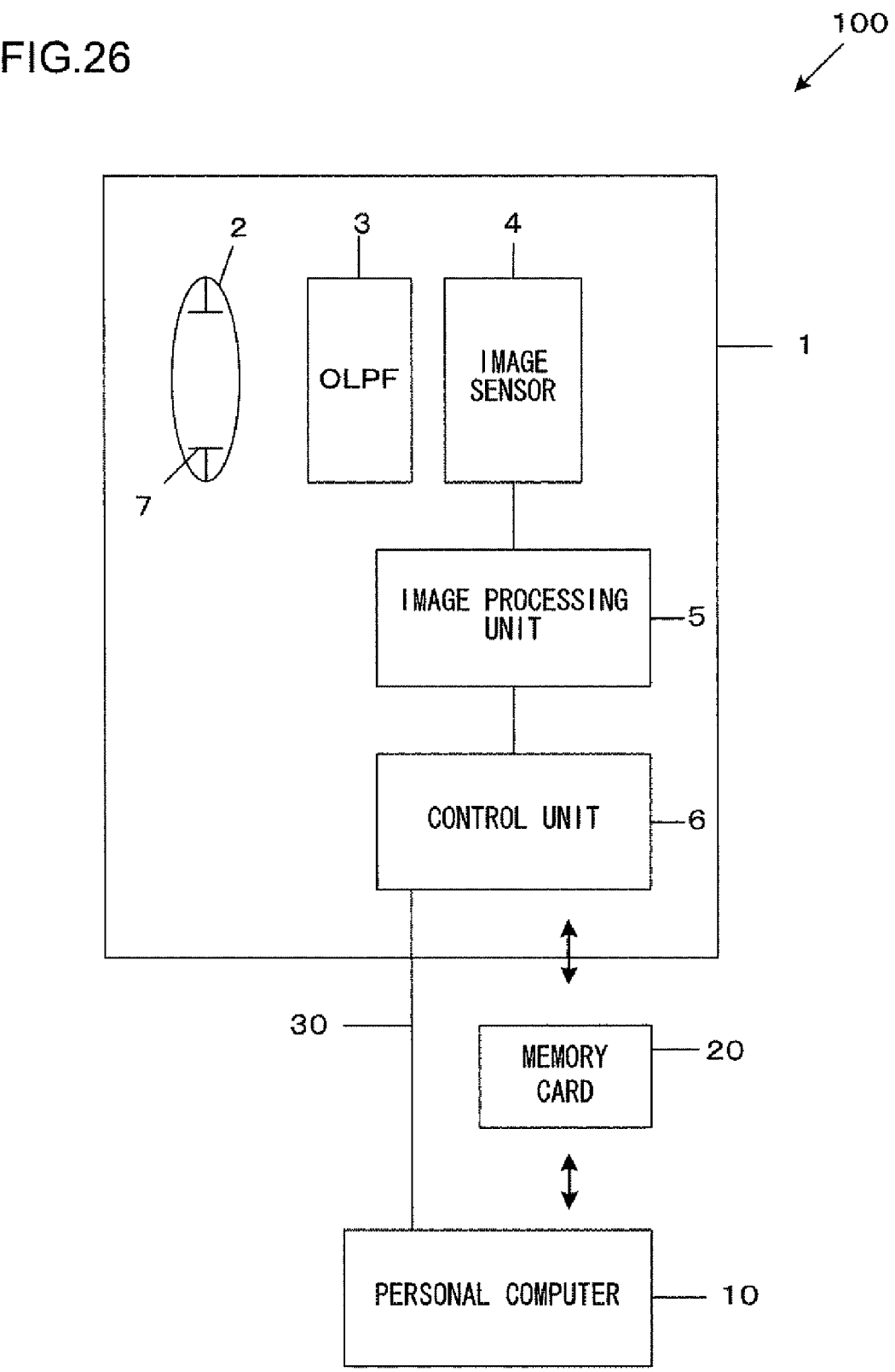
FIG. 26 shows The structure of a camera system 100 achieved in the first embodiment.

FIG. 26 shows the configuration of a camera system 100 achieved in the first embodiment. The camera system 100 includes a digital camera (electronic camera) 1 and a personal computer 10. The digital camera 1 comprises a photographic lens 2, an optical low pass filter 3, an image sensor 4, an image processing unit 5 and a control unit 6.

The digital camera 1 is a single lens reflex digital camera and the photographic lens 2 is an exchangeable lens. The photographic lens is mounted at the digital camera 1 via a lens mount unit (not shown). The group of exchangeable lenses that can be mounted at the digital camera 1 is a group of exchangeable lenses compatible with both the digital camera and film cameras in the related art. The photographic lens 2 includes an aperture 7 equipped with an aperture mechanism capable of aperture control to adjust the aperture number within a range between the maximum aperture number (at least F2.8 or a smaller F number) and F8 or a greater F number in the embodiment. In addition, the photographic lens 2 assumes the focal length value f at least within a range of 12 ~50 mm ~200 mm, so as to allow the digital camera to photograph fields corresponding to the wide angle setting, the standard setting and the telephoto setting in correspondence to the varying sizes that the image sensor 4 may assume as described below.

The image sensor 4, which is a single-plate color image sensor with R, G and B color filters disposed in a Bayer array, may be constituted with a CCD sensor. FIG. 32 shows the color filters disposed in a Bayer array. As shown in the figure, the color filters corresponding to the G component, disposed in a checkered pattern, amount to half the array density, with the other color filters corresponding to the R component and the B component disposed at the remaining pixels by achieving equal density levels. The size of the image sensor 4 may be 35 mm×24 mm, 23.4 mm×16.7 mm or 18 mm×13.5 mm, as described earlier, or the image sensor may assume a size between any two sets of these dimensions.

The image processing unit 5 executes various types of image processing such as white balance adjustment and compression processing on image data expressed in the RGB colorimetric system, resulting from A/D conversion of signals output from the image sensor 4 and having undergone various types of analog processing. The G component data expressed in the RGB colorimetric system also represent the luminance. The image processing unit 5 is constituted with an ASIC. The control unit 6 executes overall control of the digital camera 1 and also executes control under which the image data having undergone the image processing at the image processing unit 5 are output to an external device or the image data are recorded into a recording medium such as a memory card 20.

Image data generated by executing specific image processing on an image captured with the digital camera 1 are input to the personal computer 10 via a cable 34 or via the memory card 20. It is to be noted that such image data may be provided to the personal computer through wireless communication instead of via the cable 30. The personal computer 10 generates color image data by executing interpolation processing to be detailed later on the image data input thereto. In other words, the image data output from the digital camera 1 are made up with sets of data output from the individual pixels, each representing one of the color components, R, G and B in the RGB colorimetric system. In addition, the image data output from the digital camera 1 are image data expressing a still image. However, processing similar to that executed on the still image may be executed on each of frames constituting a video image.

(Optical Low Pass Filter Structure)

In the first embodiment, the diagonal bidirectional structure equipped with two symmetrical birefringence plates, among the three different types of optical low pass filters described earlier, is adopted. As has been described in the earlier section on the geometrical optics simulation, the results of the investigation conducted under the various lens utilization conditions indicated in FIGS. 13, 16 and 17 to determine which of the two types of optical low pass filters, i.e., the vertical/horizontal bidirectional type and the diagonal bidirectional type, would achieve a color moiré•spurious resolution-free state at a lower optical low pass filter strength level, prove that the diagonal bidirectional structure would be more advantageous under all set of conditions. Accordingly, examples of strength levels that may be assumed in the diagonal bidirectional-type optical low pass filters are investigated with respect to pixel pitch dependency in the first embodiment.

The sufficient conditions for the optical low pass filter strength levels required to achieve the simulation results corresponding to F2.8 in FIG. 13 can be assured by using the different color correlation interpolation algorithm described below and FIG. 27A lists the corresponding optimal structures.

Assuming that the pixels are disposed in a lattice array along two directions, X and Y, perpendicular to each other over pixel intervals (pitch) at (a, b) at the image sensor, the spatial frequency characteristics of the incident light is modulated via the optical low pass filter in the first embodiment by splitting the light beam along two diagonal directions ((1/2) a, (1/2) b)×($\sqrt{2}/\alpha$) and ((1/2) a, −(1/2) b)×($\sqrt{2}/\alpha$) relative to the x and y coordinate axes.

Figures 27A, 27B:
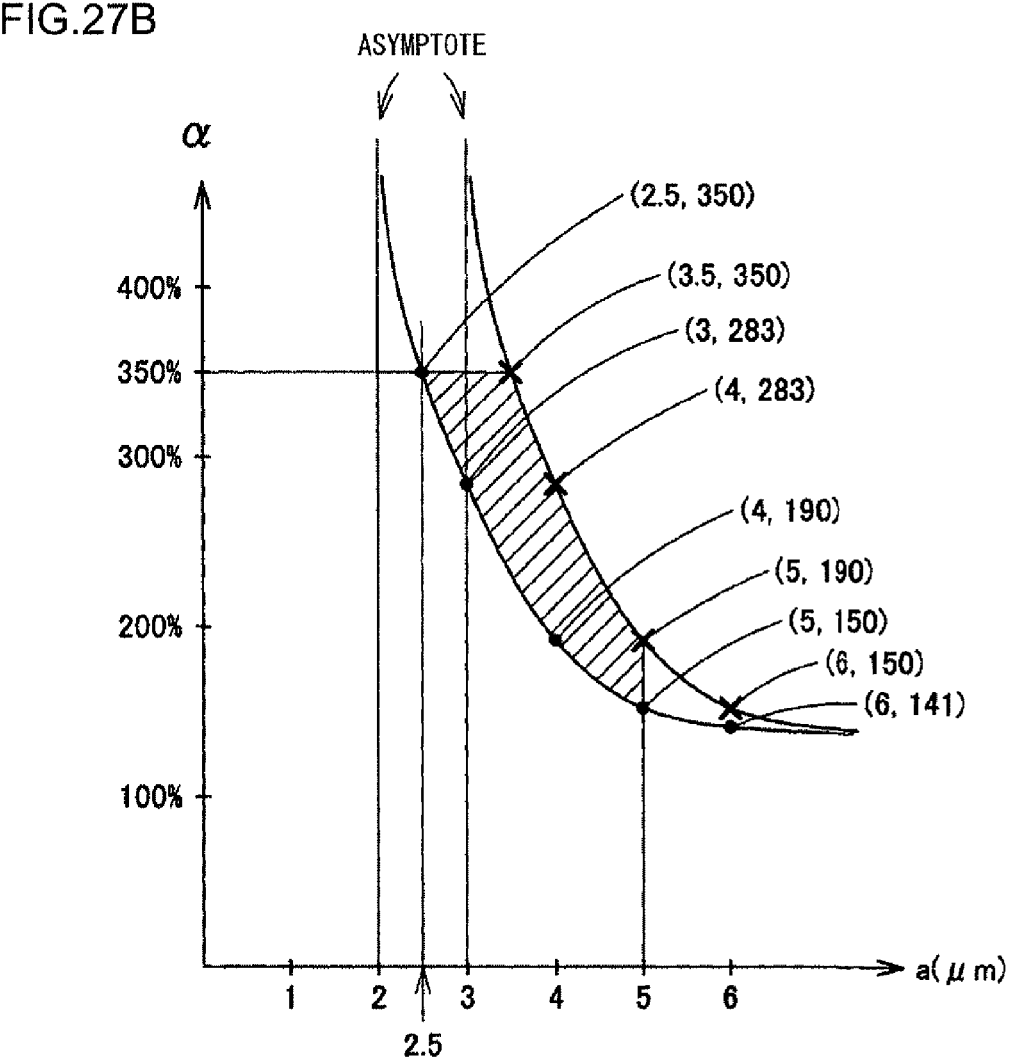
FIGS. 27A, 27B show optimal structures for the optical low pass filter in the first embodiment.

FIG. 27A indicates that $\alpha=\sqrt{2}=1.41$ when the pixel pitch is equal to or greater than approximately 6 μm/pixel, that $\alpha$ is set $\geq 1.5$ when the pixel pitch is approximately 5 μm/pixel, that $\alpha \geq 1.90$ when the pixel pitch is approximately 4 μm/pixel and that $\alpha \geq 2\sqrt{2}=2.83$ when the pixel pitch is approximately 3 μm/pixel. In other words, when the pixel pitches assumed along the two directions, i.e., along the X direction and the Y direction are equal to or less than 6 μm/pixel, $\alpha$ is set equal to or greater than $\sqrt{2}$ and that as the pixel pitch becomes smaller than 6 μm/pixel, the value assumed for $\alpha$ is monotonously increased. Namely, $\alpha$ can be considered to be a function that is in reverse proportion to the pixel pitch, which assumes values that gradually approach infinity when the pixel pitch is equal to or less than a predetermined pitch (3 μm/pixel in this example), and assumes values that asymptotically approach $\alpha_0$ (const) when the pixel pitch is equal to or greater than a predetermined pitch (6 μm/pixel in this example).

It is to be noted that FIG. 27A indicates the lower-limit values for $\alpha$ determined by sufficient conditions for the OLPF structure that will achieve a color moiré•spurious resolution-free state with a comfortable margin. However, the optimal a setting range may be selected by designating the lower-limit value corresponding to a pixel pitch smaller than the subject pixel pitch by 1 μm/pixel as an upper limit value, so as to achieve recovery of sharp definition while sustaining a state close to the color moiré•spurious resolution-free state. The graph in FIG. 27B indicates the optimal relationship that may be assumed between a and $\alpha$ by factoring in these considerations. The hatched area in the graph in FIG. 27B indicates the optimal range of the relationship between a and $\alpha$ when 2.5 μm$\leq a \leq$5.0 μm.

The left-side curve (with the black dots) in FIG. 27B is drawn by plotting the black dots indicating $\alpha$ values of 3 μm, 4 μm, 5 μm and 6 μm in FIG. 27A. The black dot at 2.5 μm indicates a cutoff point, i.e., no low pass filter is required over the range below 2.5 μm, and since a state sufficiently approximating a state in which no low pass filter is present is achieved over the range exceeding 350%, as indicated in FIGS. 11A, 11B, the upper limit to $\alpha$ is set at 350%. In addition, the straight line passing over 2 μm is an asymptote that assumes $\infty$ at 2 μm. The curve (with the Xs) on the right side in FIG. 27B is achieved by shifting the curve on the left side to the right by 1 μm.

Thus, the optimal range for the position to be set for an optical low pass filter extinction frequency band in conjunction with the image sensor 4 with the pixels therein disposed over intervals (a, b) of 2.5 ~5 μm along both directions has been shown to be 1.5 $\leq \alpha \leq$ 3.5 times the corresponding Nyquist frequency position assumed at the image sensor 4.

In addition, provided that aperture control can be executed over the range covering the number of maximum aperture that can be assumed at the photographic lens 2 through the aperture setting equal to or greater than F8, an optical low pass filter achieving the characteristics described above should be utilized if the value representing the pixel intervals at the image sensor 4 is within the range of 2 ~4 μm/pixel or equal to or greater than 6 μm/pixel. In addition, it is desirable to use no optical low pass filter at all once the pixel interval value becomes equal to or less than 2 μm/pixel. Namely, an optical low pass filter should be selectively installed for the digital camera 1 and no optical low pass filter should be installed if the pixel interval value is equal to or less than 2 μm/pixel.

Observations gleaned by examining the quality of images resulting from the geometrical optics simulation include the following. Namely, a highly noticeable aberration, such as longitudinal chromatic aberration manifested at a pixel pitch of 1 μm/pixel even when y (image height)=0 mm and z=0 μm (optimal focus). In addition, at this pixel pitch, an increase in the optical low pass filter strength simply led to further problems, since the application of the more powerful optical low pass filter caused the aberration component to expand over a plurality of pixels, resulting in significant amplification of a purple fringe, purple ghost or ghosting attributable to the lens itself. Accordingly, it would be absolutely crucial, from the viewpoint of minimizing the geometrical optics aberration, that no optical low pass filter be used when the pixel pitch is small.

It is to be noted that the present invention was conceived with the prerequisite for affording a higher level of freedom in optical low pass filter setting, that the color filters disposed at the image sensor assume an array, such as the Bayer array, in which color filters corresponding to the luminance component (G component) at least were evenly disposed by achieving spatial symmetry.

(Interpolation Algorithm)

As described earlier, the image sensor 4 is a single-plate image sensor equipped with color filters in the Bayer array, the output from each of the pixels at the image sensor 4 only holds color information corresponding to a single color component. Accordingly, in order to provide color information for all the color components, R, G and B, in correspondence to each pixel, the following interpolation processing is executed. This interpolation processing is executed in the personal computer 10.

[1] CrCb Plane Generation

1. Vertical/Horizontal Directional Decision Making 1

The following calculation is executed for each pixel taking up an R position or a B position.

(1) Similarity Factor Calculation
  (a) Different-color Similarities
    G-R (G-B) similarity components $$Cv0[i,j]=(|G[i,j-1]-Z[i,j]|+|G[i,j+1]-Z[i,j]|)/2$$

$$Ch0[i,j]=(|G[i-1,j]-Z[i,j]|+|G[i+1,j]-Z[i,j]|)/2$$

(b) Surrounding Pixel Similarity Factor Addition

This processing, which is executed in order to improve the similarity factor accuracy by taking into consideration the continuity that may manifest at the subject pixel relative to surrounding pixels, may be skipped if the processing needs to be simplified.

$$Cv[i,j]=(4*Cv0[i,j]+2*(Cv0[i-1,j-1]+Cv0[i+1,j-1]+Cv0[i-1,j+1]+Cv0[i+1,j+1])+Cv0[i,j-2]+Cv0[i,j+2]+Cv0[i-2,j]+Cv0[i+2,j])/16$$

$$Ch[i,j]=(4*Ch0[i,j]+2*(Ch0[i-1,j-1]+Ch0[i+1,j-1]+Ch0[i-1,j+1]+Ch0[i+1,j+1])+Ch0[i,j-2]+Ch0[i,j+2]+Ch0[i-2,j]+Ch0[i+2,j])/16$$

(2) Similarity Judgment

| | |
|---|---|
| If $|Cv[i,j]-Ch[i,j]| \leq Th0$ | $HVd[i,j]=0$, indeterminate vertical/horizontal similarity; |
| else if $Cv[i,j]<Ch[i,j]$ | $HVd[i,j]=1$, pronounced similarity along vertical direction; |
| else | $HVd[i,j]=-1$, pronounced similarity along horizontal direction. |

The threshold value Th0 should be set to a value around 10 in correspondence to the 256 gradation range and should assume a higher value if the noise in the image is more significant.

2. Chrominance Generation (1) Cr Plane Generation at R Position

```
if [i,j] is a R site in a Bayer plane{
    if          HVd[i,j]=1      Cr[i,j]=R[i,j]
                                    -{(G[i,j-1]+G[i,j+1])/2
                                    +(2*R[i,j]-R[i,j-2]-R[i,j+2])/4}
    else if     HVd[i,j]=-1     Cr[i,j]=R[i,j]
                                    -{(G[i-1,j]+G[i+1,j])/2
                                    +(2*R[i,j]-R[i-2,j]-R[i+2,j])/4}
    else                        Cr[i,j]=R[i,j]
                                    -{(G[i,j-1]+G[i,j+1]+G[i-1,j]+G[i+1,j])/4
                                    +(4*R[i,j]-R[i,j-2]-R[i,j+2]-R[i-2,j]-R[i+2,j]/8}
}
```

As an alternative, the chrominance data may be calculated as expressed below.

```
if [i,j] is a R site in a Bayer plane{
    if          HVd[i,j]=1      Cr[i,j]=R[i,j]
                                    -{(G[i,j-1]+G[i,j+1])/2
                                    +(2*G[i-1, j]-G[i-1, j-2]-G[i-1, j+2]
                                    +2*G[i+1, j]-G[i+1, j-2]-G[i+1, j+2])/8)
    else        if HVd[i,j]=-1  Cr[i,j]=R[i,j]
                                    -{(G[i-1,j]+G[i+1,j])/2
                                    +(2*G[i, j-1]-G[i-2, j-1]-G[i+2, j-1]
                                    +2*G[i, j+1]-G[i-2, j+1]-G[i+2, j+1])/8}
    else                        Cr[i,j]=R[i,j]
                                    -{(G[i,j-1]+G[i,j+1]+G[i-1,j]+G[i+1,j])/4
                                    +(2*G[i-1, j]-G[i-1, j-2]-G[i-1, j+2]
                                    +2*G[i+1, j]-G[i+1, j-2]-G[i+1, j+2]
                                    +2*G[i, j-1]-G[i-2, j-1]-G[i+2, j-1]
                                    +2*G[i, j+1]-G[i-2, j+1]-G[i+2, j+1])/16}
}
```

In this processing, the directional index HVd[i,j] obtained by judging the similarity based only upon the different-color similarity factors is used, since the occurrence of color artifacts around the Nyquist frequency can be significantly suppressed with such a directional index.

(2) Cr Plane Interpolation

B sites $$Cr[i,j]=(Cr[i-1,j-1]+Cr[i-1,j+1]+Cr[i+1,j-1]+Cr[i+1,j+1])/4$$

G sites (same lines as R rows)

$$Cr[i,j]=(Cr[i-1,j]+Cr[i+1,j])/2$$

G sites (same lines as B rows)

$$Cr[i,j]=(Cr[i,j-1]Cr[i,j+1])/2$$

Cb plane data can be generated through similar processing.

3. Temporary Chrominance Correction 1

The significant presence of color artifacts in the chrominance plane data generated as described in 2 causes color moiré and color mottling noise at high ISO sensitivity levels. While such color moiré and color mottling noise should be adaptively eliminated by distinguishing them from true color structures in the image, preliminary temporary color artifact removal is executed in order to ensure that when discriminating the color artifacts from color structures by using a color gradient index to be detailed next, a color artifact boundary is not mistaken for a color boundary. While two methods that may be adopted when executing the preliminary removal are described below, another method may be adopted.

Method 1 (Low Pass Processing)

A 9×9-size separation filter, for instance, may be used.

Horizontal Lowpass Filtering $$tmp\_Cr[i,j]=\{6*Cr[i,j]+4*(Cr[i-2,j]+Cr[i+2,j])+(Cr[i-4,j]+Cr[i+4,j])\}/16$$

Vertical Lowpass Filtering $$TCr1[i,j]=\{6*tmp\_Cr[i,j]+4*(tmp\_Cr[i,j-2]+tmp\_Cr[i,j+2])+(tmp\_Cr[i,j-4]+tmp\_Cr[i,j+4])\}/16$$

Similar processing is executed for TCb1[i,j].

Method 2 (Median Processing)

$$TCr1[i,j]=\text{Median}\{Cr[i+m,j+n]\}$$

m=0, ±1, ±2, ±3, ±4 n=0, ±1, ±2, ±3, ±4

4. Color Gradient Analysis

Next, color artifacts are distinguished from actual color in the image by checking the color gradient, in order to keep the true color structure intact. Since the actual color present in the image tends to more reliably retain contrast compared to color artifacts after the chrominance correction processing described in 3, actual color can be distinguished from color artifacts with a very high level of reliability based upon these statistically substantiated characteristics. In order to protect the color structure at the highest possible level of accuracy, a color index plane, with which the color contrast between actual colors is raised and the color contrast between false colors is lowered, is created. Since color artifacts more readily manifest between opposite colors under normal circumstances, such a color index should be created for the primary colors.

Namely, the temporary chrominance signals TCr1[i,j] and TCb1[i,j] having been calculated as described above are converted to a color index Cdiff[i,j] to be used to evaluate the color for each pixel.

$$Cdiff[i,j]=(|TCH[i,j]|+|TCb1[i,j]|+|TCr1[i,j]-TCb1[i,j]|)/3$$

With the color index obtained as described above, the color structure can be protected more effectively by using chrominance information indicating the color differences between the primary colors in all possible combinations of the three primary colors R, G and B. The chrominance defining expression may be expanded as follows.

$$Cdiff=(|R-G|+|G-B|+|B-R|)/3$$

Next, the color gradient indicating the extent to which the color changes is determined within a single color index plane having color contrast information held therein. At this time, better color structure indestructibility is assured by assuming a filter size matching the temporary chrominance correction filter size for the differentiating filter used for color gradient detection and thus ensuring that any range where destruction may occur can be fully investigated.

$$Cgrad[i,j] = \sum_{\substack{m=\pm 1,\pm 2,\pm 3,\pm 4 \\ n=\pm 1,\pm 2,\pm 3,\pm 4}} |Cdiff[i+m,j+n] - Cdiff[i,j]|$$ [Expression 11]

$$= grad(Cdiff[i,j])$$

The arithmetic operation may be speeded up by skipping the differentiation executed based upon the data at all the surrounding pixels or by reducing the number of pixels sampled in the differentiating operation.

It is to be noted that while the size of the filter used in this processing is 9×9 and matches the size of the filter used in "3. Temporary chrominance correction 1", 5×5-size filters may be used instead in the two types of processing.

5. Adaptive Chrominance Correction 1

A decision is made as to whether or not to execute chrominance correction processing based upon the level of the color gradient. The initial Cr[i,j] should be directly used for a color boundary area with a significant color gradient.

if Cgrad[i,j]≦ThG{Cr[i,j]=TCr1[i,j],Cb[i,j]=TCb1[i,j]}

Only a very small value needs to be set for the threshold value ThG to successfully designate an area manifesting color mottling noise or color moiré selectively as a chrominance correction target area whether it be a chromatic image area or an achromatic image area by exempting any true color structure from the chrominance correction. More specifically, the threshold value may assume a value of 5 or less in conjunction with the 255 gradation range.

Subsequently, uniform low pass filter processing may be executed over the entire plane by using a filter assuming a size of, for instance, 3×3 (pixels). Such uniform low pass filter processing may be expressed as follows.

$$Cr[i,j]=\{4*Cr[i,j]+2*(Cr[i-1,j]+Cr[i+1,j]+Cr[i,j-1]+Cr[i,j+1])+1*(Cr[i-1,j-1]+Cr[i+1,j-1]+Cr[i-1,j+1]+Cr[i+1,j+1])\}/16$$

In such a case, similar processing should also be executed for Cb[i,j].

"3. Temporary chrominance correction 1", "4. Color gradient analysis" and "5. Adaptive color correction 1" mentioned above may be substituted with "6. Temporary chrominance correction 2", "7. Color index calculation", "8. Color judgment" and "9. Adaptive chrominance correction 2", as detailed below. In addition, the processing executed as described in "6. Temporary chrominance correction 2", "7, Color index calculation", "8. Color judgment" and "9. Adaptive chrominance correction 2" may be substituted with "3. Temporary chrominance correction 1", "4. Color gradient analysis" and "5. Adaptive color correction 1" described earlier.

6. Temporary Chrominance Correction 2

In order to enable accurate color judgment, any color moiré still manifesting in the chrominance plane data is further removed. While a chrominance median filter may be used for these purposes, the color moiré can be removed quickly simply by using a low pass filter, as indicated below.

$$TCr2[i,j]=\{4*Cr[i,j]+2*(Cr[i-2,j]+Cr[i+2,j]+Cr[i,j-2]+Cr[i,j+2])+1*(Cr[i-2,j-2]+Cr[i+2,j-2]+Cr[i-2,j+2]+Cr[i+2,j+2])\}/16$$

TCb2[i,j] should be calculated through a similar operation.

7. Color Index Calculation

The chrominance component data calculated as described above indicate a scalar quantity based upon which the actual hue of the image can be measured in correspondence to each pixel by substantially completely eliminating any factors related to image structure. While the Cr component data indicating the color difference between R and G and the Cb component data indicating the color difference between B and G have already been calculated as color indices, the color difference between R and B also be evaluated based upon the scalar quantity calculated for each pixel and thus, color evaluation closely approximating human visual perception is enabled. The color index Cdiff may be calculated as follows.

$$Cdiff[i,j]=(|TCr2[i,j]|+|TCb2[i,j]|+|TCr2[i,j]-TCb[i,j]|)/3$$

Consequently, unlike in the related art, in which confusion attributable to structural factors tends to occur in color evaluation, the actual color is accurately separated from such structural factors, and since the color differences between all the color components are evaluated, an extremely accurate color index can be obtained. It is to be noted that this color index may be regarded to represent the level of color nuance.

It is to be noted that in this processing, too, the data at surrounding pixels may be incorporated, as in the surrounding pixel similarity factor addition, so as to further improve the accuracy of the color index.

8. Color Judgment

Next, the continuous color index calculated as described above is judged based upon a threshold value and is converted to a discrete color index BW[i,j] indicating the color judgment results.

| If Cdiff[i,j] =<Thbc | BW[i,j] = 'b' | low-chromaticity area |
| elseBW[i,j] = 'c' | chromatic area | |

A threshold value Thbc of up to approximately 15 should be taken in conjunction with the 256 gradation range.

9. Adaptive Chromatic Correction 2

The chromaticity of the Nyquist color artifacts having manifested prior to the correction will have been lowered in the chrominance plane data having undergone the temporary correction processing. Accordingly, color artifacts present over any achromatic area are suppressed to the maximum extent based upon the color judgment results while retaining the color structures in chromatic areas.

if BW[i,j]!='c'{Cr[i,j]=TCr2[i,j],Cb[i,j]=TCb2[i,j]}

10. Color Index Calculation

By using the clean chrominance plane data resulting from the adaptive color artifact removal processing described above, a color index Cdiff is calculated again. With this color index, the level of accuracy with which color artifacts are discriminated from actual colors when selecting either the same-color correlation-based algorithms or different-color correlation-based algorithm to generate luminance plane data, is maximized.

$$Cdiff[i,j]=(|Cr[i,j]|+|Cb[i,j]|+|Cr[i,j]-Cb[i,j]|)/3$$

It is to be noted that in this processing, too, the data at surrounding pixels may be incorporated, as in the surrounding pixel similarity factor addition, so as to further improve the accuracy of the color index.

11. Color Judgment

Next, the continuous color index calculated as described above is judged based upon a threshold value and is converted to a discrete color index BW[i,j] indicating the color judgment results.

If Cdiff[i,j]=<Thab BW[i,j]='a' achromatic area

A threshold value Thab of up to approximately 5 should be taken in conjunction with the 256 gradation range.

[2] G Plane Generation

1. Vertical/horizontal Directional Decision Making 2

The following calculation is executed for each pixel taking up an R position or a B position.

(1) Similarity Factor Calculation (a) Same-color Similarities $$Cv0[i,j]=(Cv1+Cv2)/2$$

$$Ch0[i,j]=(Ch1+Ch2)/2$$

with G-G similarity component calculated as;

$$Cv1=|G[i,j-1]-G[i,j+1]|$$

$$Ch1=|G[i-1,j]-G[i+1,j]|$$

and

B-B (R-R) similarity component calculated as;

$$Cv2=(|Z[i-1,j-1]-Z[i-1,j+1]|+|Z[i+1,j-1]-Z[i+1,j+1]|)/2$$

$$Ch2=(|Z[i-1,j-1]-Z[i+1,j-1]|+|Z[i-1,j+1]-Z[i+1,j+1]|)/2$$

(b) Surrounding Pixel Similarity Factor Addition

As is the case with the surrounding pixel addition, which may be executed as part of the different-color similarity factor calculation, this operation may be skipped in order to simplify the processing.

$$Cv[i,j]=(4*Cv0[i,j]+2*(Cv0[i-1,j-1]+Cv0[i+1,j-1]+Cv0[i-1,j+1]+Cv0[i+1,j+1])+Cv0[i,j-2]+Cv0[i,j+2]+Cv0[i-2,j]+Cv0[i+2,j])/16$$

$$Ch[i,j]=(4*Ch0[i,j]+2*(Ch0[i-1,j-1]+Ch0[i+1,j-1]+Ch0[i-1,j+1]+Ch0[i+1,j+1])+Ch0[i,j-2]+Ch0[i,j+2]+Ch0[i-2,j]+Ch0[i+2,j])/16$$

(2) Similarity Judgment

| If |Cv[i,j]-Ch[i,j]|=<Th1 | HVs[i,j] = 0, indeterminate vertical/horizontal similarity; |
| else if Cv[i,j]<Ch[i,j] | HVs[i,j] = 1, pronounced similarity along vertical direction; |
| else | HVs[i,j] = -1, pronounced similarity along horizontal direction. |

A value substantially matching that set for Th0 should be taken for the threshold value Th1.

2. Selection of Directional Index

Based upon the color judgment results, either the directional decision making results obtained based upon the different-color similarity factors and the directional decision making results obtained based upon the same-color similarity factors are selectively used.

| | | |
|---|---|---|
| if | BW[i,j]='a' | HV[i,j]=HVd[i,j] |
| else | | HV[i,j]=HVs[i,j] |

3. Diagonal Decision Making

The following calculation is executed for each pixel taking up an R position or a B position.

(1) Similarity Factor Calculation (a) Similarities $$C45\_0[i,j]=(a1*C45\_1+a2*C45\_2+a3*C45\_3)/(a1+a2+a3)$$

$$C135\_0[i,j]=(a1*C135\_1+a2*C135\_2+a3*C135\_3)/(a1+a2+a3)$$

with B-R (R-B) similarity component calculated as;

$$C45\_1=(|Z[i+1,j-1]-Z[i,j]|+|Z[i-1,j+1]-Z[i,j]|)/2$$

$$C135\_1=(|Z[i-1,j-1]-Z[i,j]|+|Z[i+1,j+1]-Z[i,j]|)/2$$

G-G similarity component calculated as;

$$C45\_2=(|G[i,j-1]-G[i-1,j]|+|G[i+1,j]-G[i,j+1]|)/2$$

$$C135\_2=(|G[i,j-1]-G[i+1,j]|+|G[i-1,j]-G[i,j+1]|)/2$$

and

B-B (R-R) similarity component calculated as;

$$C45\_3=|Z[i+1,j-1]-Z[i-1,j+1]|$$

$$C135\_3=(|Z[i-1,j-1]-Z[i-1,j+1]|$$

The constants a1, a2 and a3 may be set so that a1=a2=a3=1 or so that a1=a2=2 and a3=1.

(b) Surrounding Pixel Similarity Factor Addition

As is the case with the surrounding pixel addition, which may be executed as part of vertical/horizontal color similarity factor calculation, this operation may be skipped in order to simplify the processing.

$$C45[i,j]=(4*C45\_0[i,j]+2*(C45\_0[i-1,j-1]+C45\_0[i+1,j-1]+C45\_0[i-1,j+1]+C45\_0[i+1,j+1])+C45\_0[i,j-2]+C45\_0[i,j+2]+C45\_0[i-2,j]+C45\_0[i+2,j])/16$$

$$C135[i,j]=(4*C135\_0[i,j]+2*(C135\_0[i-1,j-1]+C135\_0[i+1,j-1]+C135\_0[i-1,j+1]+C135\_0[i+1,j+1])+C135\_0[i,j-2]+C135\_0[i,j+2]+C135\_0[i-2,j]+C135\_0[i+2,j])/16$$

(2) Similarity Judgment

| | |
|---|---|
| If |C45[i,j]−C135[i,j]|=<Th2 | DN[i,j] = 0, indeterminate diagonal similarity; |
| else if |C45[i,j]<C135[i,j] | DN[i,j] = 1, pronounced similarity along diagonal 45° direction; |
| else | DN[i,j] = −1, pronounced similarity along diagonal 135° direction. |

A value substantially matching that set for Th0 and Th1 should be taken for the threshold value Th2.

(4) G Plane Generation

```
if [i,j] is not a G site in a Bayer plane{
    if HV[i,j]=0{
        if DN[i,j]=0           G[i,j]=(Gv+Gh)/2
        else if DN[i,j]=1      G[i,j]=(Gv45+Gh45)/2
        else                   G[i,j]=(Gv135+Gh135)/2
    }
    else if HV[i,j]=1{
        if DN[i,j]=0           G[i,j]=Gv
        else if DN[i,j]=1      G[i,j]=Gv45
        else                   G[i,j]=Gv135
    }
    else{
        if DN[i,j]=0           G[i,j]=Gh
        else if DN[i,j]=1      G[i,j]=Gh45
        else                   G[i,j]=Gh135
    }
}
when
    Gv=(G[i,j−1]+G[i,j+1])/2
       +(2*Z[i,j]−Z[i,j−2]−Z[i,j+2])/8
       +(2*G[i−1,j]−G[i−1,j−2]−G[i−1,j+2]
         +2*G[i+1,j]−G[i+1,j−2]−G[i+1,j+2])/16
    Gv45=(G[i,j−1]+G[i,j+1])/2
       +(2*Z[i,j]−Z[i,j−2]−Z[i,j+2])/8
       +(2*Z[i−1,j+1]−Z[i−1,j−1]−Z[i−1,j+3]
         +2*Z[i+1,j−1]−Z[i+1,j−3]−Z[i+1,j+1])/16
    Gv135=(G[i,j−1]+G[i,j+1])/2
       +(2*Z[i,j]−Z[i,j−2]−Z[i,j+2])/8
       +(2*Z[i−1,j−1]−Z[i−1,j−3]−Z[i−1,j+1]
         +2*Z[i+1,j+1]−Z[i+1,j−1]−Z[i+1,j+3])/16
    Gh=(G[i−1,j]+G[i+1,j])/2
       +(2*Z[i,j]−Z[i−2,j]−Z[i+2,j])/8
       +(2*G[i,j−1]−G[i−2,j−1]−G[i+2,j−1]
         +2*G[i,j+1]−G[i−2,j+1]−G[i+2j+1])/16
    Gh45=(G[i−1,j]+G[i+1,j])/2
       +(2*Z[i,j]−Z[i−2,j]−Z[i+2,j])/8
       +(2*Z[i+1,j−1]−Z[i−1,j−1]−Z[i+3,j−1]
         +2*Z[i−1,j+1]−Z[i−3,j+1]−Z[i+1,j+1])/16
    Gh135=(G[i−1,j]+G[i+1,j])/2
       +(2*Z[i,j]−Z[i−2,j]−Z[i+2,j])/8
       +(2*Z[i−1,j−1]−Z[i−3,j−1]−Z[i+1,j−1]
         +2*Z[i+1,j+1]−Z[i−1,j+1]−Z[i+3,j+1])/16
```

[3] Color Image Output

With Cr[i,j], Cb[i,j] and G[i,j] calculated for each pixel, a complete color image is created. The color image data may then undergo the following colorimetric system conversion in order to express the image in the RGB colorimetric system.

$$R[i,j]=Cr[i,j]+G[i,j]$$

$$B[i,j]=Cb[i,j]+G[i,j]$$

The algorithm used in the interpolation processing may be summarized as follows. Different-color similarity factors are calculated along at least two directions, i.e., along the x-axis and the y-axis, based upon color signals representing different color components and sampled at positions distanced from one another over the minimum pixel interval, for each of image signal (image data) obtained by digitizing signals output from the image sensor 4. The direction along which pronounced similarity manifests is determined based upon the different-color similarity factors, and a color signal representing a color component commonly applicable to the pixels is generated based upon the similarity judgment results.

In addition, based upon the similarity judgment results, chrominance component signals (Cr, Cb) indicating the color differences manifested by color component signals (the R component and the B component) relative to the color component signal (G component) representing the luminance, are generated in correspondence to each pixel and, based upon the chrominance signals thus generated, at least one index, i.e., at least either a color index indicating the color nuance level and a color gradient index indicating the extent of color change, is calculated. The chrominance signals are then adaptively corrected based upon the index before the corrected chrominance component signals are output as image data.

The color index or the color gradient index is calculated based upon chrominance signals obtained by subjecting the chrominance signals having been generated to virtual uniform correction.

Moreover, based upon the adaptively corrected chrominance signals, a color index indicating the level of color nuance is calculated and, based upon this color index, a decision is made as to whether the different-color similarity factors calculated based upon color signals representing different color components or the same-color similarity factors calculated based upon color signals corresponding to a single color component assure a higher level of reliability. Then, based upon the similarity factors having been judged to be more reliable, the direction along which pronounced similarity manifests is determined and a color component signal (G component) representing the luminance is then generated and output for each pixel based upon the similarity judgment results.

-Second Embodiment-

Optical low pass filters that may be used in the digital camera in the second embodiment adopt a structure different from that in the first embodiment. Since other structural features are identical to those in the first embodiment, a repeated explanation is not provided. The following is a description of the optical low pass filters achieved in the second embodiment.

(Optical Low Pass Filter Structure)

In the second embodiment, the vertical unidirectional structure equipped with a single birefringence plate, which does not achieve symmetrical filtering but assures outstanding definition, among the three types of optical low pass filters described earlier, is adopted. Such an optical low pass filter with a simpler structure will contribute to cost reduction. By determining the strength at which a color moiré•spurious resolution-free state is achieved at F2.8, as indicated in FIG. 15 in reference to which that geometrical optics simulation has been described earlier, sufficient conditions is provided in relation to the pixel pitch dependency achieved based upon the interpolation algorithm described in reference to the first embodiment.

Figures 28A, 28B:
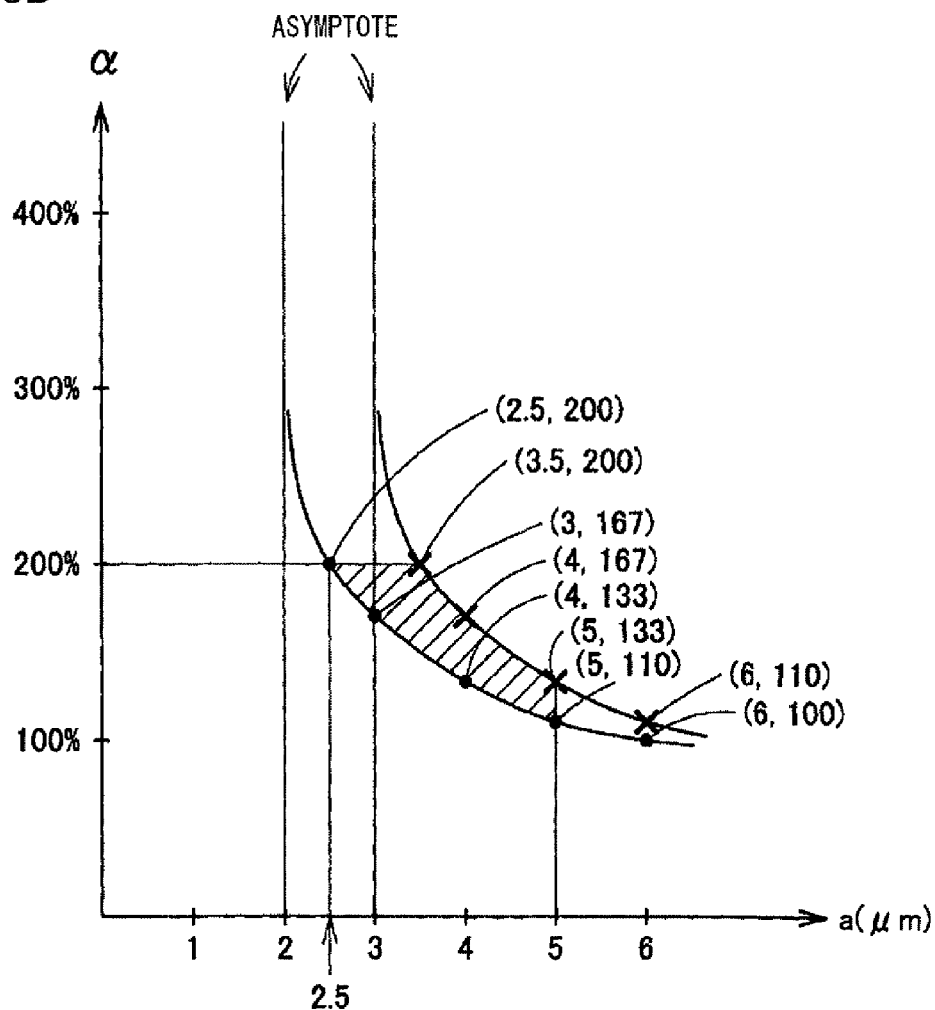
FIGS. 28A, 28B show optimal structures for the optical low pass filter in the second embodiment.

FIG. 28A presents a table listing optimal structures that may be assumed for the optical low pass filter in the second embodiment. The optical low pass filter equipped with a single birefringence plate in the second embodiment is only effective when installed in a camera assuming a pixel pitch equal to or less than 6 μm/pixel.

Assuming that the pixels are disposed in a grid pattern along two directions x and y perpendicular to each other, over pixel intervals (pitch) at (a, b) at the image sensor, the spatial frequency characteristics of the incident light is modulated via the optical low pass filter in the second embodiment by splitting the light beam along a single direction $(0, b) \times (1/\alpha)$ relative to the x and y coordinate axes.

FIG. 28A indicates that $\alpha=1$ when the pixel pitch is equal to approximately 6 μm/pixel, that $\alpha \geq 1.1$ when the pixel pitch is approximately 5 μm/pixel, that $\alpha \geq 1.3$ when the pixel pitch is approximately 4 μm/pixel and that $\alpha \geq 1.67 (=5/3)$ when the pixel pitch is approximately 3 μm/pixel. In other words, when the pixel pitch assumed along the two directions, i.e., along the x direction and the y direction is equal to or less than 6 μm/pixel, $\alpha$ is set equal to or greater than 1. In addition, it is desirable that no optical low pass filter be used once the pixel intervals become equal to or less than 2 μm/pixel. Namely, an optical low pass filter should be selectively installed for the digital camera 1 and no optical low pass filter should be installed if the pixel interval value is equal to or less than 2 μm/pixel.

It is to be noted that FIG. 28A indicates the lower-limit values for a determined by sufficient conditions for the OLPF structure that will achieve a color moiré•spurious resolution-free state with a comfortable margin. However, the optimal a setting range may be set by designating the lower-limit value corresponding to pixel pitch is smaller than the subject pixel pitch by 1 μm/pixel as an upper limit value, so as to achieve recovery of sharp definition while sustaining a state close to the color moiré•spurious resolution-free state. The graph in FIG. 288 indicates the optimal relationship that may be assumed between a and $\alpha$ by factoring in these considerations. The hatched area in the graph in FIG. 28B indicates the optimal range of the relationship between a and $\alpha$ when 2.5 μm $\leq a \leq$ 5.0 μm.

The left-side curve (with the black dots) in FIG. 28B, which is similar to FIG. 27B in reference to which the first embodiment has been described, is drawn by plotting the black dots indicating $\alpha$ values of 3 μm, 4 μm, 5 μm and 6 μm in FIG. 28A. The black dot at 2.5 μm indicates a cutoff point, i.e., no low pass filter is required over the range below 2.5 μm, and since a state sufficiently approximating a state in which no low pass filter is present is achieved over the range exceeding 200%, as indicated in FIGS. 11A, 11B, the upper limit to $\alpha$ is set at 200%. In addition, the straight line passing over 2 μm is an asymptote that assumes $\alpha$ at 2 μm. The curve (with the Xs) on the right side in FIG. 28B is achieved by shifting the curve on the left side to the right by 1 μm.

Thus, the optimal range for the position to be set for an optical low pass filter extinction frequency band in conjunction with the image sensor 4 with the pixels therein disposed over intervals (a, b) of 2.5 ~5 μm along both directions has been shown to be 1.1 $\leq \alpha \leq$ 2.0 times the corresponding Nyquist frequency positions assumed at the image sensor 4.

In addition, provided that aperture control can be executed over the range covering the number of maximum aperture that can be assumed at the photographic lens 2 through the aperture setting equal to or greater than F8, an optical low pass filter achieving the characteristics described above should be utilized if the value representing the pixel intervals at the image sensor 4 is within the range of 4 ~6 μm/pixel.

It is to be noted that the image sensor should assume a color filter array arrangement conforming to the arrangement rules laid out in the description of the first embodiment.

-Third Embodiment-

The digital camera in the third embodiment is equipped with an optical low pass filter adopting a structure different from that in the first embodiment. Since other structural features are identical to those in the first embodiment, a repeated explanation is not provided. The following is a description of the optical low pass filters achieved in the third embodiment.

(Optical Low Pass Filter Structure)

In the third embodiment, the vertical/horizontal bidirectional structure equipped with two symmetrical birefringence plates, among the three different types of optical low pass filters described earlier, is adopted. As has been described in the earlier section on the geometrical optics simulation, the results of the investigation conducted under the various lens utilization conditions indicated in FIGS. 13, 16 and 17 to determine which of the two types of optical low pass filters, i.e., the vertical/horizontal bidirectional type and the diagonal bidirectional type, would achieve a color moiré•spurious resolution-free state at a lower optical low pass filter strength level, prove that the diagonal bidirectional structure would be advantageous under all these conditions. However, there is a range over which a color moiré•spurious resolution-free state can be achieved in relation to the pixel pitch dependency with a vertical/horizontal bidirectional optical low pass filter assuming a lower level of strength compared to the related art. Over this range, the other functions of the optical low pass filter may be fulfilled through the lens MTF.

Figures 29A, 29B:
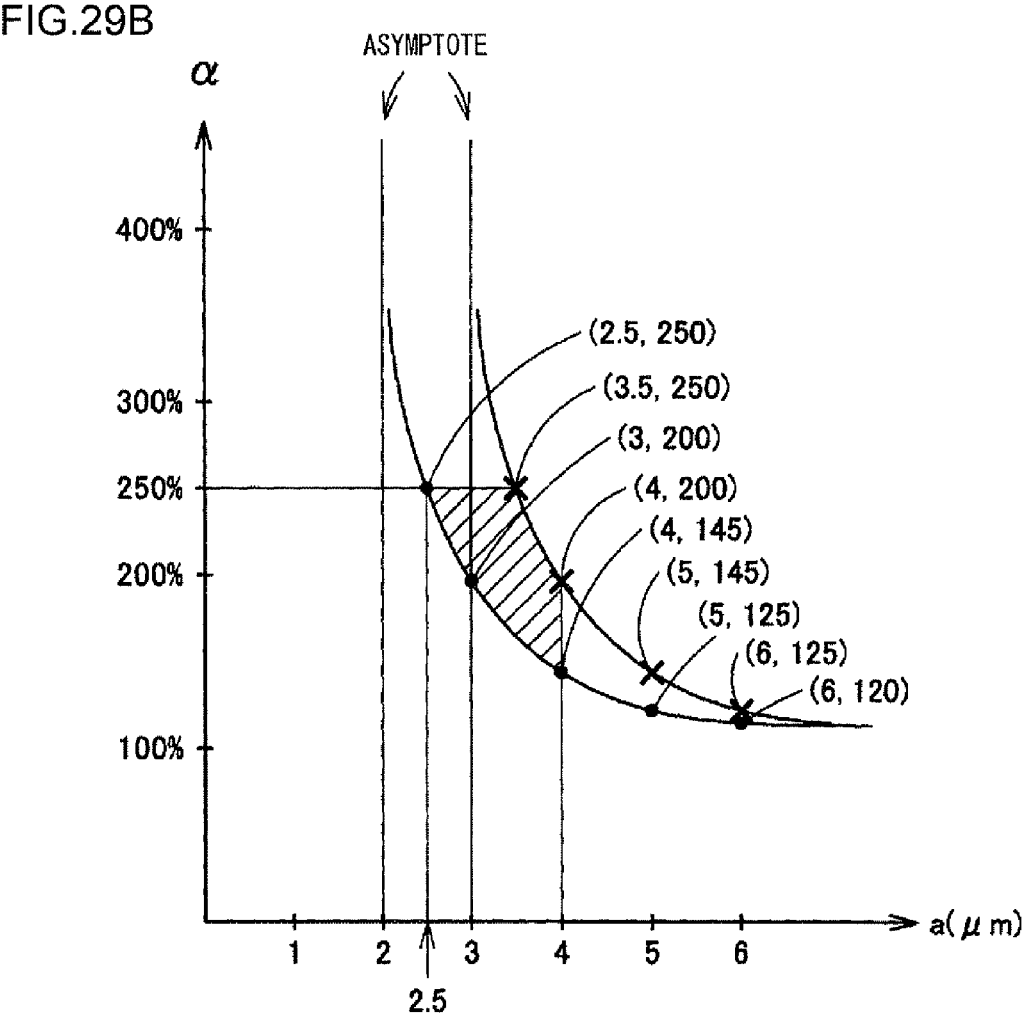
FIGS. 29A, 29B show optimal structures for the optical low pass filter in the third embodiment.

Accordingly, the vertical/horizontal bidirectional optical low pass filter structure is adopted in the third embodiment. FIG. 29A presents a table listing optimal structures that may be adopted in the optical low pass filter. It is to be noted that if it is not crucial to achieve a completely color moiré-free state, the strength of the optical low pass filter may be sustained over the 100 ~133% by range, as in the related art, at larger pixel pitches, and once the pixel pitch becomes equal to or less than a specific value (e.g., 4 μm/pixel), the optical low pass filter strength should be adjusted to a lower level.

Assuming that the pixels are disposed in a grid pattern along two directions x and y perpendicular to each other, with pixel intervals (pitch) at (a, b) at the image sensor, the spatial frequency characteristics of the incident light is modulated via the optical low pass filter in the third embodiment by splitting the light beam along two directions, i.e., the vertical direction and the horizontal direction (a/α, 0) and (0, b/α) relative to the x and y coordinate axes.

It is to be noted that FIG. 29A indicates the lower-limit values for α determined by sufficient conditions for the OLPF structure that will achieve a color moiré•spurious resolution-free state with a comfortable margin. However, the optimal a setting range may be set by designating the lower-limit value corresponding to pixel pitch is smaller than the subject pixel pitch by 1 μm/pixel as an upper limit value, so as to achieve recovery of sharp definition while sustaining a state close to the color moiré•spurious resolution-free state. The graph in FIG. 29B indicates the optimal relationship that may be assumed between a and α by factoring in these considerations. The hatched area in the graph in FIG. 29B indicates the optimal range of the relationship between a and α when 2.5 μm≦a≦4.0 μm.

The left-side curve (with the black dots) in FIG. 29B, which is similar to FIG. 27B in reference to which the first embodiment has been described, is drawn by plotting the black dots indicating α values of 3 μm, 4 μm, 5 μm and 6 μm in FIG. 29A. The black dot at 2.5 μm indicates a cutoff point, i.e., no low pass filter is required over the range below 2.5 μm, and since a state sufficiently approximating a state in which no low pass filter is present is achieved over the range exceeding 250%, the upper limit to α is set at 250%. In addition, the straight line passing over 2 μm is an asymptote that assumes infinity at 2 μm. The curve (with the Xs) on the right side in FIG. 29B is achieved by shifting the curve on the left side to the right by 1 μm.

Thus, the optimal range for the position to be set for an optical low pass filter extinction frequency band in conjunction with the image sensor 4 with the pixels therein disposed over intervals (a, b) of 2.5 ~5 μm along both directions has been shown to be 1.45≦α≦2.5 times the corresponding Nyquist frequency position assumed at the image sensor 4.

It is to be noted that the image sensor should assume a color filter array arrangement conforming to the arrangement rules laid out in the description of the first embodiment.

-Fourth Embodiment-

Since the color moiré•spurious resolution-free state is achieved with any one of the optical low pass filters in the first embodiment, the second embodiment and the third embodiment, it will be more advantageous to selectively use the optical low pass filter that assures the highest level of definition based upon the pixel pitch dependency characteristics thereof. FIG. 30 presents a diagram comparing the steepness index values calculated in conjunction with the various optical low pass filter structures under sufficient conditions determined for different pixel pitches. It is to be noted that sufficient conditions under which the vertical/horizontal bidirectional low pass filter ensures color moiré•spurious resolution-free conditions are determined based upon the points plotted for F2.8 in FIG. 13 and the diagram includes a reference graph of the steepness index calculated corresponding to the sufficient conditions, too.

The graphs in FIG. 30 indicates the optimal optical low pass filter lineup presented in FIG. 31.

The table includes the remark that it is not absolutely necessary to use an optical low pass filter when the pixel pitch is at 3 pin/pixel for the following reason. Namely, based upon the results of the geometrical optics simulation corresponding to 2 μm/pixel and F2.8 in FIG. 13, it has been concluded that no optical low pass filter is required as long as the interpolation algorithm achieved in the embodiments is used even if the contrast level at the Nyquist frequency becomes lowered to a level corresponding to these conditions. The table in FIG. 25 indicates that the contrast value corresponding to these conditions is 1/contrast=9±5. While there is a significant margin of error, this value corresponds to the MTF value of approximately 0.1, i.e., approximately 10%.

FIGS. 23A, 23B present synthesized contrast data indicating that the contrast value at the pixel pitch of 3 μm/pixel under the more rigorous condition, i.e., F2.8, at which the contrast level is higher, is 1/contrast=5±1. This means that the likelihood of achieving the color moiré•spurious resolution-free state within the margin of error through simulation conducted by integrating the actual wave optics principle is high. Thus, it can be estimated that once the pixel pitch becomes equal to or lower than 2.5±0.5 μm/pixel, no optical low pass filter is required, as long as the different color correlation-based interpolation algorithm is in place in conjunction with single lens reflex lens groups. Assuming that the camera is compatible with 35×24 mm film, it will be equipped with 135,000,000 pixels or 93~210,000,000 pixels when the margin of error is taken into consideration.

As described above, the continued use of the existing lenses for single lens reflex cameras is made possible by adjusting the strength of the optical low pass filter to a lower level and thus raising the steepness index, even as the pixel pitch becomes increasingly small and the extent of blurring attributable to lower MTF at the single lens reflex camera lenses increases. In addition, a specific type of optical low pass filter is selectively installed in the digital camera 1 and no optical low pass filter is installed if the value representing the pixel intervals is equal to or less than 2.5±0.5 μm/pixel. Thus, it is ensured that an optical low pass filter is installed only if it is necessary, i.e., there is no superfluous optical low pass filter installation.

The following advantages are achieved through the camera system 100 in the embodiments described above.

(1) By fully recognizing and taking full advantage of the fundamental capability of image processing, functions having been typically fulfilled by an optical low pass filter in the related art can otherwise be fulfilled through the lens MTF even as the pixel pitch becomes increasingly small and, as a result, desirable overall MTF characteristics can be sustained. Consequently, the issue of blurring, which becomes more serious as the existing lens systems come to be equipped with increasingly greater numbers of pixels, can be effectively addressed.

(2) By taking full advantage of the color interpolation processing technology, i.e. the demosaicing technology, which assures improved directional resolution and improved color artifact suppression, an image processing unit capable of high-performance image processing may be assigned to take effective countermeasures against color artifacts and spurious resolution over the frequency ranges in which it demonstrates outstanding performance capability, even when the number of pixels in the system is not increased. Thus, while the MTF over these frequency ranges is sustained at a high level, the action of the optical low pass filter can be targeted on a frequency range in which there are problems that cannot be fully dealt with through image processing, so as to obtain a high-quality interpolated image in which color moiré is suppressed even more effectively while assuring substantially higher MTF characteristics within the resolution limit frequency band compared to the related art. Consequently, the relation of inequality, whereby "retention of sharp definition and color artifact suppression can be achieved at once only to a certain extent" in agreement with the uncertainty principle in quantum mechanics, can be adjusted to a relationship approximating equality by designing an optimal optical low pass filter in conjunction with a high-performance image processing algorithm.

(3) By substituting the MTF-lowering effect attributable to the geometrical optical aberration that manifests evenly within the image plane under certain lens utilization conditions for the wave optics lens MTF decrease at the image forming optical system, which becomes more pronounced only as the pixel pitch at the image sensor becomes smaller, as well as achieving part of the effect attributable to the optical low pass filter MTF characteristics in the related art through the image processing technology, sharply defined, well-focused images on average can be provided at all times while effectively preventing the occurrence of color moiré•spurious resolution under most standard operating conditions.

(4) Furthermore, high-quality, sharply-defined images can be created through existing lens systems now equipped with ever increasing numbers of pixels by redesigning the optical low pass filter structure, and as a result, the existing lens systems can remain in use. In other words, the existing lenses can be used in conjunction with a single lens reflex camera equipped with a very large number of pixels, instead of having to acquire a new set of lenses to be used exclusively in conjunction with such a camera.

(5) Since the effects achieved through the optical low pass filter in the related art can be fulfilled through the lens MTF and image processing, the thickness of expensive birefringence plates in the optical low pass filter can be reduced, or the quantity of birefringence plates can be reduced from two to one, which is bound to lead to a reduction in production costs.

It is to be noted that the embodiments described above call for the following supplementary explanation, as well as allowing for the variations described below.

(1) An optical low pass filter may be installed in a compact camera equipped with a small image sensor used in conjunction with a dedicated lens instead of in a single lens reflex camera equipped with a large image sensor. The pixel pitch assumed at such a small image sensor may be as small as 2 μm/pixel. Since the wave optics MTF explained earlier decreases to an excessive extent in such a camera system, there is often no function for deep aperture adjustment but the camera is often designed to be used in conjunction with a fast dedicated lens assuming an aperture number of, for instance, F2 and to achieve high MTF toward the faster F number side with respect to the geometrical optical aberration as well. Such a system requires an optical low pass filter, since the MTF is sustained at a high level even at small pixel pitches.

This approach may be considered to provide a solution in the direction proposed earlier in U.S. Pat. No. 6,111,608. Namely, even as the pixel pitch becomes increasingly small, the optical low pass filter remains in place as is and the lens performance is improved by adjusting the lens design. In contrast, the object of the present invention is to allow the use of existing lens systems and effectively prevent color artifact•spurious resolution by adjusting the optical low pass filter design in combination with high-performance image processing. It is to be noted that the optimal structure, among those proposed in the description, that may be adopted at a pixel pitch typically assumed at a compact camera system is considered to be the diagonal bidirectional 141% dd optical low pass filter used in conjunction with different-color correlation-based image processing.

The challenges arising with respect to lens optical systems in single lens reflex systems as the pixel pitch at the image sensor becomes increasingly small are yet again summarized, this time in comparison with the challenges arising in compact camera systems.

Generally speaking, it becomes more difficult to suppress the geometrical optical aberration in direct proportion to the focal length of the lens. The lens in a single lens reflex camera system normally assumes a focal length f of 17 mm (wide-angle)~50 mm (standard)~200 mm (telephoto) or more in conjunction with, for instance, a 35 mm×24 mm image sensor. The lens in a compact camera system equipped with a smaller image sensor, e.g., a ⅓-type image sensor or a 4.8 mm×3.6 mm image sensor, only needs to assume a relatively small focal length when photographing a given field and normally assumes a focal length of approximately 7 ~10 mm.

Accordingly, the problem of geometrical optical aberration is usually more serious in a lens in a single lens reflex camera system with a greater focal length, and since the lens needs to have a large aperture diameter in order to assure good lens speed, its aberration characteristics tend to be particularly poor on the maximum aperture setting side. For this reason, the lens used in a single lens reflex camera system is normally designed to achieve the best characteristics with regard to the geometrical optical aberration over a range of F5.6 through F8. This means that due to the adverse effect of the geometrical optical aberration, it becomes increasingly difficult to sustain desirable contrast around the Nyquist frequency at the maximum aperture setting where the MTF characteristics tend to be poor, as the image sensor used in conjunction with the set of exchangeable lenses in a single lens reflex camera system, becomes further miniaturized.

A lens in a single lens reflex camera system is usually equipped with an aperture mechanism capable of adjustment within a range of for instance, F2.8 through F22. As the aperture opening is further reduced, the lens is more readily subjected to the adverse effect of the lowered MTF attributable to the wave optics diffraction and once the pixel pitch a becomes equal to or less than 5 μm/pixel, the adverse effect becomes more pronounced in an aperture range of F2.8 through F11, in which the lens is normally used, as indicated in FIG. 18. U.S. Pat. No. 6,111,608 asserts that the MTF can be approximated in an expression whereby it decreases linearly to the resolution limit frequency $1/(F\lambda)$ relative to the frequency f (lines/mm) and the no resolution is achieved beyond this point. Namely, $MTF(f)=1-f\sim F\lambda$ when $\lambda=0.54$ μm. It is to be noted that a relationship expressed as $k=2\pi f$ exists in relation to the frequency expressed in the k space.

Figure 33:
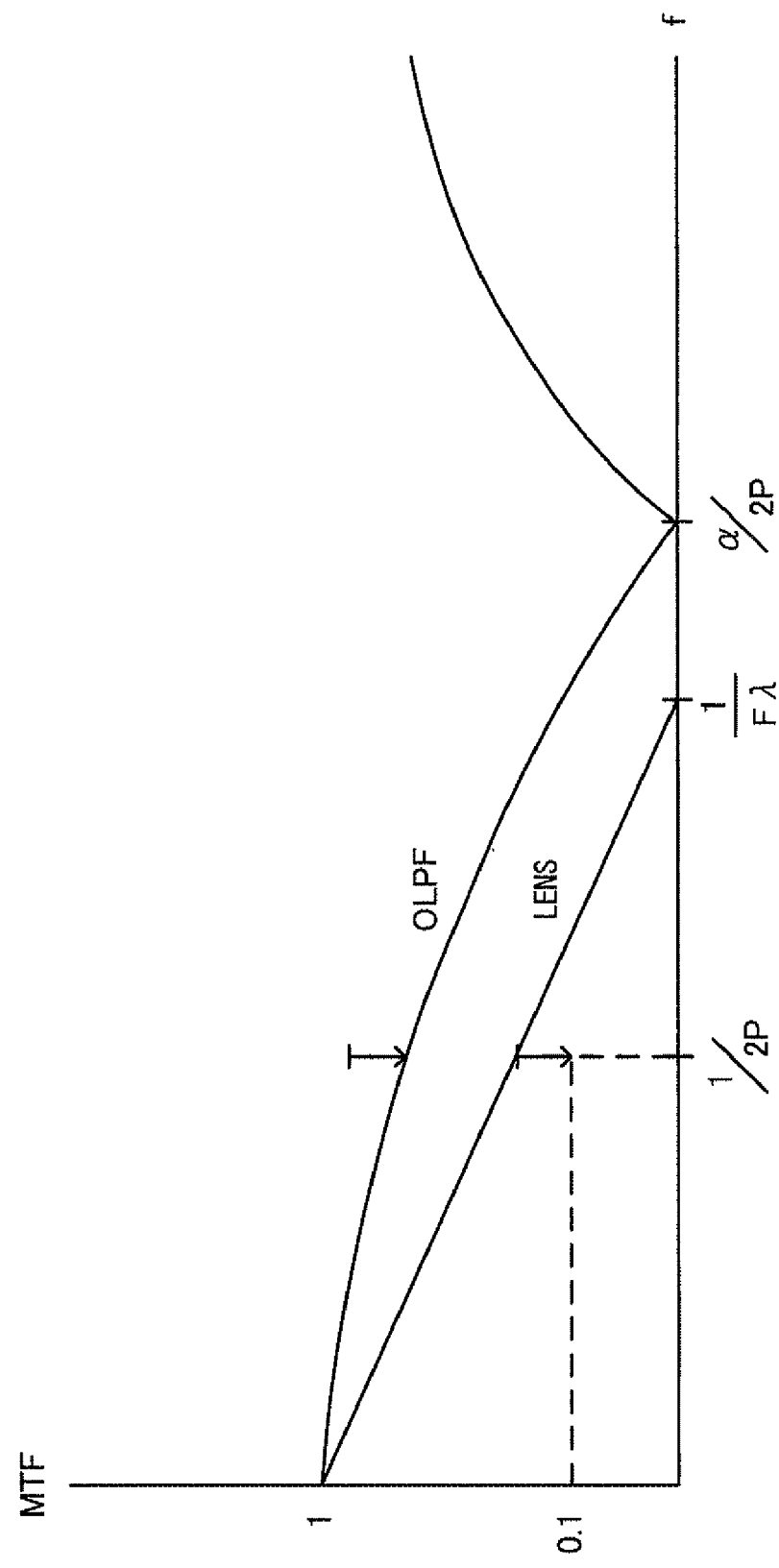
FIG. 33 shows a schematic diagram indicating the relationship between the image sensor and the resolution limit frequency $f_{N=1}/(2a)$ and the relationship between the optical low pass filter and the extinction frequency band $\alpha/(2a)$.

FIG. 33 schematically indicates the relation of the MTF to the resolution limit frequency $f_N 1/(2a)$ at the image sensor and also the relation of the MTF to the extinction frequency band $\alpha/(2a)$ of the optical low pass filter. As the figure indicates, the resolution can no longer be maintained around the Nyquist frequency in terms of wave optics even at F8, at which the best characteristics are assured with respect to geometrical optical aberration, as the Nyquist frequency $f_N$ becomes closer to $1/(F\lambda)$.

As described above, the lens optical system is subjected to the pixel pitch-dependent influence from two aspects, i.e., the influence attributable to the focal length and manifesting as the lower MTF at F numbers closer to the maximum aperture setting due to the geometrical optical aberration and the influence at attributable to the variable aperture mechanism and manifesting as the lower MTF at a large F number in terms of wave optics.

The numerical values in FIGS. 24 and 25 reflect the relationship that exists between these two instances of MTF decrease. Comparison of the synthesized contrast data corresponding to F8 at which the best characteristics are achieved with regard to the geometrical optical aberration and the synthesized contrast data corresponding to F2.8 close to the maximum aperture, at which the best performance is assured in terms of wave optics, reveals that the synthesized contrast data obtained by integrating the geometrical aberration data and the wave optics MTF data for F2.8 and F8, both indicate lowered contrast as the pixel pitch becomes smaller, with the contrast level falling slightly faster in correspondence to F8.

The only solution to this problem is to reduce the OLPF strength as the pixel pitch becomes smaller. In other words, the optical performance of existing lenses cannot be improved.

While the conditions for achieving a color moiré-free state over the high MTF range have been revealed in reference to the first through fourth embodiments, the strength of the optical low pass filter may be determined through an alternative method. Namely, in order to allow the adjustable aperture, a major feature characterizing a lens in a single lens reflex camera to provide the functionality that constitutes its raison d'être, the strength of the OLPF must be adjusted to a lower level so as to achieve limited contrast at a frequency equal to or higher than the Nyquist frequency over at least the normal utilization range of F2.8 through F8.

Since the contrast level drops faster at F8 as the pixel pitch becomes smaller, the optimal OLPF strength should be set in correspondence to various pixel pitch settings so as to sustain limited MTF at the Nyquist frequency at all times at the reference aperture number F8, designated as the reference aperture number. In other words, the intention of this method is to assure a minimum level of lens resolution up to F8, i.e., the limit of the normal utilization range, while tolerating the occurrence of slight color moiré at settings closer to F2.8. Through this approach, an image of good quality, maintaining the minimum level of definition and focus can be provided at aperture number settings in the normal utilization range.

The contrast level at which the color moiré-free state is achieved through the image processing by adopting the method described in reference to this embodiment corresponds to the MTF lowered to approximately 0.1 as explained toward the end of the description of the fourth embodiment. However, this MTF value is affected by the particulars of the image processing method in effect, and the value of 0.1 can reasonably be assured when adaptive chrominance correction is executed in conjunction with the different color correlation directional decision making/color judgment method and the color gradient decision-making method.

Figure 34A:
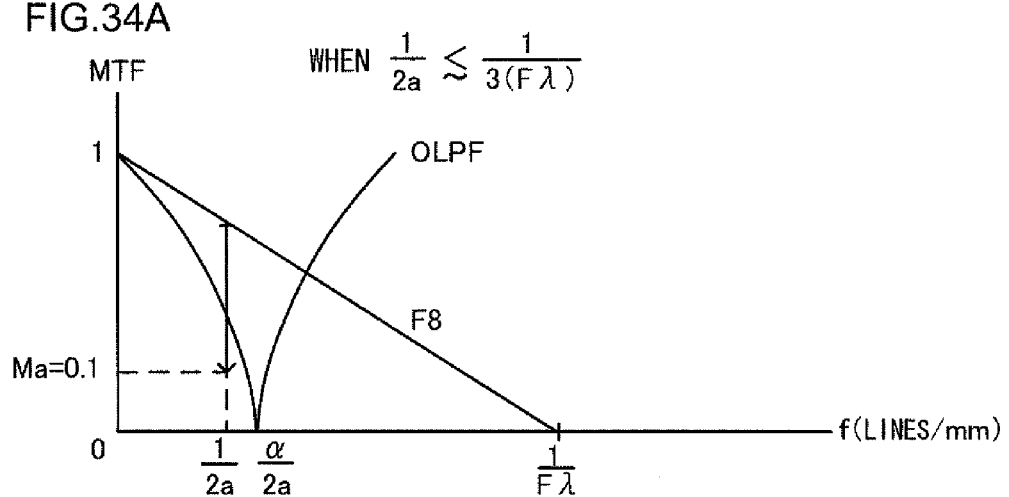
FIGS. 34A-34C show schematic diagrams of three different pixel pitch areas plotted based upon the positional relationship of the Nyquist frequency $1/(2a)$ to the lens resolution limit frequency $1/(F\lambda)$ when F8 is set as the reference aperture number.
Figure 34B:
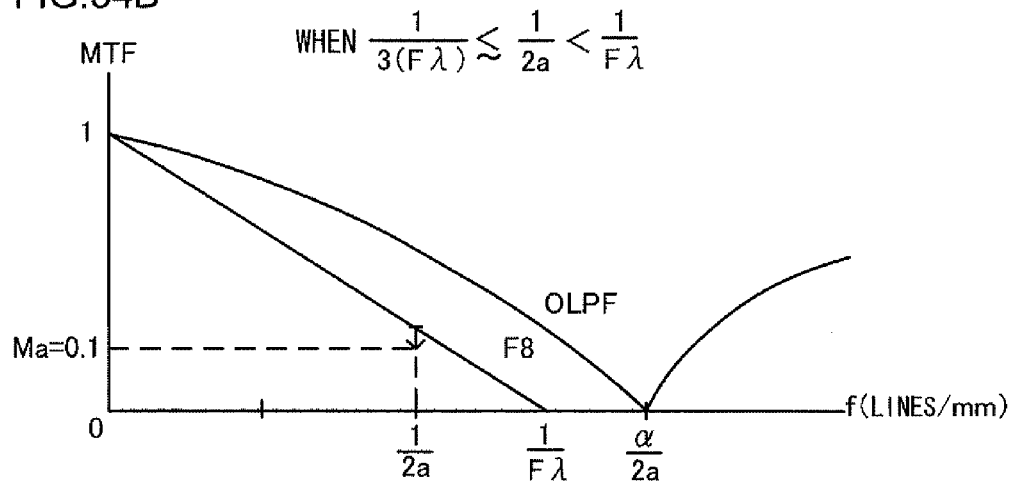
Figure 34C:
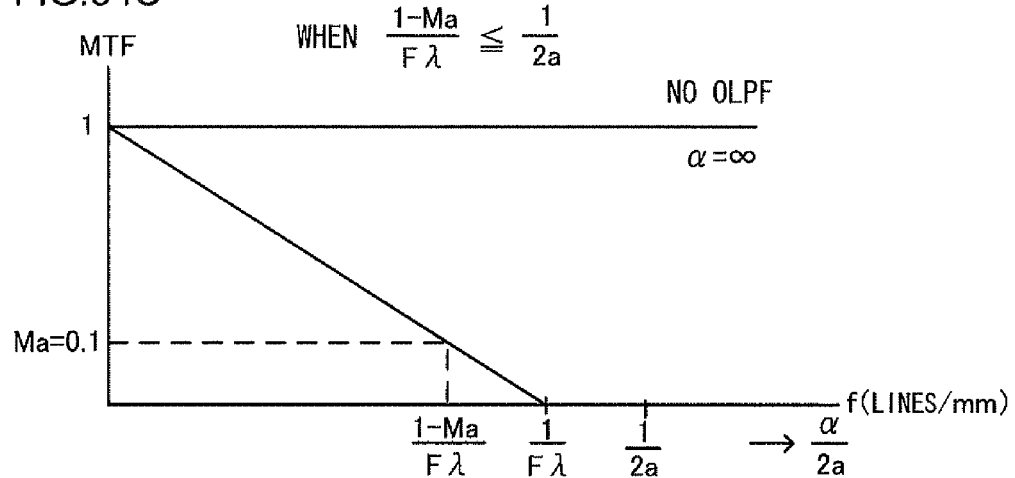

FIGS. 34A-34C present schematic diagrams of three different pixel pitch ranges assumed in correspondence to the positional relationship of the Nyquist frequency $1/(2a)$ to the lens resolution limit frequency $1/(F\lambda)$ when F8 is designated as the reference aperture number; 1) a pixel pitch range (FIG. 34A) over which the OLPF at a constant strength is applied at all times regardless of the pixel pitch, 2) a pixel pitch range (FIG. 34B) over which the OLPF strength is lessened in correspondence to the pixel pitch and 3) a pixel pitch range (FIG. 34C) over which no OLPF is required.

Since $1/(F\lambda)=1/(8\times 0.54\,\mu m)=230$ lines/mm when the aperture number is F8, the first range is equivalent to the range over which the Nyquist frequency $1/(2a)$ is equal to or less than approximately ⅓ of the lens resolution limit frequency. Namely, since $1/(2a)\sim <1/(3(F\lambda))=77$ (lines/mm), $a>\sim 6.5$ μm/pixel. In addition, the third range is equivalent to the range over which the Nyquist frequency exceeds the lens resolution frequency sustaining the minimum resolution MTF value Ma at F8. Namely, $(1-Ma)/(F\lambda)\leq 1/2a$ Since the calculation in the left-hand side of the expression is executed as; $(1-0.1)/(8\times 0.54\,\mu m)=208$ (lines/mm), $a\leq 2.4$ μm. The value is calculated in the left side based upon the condition for the frequency f for satisfying MTF $(f)=1-f\cdot(F\lambda)=Ma$.

However, there is bound to be an error in the range of approximately $a\leq 2.4\pm 0.5$ μm. The second range is the pixel pitch range set between the first range and the third range.

The MTF achieved with the 133% hv OLPF at the Nyquist frequency when the pixel pitch was set at 6 μm/pixel was measured by actually using a wave optics simulator. The test results confirmed that there was a serious challenge, as discussed earlier, in that even at a lens having proved to provide desirable performance through the geometrical optics simulation explained earlier, an MTF of only approximately 10% was sustained, resulting in an image failing to achieve sharp focus. It was also confirmed that the conditions for achieving a substantially color moiré-free state already existed at this point.

Figure 35:
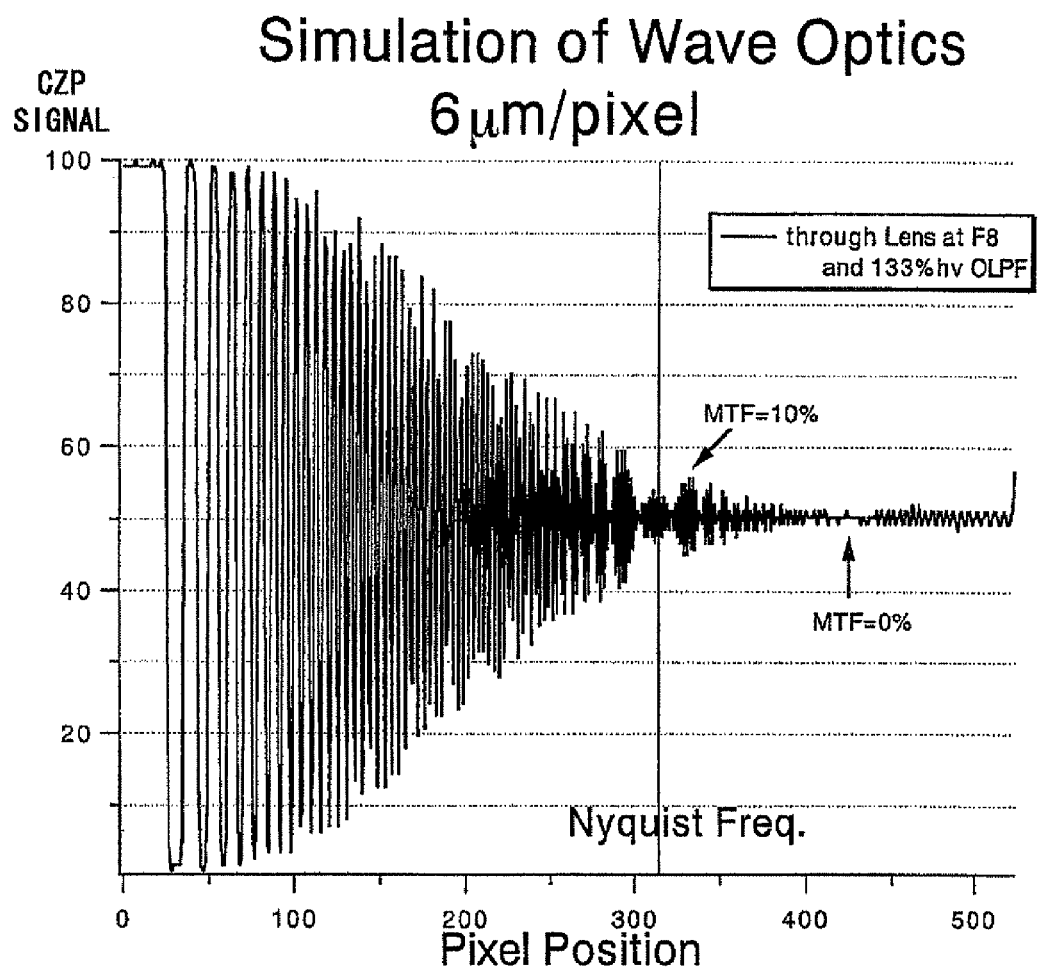
FIG. 35 shows a signal profile of a CZP having undergone PFS processing through wave optics simulation conducted under conditions; 6 μm/pixel pitch, F8, 133% by and image height 0 mm.

This means that while the sufficient conditions with regard to the OLPF strength determined entirely based upon the geometrical aberration at F2.8, as indicated in FIG. 25 in reference to which the fourth embodiments has been described, is 120% hv, the strength can be further reduced in conjunction with the synthesized MTF characteristics obtained by integrating the wave optics considerations, and thus, the lower limit to the strength may be set to 133% by at 6 μm/pixel. Namely, the PSF data indicating the synthesized MTF, obtained by integrating the wave optics considerations, may be interpreted to imply that the lower-limit value for the inequality defining the sufficient conditions determined in the first through fourth embodiments may be further shifted overall by a factor of approximately $133/120\approx 1.1$. For reference, FIG. 35 presents a profile of the CZP signal obtained by applying the PSF in a wave optics simulation conducted under conditions; 6 μm/pixel, F8, 133% hv and image height=0 mm in the best focusing state. Since the frequency of the CZP signal becomes gradually higher, the pixel position indicated along the horizontal axis may be considered to directly indicate the frequency. The signal profile also replicates the MTF dip to 0% exactly at the OLPF strength of 133%.

(2) The expression "two-plate structure" often used in the description of optical low pass filters means that two birefringence plates are used to achieve four-point light beam separation. In addition, a ($\lambda/4$) plate is normally inserted between the two birefringence plates so as to adjust the condition of the linearly polarized light to the state of circularly-polarized degenerate light.

(3) The expression "color moiré-free state" used to refer to image quality conditions in the description simply means that the color moiré-free state can be achieved for an achromatic image of a circular zone plate chart, and the perfect color moiré-free state in the true sense for a chromatic image captured via the Bayer array could only be achieved if an additional 50% hv OLPF was installed. Since the Bayer array assumes a higher G density in order to retain a satisfactory level of luminance resolution, targeting the R component data and the B component data generated with lower density levels in the Bayer array for OLPF processing, which is executed as a countermeasure against color artifacts, will be self-negating, and defeats the purpose of the Bayer array. In other words, as long as the OLPF is used in conjunction with a color filter array, a perfect color moiré-free state cannot be achieved for a chromatic image. However, the OLPF proposed in the present invention is bound to achieve a substantially color moiré-free state and in that sense, the use of the term "color moiré-free state" is perhaps justifiable.

(4) The present invention may be adopted in conjunction with pixels disposed in a rectangular lattice instead of a square lattice simply by altering the light beam separation shift setting to, for instance, ((1/2)a, ±(1/2)b) for the diagonal bidirectional 141% dd OLPF, relative to the basic lattice vectors (a, 0), (0, b) in the real space.

(5) Pixels in a square grid Bayer array may each be split into a right sub-pixel and a left sub-pixel while the color filter positions remain unchanged. In such a case, the horizontal resolution limit range will expand to the second Brillouin zone instead of the first Brillouin zone and accordingly, the steepness index should be calculated through integration executed over a range of $|kx| \leq 2\pi/a$, $|ky| \leq \pi/a$.

(6) The argument above is applicable to other filter arrays including the so-called honeycomb array achieved simply by rotating the Bayer array by 45°.

(7) While the interpolation processing is executed in the personal computer 10 in the embodiments described above, the processing may be executed in the digital camera 1. In such a case, it is desirable to execute the processing in the image processing unit 5.

(8) The digital camera 1 achieved in the embodiments described above is a single lens reflex digital camera at which an exchangeable photographic lens 2 is mounted. However, the present invention may be adopted in a digital camera 1 that is a compact digital camera with a permanently fixed, integrated lens, i.e., a photographic lens 2 provided as a permanent fixture in the digital camera 1.

(9) In the embodiments described above, the color filters are disposed in the most typical Bayer array (a square array assuming a pixel pitch a). However, the present invention may be adopted in conjunction with color filters disposed in another array pattern, as explained earlier. For instance, the R, G and B color filters in the Bayer array may be replaced with complementary color filters Cy, Mg and Ye, or the present invention may be adopted in conjunction with the honeycombed array achieved by simply rotating the Bayer array by 45°. In addition, since the basic shapes of the Brillouin zones remain unchanged even if the color distribution ratios are slightly altered from the ratios R:G:B 1:2:1 in the Bayer array to R:G:B 6:8:2 (see FIG. 5 in U.S. Pat. No. 5,541,653 publication) or to R:G:B 7:8:1 (see FIG. 4 in U.S. Pat. No. 5,541,653 publication) as disclosed in U.S. Pat. No. 5,541,653 publication, the same α value can be used with regard to the pixel pitch dependency by sustaining the same OLPF structure.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The invention claimed is:

1. A digital camera, comprising:
a lens unit that forms a subject image on an imaging plane;
an image sensor that includes color filters each disposed at one of pixels disposed in a lattice-like pattern over pixel intervals (a, b) along two directions, an x direction and a y direction, extending perpendicular to each other, with color filters corresponding to a first color component among first through nth (n≧2) color components, disposed in a checkered pattern at pixels amounting to at least half an entire color filter density and color filters corresponding to remaining color components disposed at other pixels, and outputs image signals expressing the subject image; and
an optical low pass filter unit at which light having passed through the lens unit and yet to enter the image sensor undergoes light beam separation along two diagonal directions $((1/2)a, (1/2)b) \times (\sqrt{2}/\alpha)$ and $((1/2)a, -(1/2)b) \times (\sqrt{2}/\alpha)$ relative to (x, y) coordinate axes, so as to achieve frequency modulation for the subject image to become extinct at a band formed by connecting spatial frequencies $(\alpha/(2a), 0)$ and $(0, \alpha/(2b))$ at positions calculated by multiplying, by a multiplier α, a Nyquist frequency $1/(2a)$ and a Nyquist frequency $1/(2b)$ at the image sensor assumed respectively along the x direction and the y direction, wherein:
when the pixel intervals (a, b) assumed along the two directions at the image sensor are both within a 2.5~5 μm/pixel range, a position of an extinction frequency band is set for the optical low pass filter by setting the multiplier α for the Nyquist frequencies at the image sensor within a range of $1.5 \leq \alpha \leq 3.5$.

2. A digital camera according to claim 1, wherein:
when the pixel intervals (a, b) assumed along the two directions at the image sensor are 5±0.5 μm/pixel, the position of the extinction frequency band is set for the optical low pass filter by setting the multiplier α within a range of $1.5 \leq \alpha \leq 1.9$.

3. A digital camera according to claim 1, wherein:
when the pixel intervals (a, b) assumed along the two directions at the image sensor are 4±0.5 μm/pixel, the position of the extinction frequency band is set for the optical low pass filter by setting the multiplier α within a range of $1.9 \leq \alpha \leq 2.83$.

4. A digital camera according to claim 1, wherein:
when the pixel intervals (a, b) assumed along the two directions at the image sensor are 3±0.5 μm/pixel, the position of the extinction frequency band is set for the optical low pass filter by setting a multiplier α within a range of $2.83 \leq \alpha \leq 3.5$.

5. A digital camera, comprising:
a lens unit that forms a subject image on an imaging plane;
an image sensor that includes color filters each disposed at one of pixels disposed in a lattice-like pattern over pixel intervals (a, b) along two directions, an x direction and a y direction, extending perpendicular to each other, with color filters corresponding to a first color component among first through nth (n≧2) color components, disposed in a checkered pattern at pixels amounting to at least half an entire color filter density and color filters corresponding to remaining color components disposed at other pixels, and outputs image signals expressing the subject image; and an optical low pass filter unit at which light having passed through the lens unit and yet to enter the image sensor undergoes light beam separation along one direction, that is a vertical direction $(0, b/\alpha)$ relative to $(x, y)$ coordinate axes, so as to achieve frequency modulation for the subject image to become extinct at a band at a spatial frequency $\alpha/(2b)$ assumed at a position calculated by multiplying, by a multiplier $\alpha$, a Nyquist frequency $1/(2b)$ at the image sensor assumed along the y direction, wherein:

when the pixel intervals (a, b) assumed along the two directions at the image sensor are both within a 2.5~5 μm/pixel range, a position of an extinction frequency band is set for the optical low pass filter by setting the multiplier $\alpha$ for the Nyquist frequency at the image sensor within a range of $1.1 \leq \alpha \leq 2.0$.

6. A digital camera according to claim 5, wherein:
when the pixel intervals (a, b) assumed along the two directions at the image sensor are 5±0.5 μm/pixel, the position of the extinction frequency band is set for the optical low pass filter by setting the multiplier $\alpha$ within a range of $1.1 \leq \alpha \leq 1.33$.

7. A digital camera according to claim 5, wherein:
when the pixel intervals (a, b) assumed along the two directions at the image sensor are 4±0.5 μm/pixel, the position of the extinction frequency band is set for the optical low pass filter by setting the multiplier $\alpha$ within a range of $1.33 \leq \alpha \leq 1.67$.

8. A digital camera according to claim 5, wherein:
when the pixel intervals (a, b) assumed along the two directions at the image sensor are 3±0.5 μm/pixel, the position of the extinction frequency band is set for the optical low pass filter by setting the multiplier $\alpha$ within a range of $1.67 \leq \alpha \leq 2.0$.

9. A digital camera, comprising:
a lens unit that forms a subject image on an imaging plane;
an image sensor that includes color filters each disposed at one of pixels disposed in a lattice-like pattern over pixel intervals (a, b) along two directions, an x direction and a y direction, extending perpendicular to each other, with color filters corresponding to a first color component among first through nth ($n \geq 2$) color components, disposed in a checkered pattern at pixels amounting to at least half an entire color filter density and color filters corresponding to remaining color components disposed at other the pixels, and outputs image signals expressing the subject image; and
an optical low pass filter unit at which light having passed through the lens unit and yet to enter the image sensor undergoes light beam separation along two directions, that are a vertical direction $(a/\alpha, 0)$ and a horizontal direction $(0, b/\alpha)$ relative to $(x, y)$ coordinate axes so as to achieve frequency modulation for the subject image to become extinct at bands corresponding to spatial frequencies $(\alpha/(2a), 0)$ and $(0, \alpha/(2b))$ at positions calculated by multiplying, by a multiplier $\alpha$, a Nyquist frequency $1/(2a)$ and a Nyquist frequency $1/(2b)$ at the image sensor assumed respectively along the x direction and the y direction, wherein:
when the pixel intervals (a, b) assumed along the two directions at the image sensor are both within a 2.5~4 μm/pixel range, a position of an extinction frequency band is set for the optical low pass filter by setting the multiplier $\alpha$ for the Nyquist frequencies at the image sensor within a range of $1.45 \leq \alpha \leq 2.5$.

10. A digital camera according to claim 9, wherein:
when the pixel intervals (a, b) assumed along the two directions at the image sensor are 4±0.5 μm/pixel, the position of the extinction frequency band is set for the optical low pass optical filter by setting the multiplier $\alpha$ within a range of $1.45 \leq \alpha \leq 2.0$.

11. A digital camera according to claim 9, wherein:
when the pixel intervals (a, b) assumed along the two directions at the image sensor are 3±0.5 μm/pixel, the position of the extinction frequency band is set for the optical low pass filter by setting the multiplier $\alpha$ within a range of $2.0 \leq \alpha \leq 2.5$.

12. A digital camera according to claim 5, wherein:
the lens unit achieves a lens speed corresponding to a number of maximum aperture of at least F2.8 or brighter and is equipped with an aperture mechanism capable of variable aperture control over a range between the number of maximum aperture through a number equal to or greater than F8.

13. A digital camera according to claim 12, wherein:
the lens unit assumes at least one focal length within a range of 50 mm through 200 mm.

14. A digital camera according to claim 12, wherein:
the lens unit is an exchangeable lens unit that can be replaced with any one of a plurality of types of lenses.

15. A digital camera according to claim 5, wherein:
the image sensor assumes dimensions of 35 mm×24 mm, 23.4 mm×16.7 mm, 18 mm×13.5 mm, or dimensions therebetween.

16. A digital camera according to claim 5, wherein:
the image sensor has color filters corresponding to a green color component disposed in a checkered pattern to account for half the entire color filter density with color filters corresponding to a red color component and a blue color component evenly distributed at other pixels.

17. A digital camera according to claim 1, further comprising:
an image processing unit that calculates different-color similarity factors assuring resolution over a Nyquist frequency range in correspondence to each of the image signals output from the image sensor by using color signals corresponding to different color components, output from pixels present over minimum pixel intervals from each other at least along the two directions extending along an x-axis and a y-axis, determines based upon the different-color similarity factors a direction along which pronounced similarity manifests, and generates a color signal corresponding to at least one common color component for each pixel based upon similarity direction determination.

18. A digital camera according to claim 5, further comprising:
an image processing unit that calculates different-color similarity factors assuring resolution over a Nyquist frequency range in correspondence to each of the image signals output from the image sensor by using color signals corresponding to different color components, output from pixels present over minimum pixel intervals from each other at least along the two directions extending along an x-axis and a y-axis, determines based upon the different-color similarity factors a direction along which pronounced similarity manifests, and generates a color signal corresponding to at least one common color component for each pixel based upon similarity direction determination.

19. A digital camera according to claim 9, further comprising:
an image processing unit that calculates different-color similarity factors assuring resolution over a Nyquist frequency range in correspondence to each of the image signals output from the image sensor by using color signals corresponding to different color components, output from pixels present over minimum pixel intervals from each other at least along the two directions extending along an x-axis and a y-axis, determines based upon the different-color similarity factors a direction along which pronounced similarity manifests, and generates a color signal corresponding to at least one common color component for each pixel based upon similarity direction determination.

20. A digital camera according to claim 17, wherein:
the image processing unit generates a chrominance component based upon the similarity direction determination and generates data corresponding to at least one common color component for the pixels by executing adaptive smoothing processing on the chrominance component having been generated in correspondence to each pixel.

21. A digital camera according to claim 18, wherein:
the image processing unit generates a chrominance component based upon the similarity direction determination and generates data corresponding to at least one common color component for the pixels by executing adaptive smoothing processing on the chrominance component having been generated in correspondence to each pixel.

22. A digital camera according to claim 19, wherein:
the image processing unit generates a chrominance component based upon the similarity direction determination and generates data corresponding to at least one common color component for the pixels by executing adaptive smoothing processing on the chrominance component having been generated in correspondence to each pixel.

* * * * *